(12) United States Patent 
Duan et al.

(10) Patent No.: US 12,699,180 B2
(45) Date of Patent: Aug. 4, 2026

(54) ENHANCED SIDELINK-AIDED HYBRID NETWORK POSITIONING

(71) Applicant: QUALCOMM Incorporated, San Diego, CA (US)

(72) Inventors: Weimin Duan, San Diego, CA (US); Alexandros Manolakos, Escondido, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 18/250,155

(22) PCT Filed: Nov. 1, 2021

(86) PCT No.: PCT/US2021/057621

§ 371 (c)(1),
(2) Date: Apr. 21, 2023

(87) PCT Pub. No.: WO2022/139958

PCT Pub. Date: Jun. 30, 2022

(65) Prior Publication Data

US 2023/0384443 A1 Nov. 30, 2023

(30) Foreign Application Priority Data

Dec. 23, 2020 (GR) .............................. 20200100746
May 6, 2021 (GR) .............................. 20210100310

(51) Int. Cl.
*G01S 13/87* (2006.01)
*G01S 13/76* (2006.01)
*H04W 92/18* (2009.01)

(52) U.S. Cl.
CPC .......... *G01S 13/878* (2013.01); *G01S 13/765* (2013.01); *H04W 92/18* (2013.01)

(58) Field of Classification Search
CPC ..... G01S 13/878; G01S 13/765; H04W 92/19
(Continued)

(56) References Cited

U.S. PATENT DOCUMENTS 4,670,757 A 6/1987 Munich et al.
8,750,808 B2 * 6/2014 Kazmi .................. H04W 24/10
455/452.2

(Continued)

FOREIGN PATENT DOCUMENTS

CN 1694567 A 11/2005
CN 110036307 A * 7/2016 .......... H04W 64/003
(Continued)

OTHER PUBLICATIONS

European Search Report—EP24157554—Search Authority—Munich—May 29, 2024.
(Continued)

*Primary Examiner* — Nuzhat Pervin
(74) *Attorney, Agent, or Firm* — Thien T. Nguyen

(57) ABSTRACT

Position determination for a target user equipment (UE) uses a single base station and a plurality of sidelink UEs with known locations. The base station sends a reference signal to the target UE and sidelink UEs, and the target UE sends sidelink signals to each sidelink UEs. A range-sum for the range between the target UE and sidelink UE and the range between the sidelink UE and the base station can be determined for each sidelink UE, based on the time differences between the reception and transmissions of the reference signals measured by the target UE, and the time difference between reception of the reference signals measured by the sidelink UE. A differential in the range-sums can be determined and used to determine the position of the target UE.

46 Claims, 16 Drawing Sheets

(58) Field of Classification Search

USPC ........................................................ 342/125

See application file for complete search history.

(56) References Cited

U.S. PATENT DOCUMENTS

| | | | | |
|---|---|---|---|---|
| 9,351,112 | B2 * | 5/2016 | Smith | H04W 4/026 |
| 9,648,651 | B2 | 5/2017 | Edge | |
| 9,713,117 | B2 * | 7/2017 | Khoryaev | H04W 64/00 |
| 10,736,074 | B2 | 8/2020 | Edge et al. | |
| 10,972,958 | B1 * | 4/2021 | Wang | H04W 88/04 |
| 11,570,577 | B2 * | 1/2023 | Wong | H04W 4/029 |
| 2003/0001777 | A1 | 1/2003 | Johnson | |
| 2003/0114169 | A1 | 6/2003 | Okamura et al. | |
| 2005/0078626 | A1 * | 4/2005 | Ogino | H04W 64/00 |
| | | | | 455/426.2 |
| 2005/0288037 | A1 | 12/2005 | Marinier | |
| 2010/0177681 | A1 * | 7/2010 | Sahinoglu | G01S 13/46 |
| | | | | 370/328 |
| 2011/0039574 | A1 | 2/2011 | Charbit et al. | |
| 2013/0203447 | A1 * | 8/2013 | Hannan | H04W 64/00 |
| | | | | 455/456.5 |
| 2014/0295881 | A1 * | 10/2014 | Werner | G01S 5/0236 |
| | | | | 455/456.1 |
| 2014/0365488 | A1 * | 12/2014 | Arslan | G01S 5/0242 |
| | | | | 707/736 |
| 2016/0095080 | A1 * | 3/2016 | Khoryaev | G01S 5/0284 |
| | | | | 455/456.1 |
| 2016/0183044 | A1 | 6/2016 | Wei et al. | |
| 2016/0337805 | A1 | 11/2016 | Liao et al. | |
| 2017/0108579 | A1 * | 4/2017 | Irvine | G01S 5/08 |
| 2017/0367067 | A1 | 12/2017 | Hwang et al. | |
| 2019/0037350 | A1 | 1/2019 | Prevatt | |
| 2019/0230618 | A1 * | 7/2019 | Saur | H04W 56/001 |
| 2019/0297673 | A1 * | 9/2019 | Xue | H04W 4/70 |
| 2019/0364536 | A1 * | 11/2019 | Sadiq | G01S 5/10 |
| 2020/0072939 | A1 * | 3/2020 | Yamada | G01S 5/08 |
| 2020/0137714 | A1 | 4/2020 | Kumar et al. | |
| 2020/0145977 | A1 | 5/2020 | Kumar et al. | |
| 2020/0196298 | A1 * | 6/2020 | Edge | G01S 5/0036 |
| 2020/0229126 | A1 | 7/2020 | Soriaga et al. | |
| 2020/0250352 | A1 * | 8/2020 | Wodrich | G01S 5/14 |
| 2020/0267041 | A1 * | 8/2020 | Kim | H04L 5/00 |
| 2020/0333427 | A1 * | 10/2020 | Hu | H04W 24/10 |
| 2020/0359329 | A1 | 11/2020 | Manolakos et al. | |
| 2021/0022105 | A1 * | 1/2021 | Yu | H04W 64/00 |
| 2021/0105867 | A1 | 4/2021 | Akkarakaran et al. | |
| 2022/0065979 | A1 | 3/2022 | Bao et al. | |
| 2022/0187411 | A1 | 6/2022 | Manolakos et al. | |
| 2022/0229146 | A1 * | 7/2022 | Ko | G01S 5/02216 |
| 2022/0236365 | A1 * | 7/2022 | Ko | G01S 7/006 |
| 2022/0295442 | A1 * | 9/2022 | Goyal | H04W 64/00 |
| 2022/0326335 | A1 * | 10/2022 | Ko | G01S 5/0072 |
| 2023/0017758 | A1 | 1/2023 | Shpak | |
| 2023/0319766 | A1 | 10/2023 | Manolakos et al. | |
| 2023/0333194 | A1 | 10/2023 | Duan et al. | |
| 2023/0422201 | A1 | 12/2023 | Shimoda et al. | |
| 2024/0022375 | A1 | 1/2024 | Keating et al. | |
| 2024/0085517 | A1 | 3/2024 | Duan et al. | |
| 2024/0114480 | A1 | 4/2024 | Duan et al. | |

FOREIGN PATENT DOCUMENTS

| | | | | | |
|---|---|---|---|---|---|
| CN | 106662634 | A | * | 5/2017 | H04W 4/023 |
| CN | 106705961 | A | * | 5/2017 | G01S 5/0284 |
| CN | 107439044 | A | | 12/2017 | |
| CN | 108141776 | A | * | 6/2018 | G01S 13/74 |
| CN | 109792618 | A | | 5/2019 | |
| CN | 110383862 | A | * | 10/2019 | H04W 4/06 |
| CN | 111405508 | A | | 7/2020 | |
| CN | 111566499 | A | * | 8/2020 | G01S 5/0072 |
| CN | 111989584 | A | * | 11/2020 | G01S 5/0236 |
| CN | 112188542 | A | | 1/2021 | |
| CN | 112567789 | A | | 3/2021 | |
| EP | 3262878 | B1 | * | 1/2019 | H04W 64/006 |
| EP | 3543731 | | | 9/2019 | |
| EP | 3543731 | A1 | * | 9/2019 | H04W 88/08 |
| EP | 3251235 | B1 | * | 3/2021 | G01S 1/20 |
| JP | H05100020 | A | | 4/1993 | |
| JP | 2004317157 | A | | 11/2004 | |
| JP | 2010160132 | A | | 7/2010 | |
| JP | 2010216814 | A | | 9/2010 | |
| JP | 2016042075 | A | | 3/2016 | |
| JP | 2016535515 | A | | 11/2016 | |
| JP | 2017527806 | A | | 9/2017 | |
| TW | 202103512 | A | | 1/2021 | |
| WO | 2013176999 | | | 11/2013 | |
| WO | WO 2018068817 | | | 4/2018 | |
| WO | WO-2018068817 | A1 | * | 4/2018 | H04W 4/06 |
| WO | 2018160141 | A1 | | 9/2018 | |
| WO | 2019027595 | | | 2/2019 | |
| WO | 2019078996 | A1 | | 4/2019 | |
| WO | 2020057748 | A1 | | 3/2020 | |
| WO | WO-2020067848 | A1 | * | 4/2020 | H04W 72/51 |
| WO | 2020102971 | A1 | | 5/2020 | |
| WO | 2020123817 | | | 6/2020 | |
| WO | 2020163392 | A1 | | 8/2020 | |
| WO | 2020200171 | A1 | | 10/2020 | |
| WO | 2020256365 | A1 | | 12/2020 | |
| WO | 2021030583 | A1 | | 2/2021 | |
| WO | 2021057175 | A1 | | 4/2021 | |

OTHER PUBLICATIONS

Huawei., et al., "On the Impact of DRX on CLI SRS-RSRP Measurement", 3GPP TSG-RAN2 Meeting #110 electronic, R2-2005309, 3rd Generation Partnership Project, Mobile Competence Centre, 650, Route Des Lucioles, F-06921, Sophia-Antipolis Cedex, France, vol. RAN WG2, No. electronic; Jun. 1, 2020-Jun. 12, 2020, May 21, 2020, XP051887589, 28 pages, section 2.1, 2.2, Alternative 1, The whole document, figure 1, paragraph [02.1], paragraph [02.2].

LGE: "CLI Configuration", 3GPP TSG-RAN WG2 Meeting #111 electronic, R2-2007989, Online, Aug. 17-28, 2020, Aug. 28, 2020(Aug. 28, 2020), pp. 1-25, The whole document.

International Search Report and Written Opinion—PCT/US2021/057621—ISA/EPO—Feb. 23, 2022.

Qualcomm Incorporated: "UE & gNB Measurements for NR Positioning", 3GPP TSG RAN WG1 #96bis, R1-1905034, Xi'an, China, Apr. 8, 2019-Apr. 12, 2019, Apr. 3, 2019, 9 Pages.

* cited by examiner

GNSS
Satellites
110

105a

137

Sidelink (SL)
User Equipment
(UE)

105

133

135

User
Equipment
(UE)

120

130

Network

170

160

Location
Server (LS)

180

External
Client

Positioning
System
100

1300 ⌐

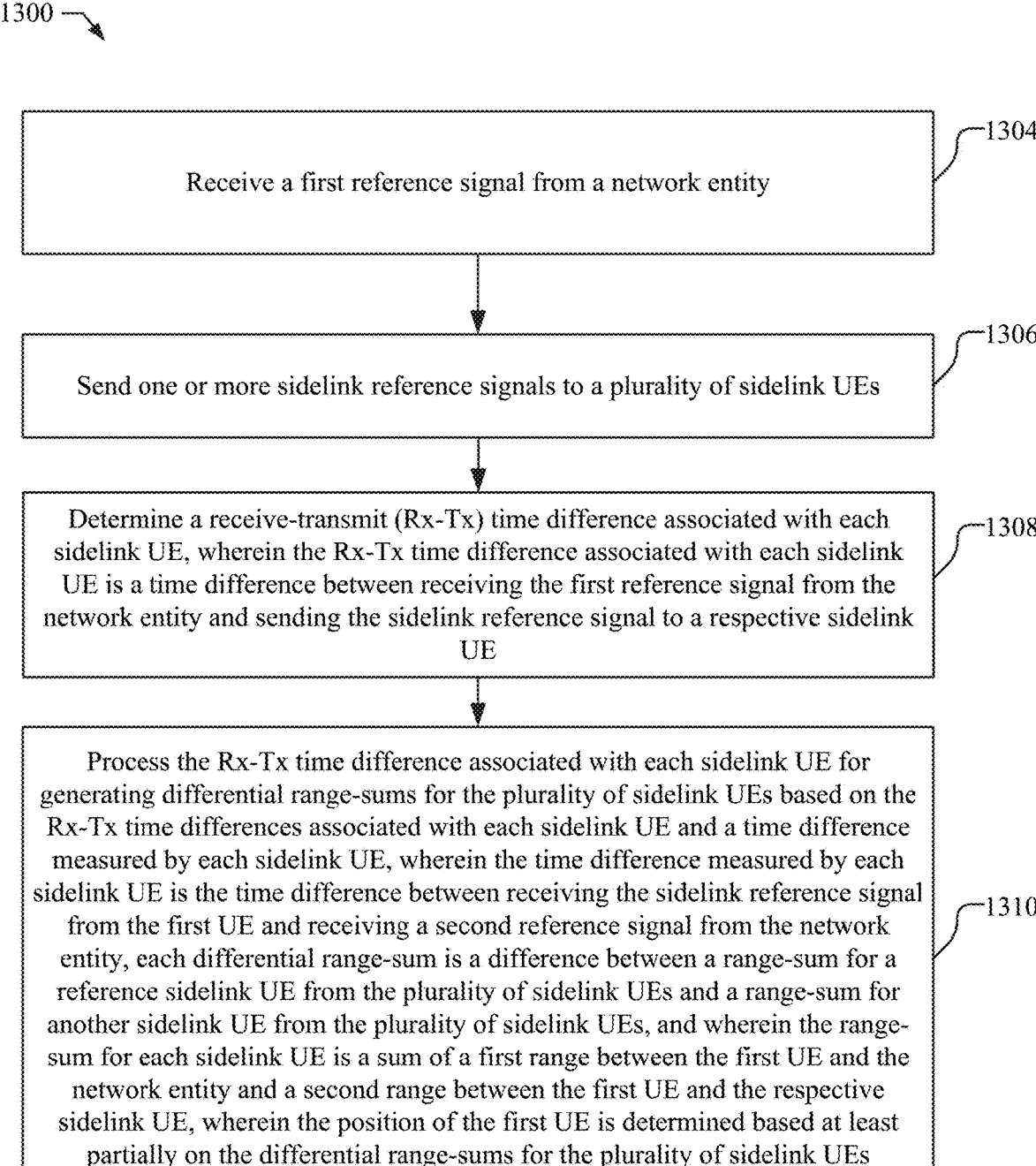

Receive a first reference signal from a network entity ⌐1304

Send one or more sidelink reference signals to a plurality of sidelink UEs ⌐1306

Determine a receive-transmit (Rx-Tx) time difference associated with each sidelink UE, wherein the Rx-Tx time difference associated with each sidelink UE is a time difference between receiving the first reference signal from the network entity and sending the sidelink reference signal to a respective sidelink UE ⌐1308

Process the Rx-Tx time difference associated with each sidelink UE for generating differential range-sums for the plurality of sidelink UEs based on the Rx-Tx time differences associated with each sidelink UE and a time difference measured by each sidelink UE, wherein the time difference measured by each sidelink UE is the time difference between receiving the sidelink reference signal from the first UE and receiving a second reference signal from the network entity, each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE, wherein the position of the first UE is determined based at least partially on the differential range-sums for the plurality of sidelink UEs ⌐1310

FIG. 13

1400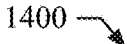

Obtain differential range-sums for the first UE and a plurality of sidelink UEs based on receive-transmit (Rx-Tx) time difference associated with each sidelink UE measured by the first UE, wherein the Rx-Tx time difference associated with each sidelink UE is a time difference measured by the first UE between receiving a first reference signal from a network entity and sending a sidelink reference signal to a respective sidelink UE, wherein the differential range-sums for the first UE and the plurality of sidelink UEs is further based on time differences measured by the plurality of sidelink UEs, wherein the time difference measured by each sidelink UE is a time difference between receiving the sidelink reference signal from the first UE and receiving a second reference signal from the network entity, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE

1404

Determine the position of the first UE based at least partially on the differential range-sums for the plurality of sidelink UEs

Figure 15:
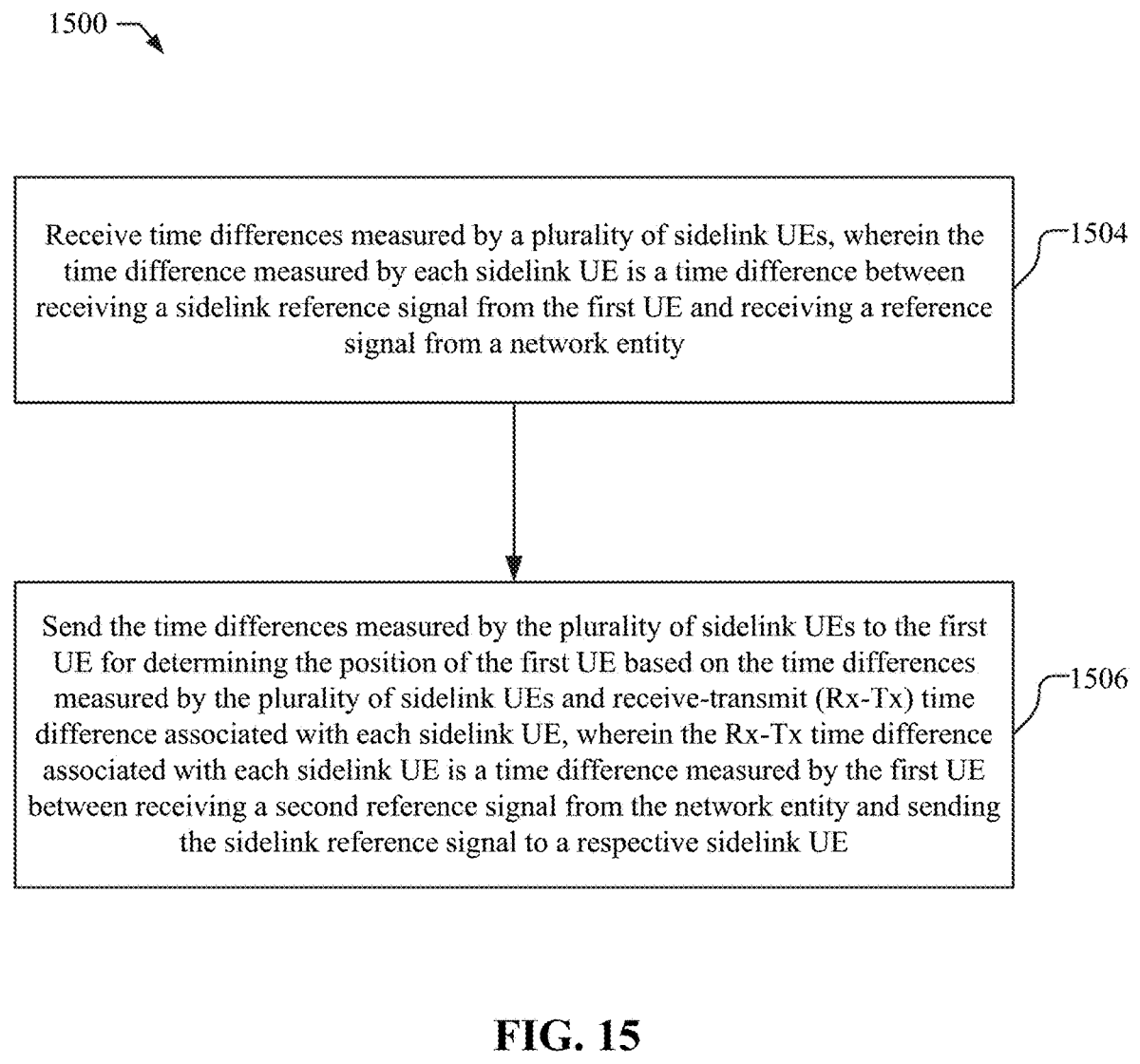

Receive time differences measured by a plurality of sidelink UEs, wherein the time difference measured by each sidelink UE is a time difference between receiving a sidelink reference signal from the first UE and receiving a reference signal from a network entity ⟋ 1504

Send the time differences measured by the plurality of sidelink UEs to the first UE for determining the position of the first UE based on the time differences measured by the plurality of sidelink UEs and receive-transmit (Rx-Tx) time difference associated with each sidelink UE, wherein the Rx-Tx time difference associated with each sidelink UE is a time difference measured by the first UE between receiving a second reference signal from the network entity and sending the sidelink reference signal to a respective sidelink UE ⟋ 1506

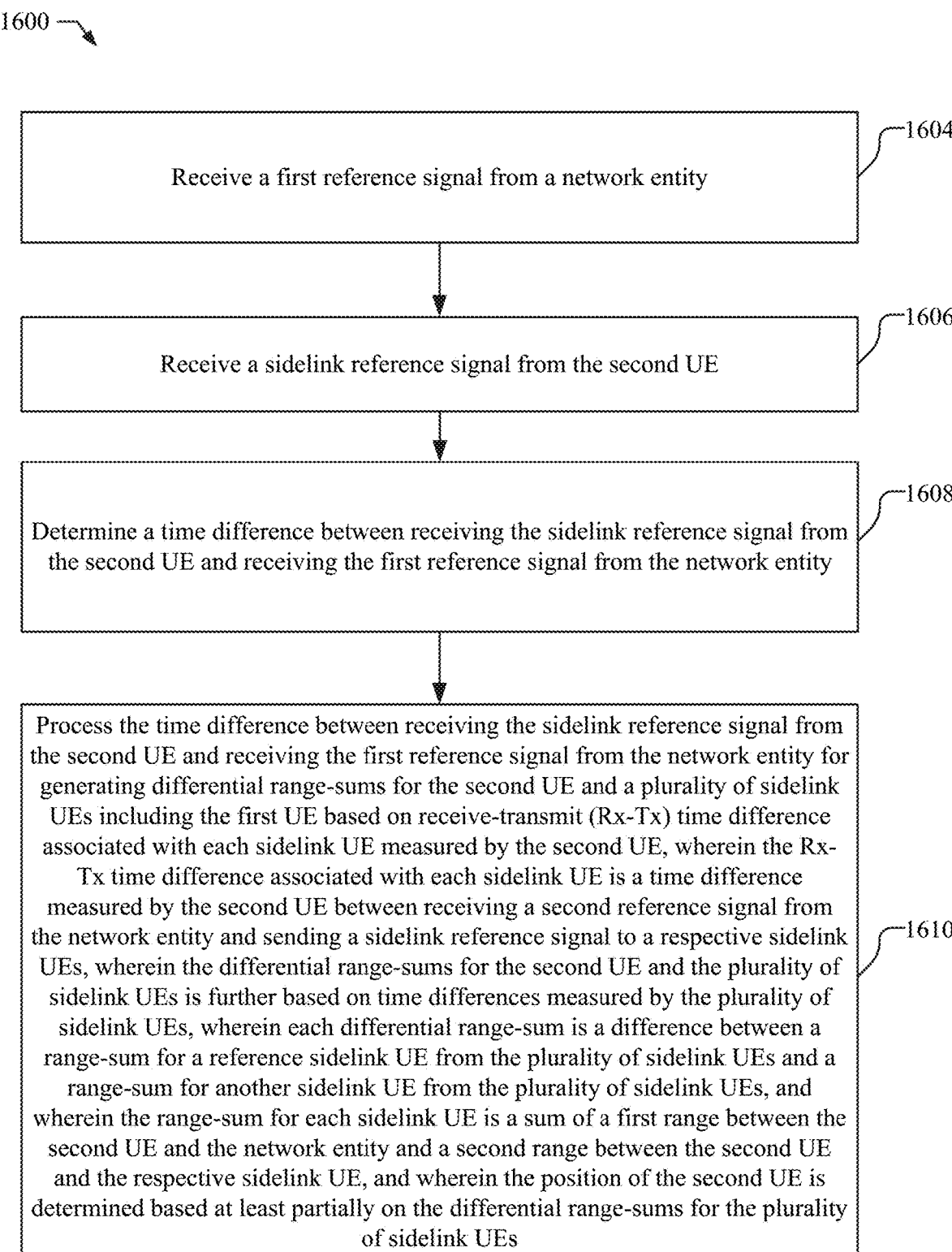

Receive a first reference signal from a network entity ⟋—1604

Receive a sidelink reference signal from the second UE ⟋—1606

Determine a time difference between receiving the sidelink reference signal from the second UE and receiving the first reference signal from the network entity ⟋—1608

Process the time difference between receiving the sidelink reference signal from the second UE and receiving the first reference signal from the network entity for generating differential range-sums for the second UE and a plurality of sidelink UEs including the first UE based on receive-transmit (Rx-Tx) time difference associated with each sidelink UE measured by the second UE, wherein the Rx-Tx time difference associated with each sidelink UE is a time difference measured by the second UE between receiving a second reference signal from the network entity and sending a sidelink reference signal to a respective sidelink UEs, wherein the differential range-sums for the second UE and the plurality of sidelink UEs is further based on time differences measured by the plurality of sidelink UEs, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the second UE and the network entity and a second range between the second UE and the respective sidelink UE, and wherein the position of the second UE is determined based at least partially on the differential range-sums for the plurality of sidelink UEs ⟋—1610

FIG. 16

ENHANCED SIDELINK-AIDED HYBRID NETWORK POSITIONING

CROSS-REFERENCE TO RELATED APPLICATIONS

This application is a U.S. National Phase Application of International Patent Application No. PCT/US2021/057621, filed Nov. 1, 2021, entitled "ENHANCED SIDELINK-AIDED HYBRID NETWORK POSITIONING", which claims priority to and the benefit of Greek patent application No. 20210100310, entitled "ENHANCED SIDELINK-AIDED HYBRID NETWORK POSITIONING," filed May 6, 2021, and Greek application No. 20200100746, entitled "SIDELINK-AIDED HYBRID NETWORK POSITION-ING," filed Dec. 23, 2020, all of which are assigned to the assignee hereof and which are expressly incorporated herein by reference in their entirety.

BACKGROUND

Field

The present invention relates generally to the field of wireless communications, and more specifically to deter-mining the location (or position) of a User Equipment (UE) using radio frequency (RF) signals.

Information

In a data communication network, various positioning techniques can be used to determine the position of a mobile device (referred to herein as a user equipment or a UE). Some of these positioning techniques may involve deter-mining distance and/or angular information of RF signals received by one or more base stations of the data commu-nication network. These determinations, however, typically require the mobile device to communicate with multiple base stations. Communicating in this manner can often exceed the power budgets for some low-power mobile devices.

SUMMARY

Position determination for a target user equipment (UE) uses a single base station and a plurality of sidelink UEs with known locations relative to the base station. The base station sends a reference signal to the target UE and sidelink UEs, and the target UE sends sidelink signals to each sidelink UEs. A range-sum for the range between the target UE and sidelink UE and the range between the sidelink UE and the base station can be determined for each sidelink UE, based on the time differences between the reception and transmis-sions of the reference signals measured by the target UE, and the time difference between reception of the reference sig-nals measured by the sidelink UE. A differential in the range-sums can be determined and used to determine the position of the target UE, e.g., as the intersection of the two hyperbolas from known positions of the sidelink UEs.

In one implementation, a method performed by a first user equipment (UE) for determining a position of the first UE, the method includes receiving a first reference signal from a network entity; sending one or more sidelink reference signals to a plurality of sidelink UEs; determining a receive-transmit (Rx-Tx) time difference associated with each side-link UE, wherein the Rx-Tx time difference associated with each sidelink UE is a time difference between receiving the first reference signal from the network entity and sending the sidelink reference signal to a respective sidelink UE; and processing the Rx-Tx time difference associated with each sidelink UE for generating differential range-sums for the plurality of sidelink UEs based on the Rx-Tx time differ-ences associated with each sidelink UE and a time difference measured by each sidelink UE, wherein the time difference measured by each sidelink UE is the time difference between receiving the sidelink reference signal from the first UE and receiving a second reference signal from the network entity, each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE, wherein the position of the first UE is determined based at least in part on the differential range-sums for the plurality of sidelink UEs.

In one implementation, a first user equipment (UE) con-figured for determining a position of the first UE, the first UE comprising: at least one wireless transceiver configured to wirelessly communicate with other entities in a wireless network; at least one memory; and at least one processor coupled to the at least one wireless transceiver and the at least one memory and configured to: receive, via the at least one wireless transceiver, a first reference signal from a network entity; send, via the at least one wireless trans-ceiver, one or more sidelink reference signals to a plurality of sidelink UEs; determine a receive-transmit (Rx-Tx) time difference associated with each sidelink UE, wherein the Rx-Tx time difference associated with each sidelink UE is a time difference between receiving the first reference signal from the network entity and sending the sidelink reference signal to a respective sidelink UE; and process the Rx-Tx time difference associated with each sidelink UE to generate differential range-sums for the plurality of sidelink UEs based on the Rx-Tx time differences associated with each sidelink UE and a time difference measured by each sidelink UE, wherein the time difference measured by each sidelink UE is the time difference between receiving the sidelink reference signal from the first UE and receiving a second reference signal from the network entity, each differential range-sum is a difference between a range-sum for a refer-ence sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE, wherein the position of the first UE is determined based at least in part on the differential range-sums for the plurality of sidelink UEs.

In one implementation, a first user equipment (UE) con-figured for determining a position of the first UE, the first UE comprising: means for receiving a first reference signal from a network entity; means for sending one or more sidelink reference signals to a plurality of sidelink UEs; means for determining a receive-transmit (Rx-Tx) time difference associated with each sidelink UE, wherein the Rx-Tx time difference associated with each sidelink UE is a time dif-ference between receiving the first reference signal from the network entity and sending the sidelink reference signal to a respective sidelink UE; and means for processing the Rx-Tx time difference associated with each sidelink UE for generating differential range-sums for the plurality of side-link UEs based on the Rx-Tx time differences associated with each sidelink UE and a time difference measured by each sidelink UE, wherein the time difference measured by each sidelink UE is the time difference between receiving the sidelink reference signal from the first UE and receiving a second reference signal from the network entity, each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE, wherein the position of the first UE is determined based at least in part on the differential range-sums for the plurality of sidelink UEs.

In one implementation, a non-transitory storage medium including program code stored thereon, the program code is operable to configure at least one processor in first user equipment (UE) configured for determining a position of the first UE, the program code comprising instructions to: receive a first reference signal from a network entity; send one or more sidelink reference signals to a plurality of sidelink UEs; determine a receive-transmit (Rx-Tx) time difference associated with each sidelink UE, wherein the Rx-Tx time difference associated with each sidelink UE is a time difference between receiving the first reference signal from the network entity and sending the sidelink reference signal to a respective sidelink UE; and process the Rx-Tx time difference associated with each sidelink UE to generate differential range-sums for the plurality of sidelink UEs based on the Rx-Tx time differences associated with each sidelink UE and a time difference measured by each sidelink UE, wherein the time difference measured by each sidelink UE is the time difference between receiving the sidelink reference signal from the first UE and receiving a second reference signal from the network entity, each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE, wherein the position of the first UE is determined based at least in part on the differential range-sums for the plurality of sidelink UEs.

In one implementation, a method performed by a location server for determining a position of a first user equipment (UE), the method includes obtaining differential range-sums for the first UE and a plurality of sidelink UEs based on receive-transmit (Rx-Tx) time difference associated with each sidelink UE measured by the first UE, wherein the Rx-Tx time difference associated with each sidelink UE is a time difference measured by the first UE between receiving a first reference signal from a network entity and sending a sidelink reference signal to a respective sidelink UE, wherein the differential range-sums for the first UE and the plurality of sidelink UEs is further based on time differences measured by the plurality of sidelink UEs, wherein the time difference measured by each sidelink UE is a time difference between receiving the sidelink reference signal from the first UE and receiving a second reference signal from the network entity, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE; and determining the position of the first UE based at least in part on the differential range-sums for the plurality of sidelink UEs.

In one implementation, a location server configured for determining a position of a first user equipment (UE), the location server comprising: an external interface configured to communicate with other entities in a wireless network; at least one memory; and at least one processor coupled to the external interface and the at least one memory and configured to: obtain, via the external interface, differential range-sums for the first UE and a plurality of sidelink UEs based on receive-transmit (Rx-Tx) time difference associated with each sidelink UE measured by the first UE, wherein the Rx-Tx time difference associated with each sidelink UE is a time difference measured by the first UE between receiving a first reference signal from a network entity and sending a sidelink reference signal to a respective sidelink UE, wherein the differential range-sums for the first UE and the plurality of sidelink UEs is further based on time differences measured by the plurality of sidelink UEs, wherein the time difference measured by each sidelink UE is a time difference between receiving the sidelink reference signal from the first UE and receiving a second reference signal from the network entity, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE; and determine the position of the first UE based at least in part on the differential range-sums for the plurality of sidelink UEs.

In one implementation, a location server configured for determining a position of a first user equipment (UE), the location server comprising: means for obtaining differential range-sums for the first UE and a plurality of sidelink UEs based on receive-transmit (Rx-Tx) time difference associated with each sidelink UE measured by the first UE, wherein the Rx-Tx time difference associated with each sidelink UE is a time difference measured by the first UE between receiving a first reference signal from a network entity and sending a sidelink reference signal to a respective sidelink UE, wherein the differential range-sums for the first UE and the plurality of sidelink UEs is further based on time differences measured by the plurality of sidelink UEs, wherein the time difference measured by each sidelink UE is a time difference between receiving the sidelink reference signal from the first UE and receiving a second reference signal from the network entity, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE; and means for determining the position of the first UE based at least in part on the differential range-sums for the plurality of sidelink UEs.

In one implementation, a non-transitory storage medium including program code stored thereon, the program code is operable to configure at least one processor in location server for determining a position of a first user equipment (UE), the program code comprising instructions to: obtain differential range-sums for the first UE and a plurality of sidelink UEs based on receive-transmit (Rx-Tx) time difference associated with each sidelink UE measured by the first UE, wherein the Rx-Tx time difference associated with each sidelink UE is a time difference measured by the first UE between receiving a first reference signal from a network entity and sending a sidelink reference signal to a respective sidelink UE, wherein the differential range-sums for the first UE and the plurality of sidelink UEs is further based on time differences measured by the plurality of sidelink UEs, wherein the time difference measured by each sidelink UE is a time difference between receiving the sidelink reference signal from the first UE and receiving a second reference signal from the network entity, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE; and determine the position of the first UE based at least in part on the differential range-sums for the plurality of sidelink UEs.

In one implementation, a method performed by a location server for determining a position of a first user equipment (UE), the method includes receiving time differences measured by a plurality of sidelink UEs, wherein the time difference measured by each sidelink UE is a time difference between receiving a sidelink reference signal from the first UE and receiving a reference signal from a network entity; and sending the time differences measured by the plurality of sidelink UEs to the first UE for determining the position of the first UE based on the time differences measured by the plurality of sidelink UEs and receive-transmit (Rx-Tx) time difference associated with each sidelink UE, wherein the Rx-Tx time difference associated with each sidelink UE is a time difference measured by the first UE between receiving a second reference signal from the network entity and sending the sidelink reference signal to a respective sidelink UE.

In one implementation, a location server configured for determining a position of a first user equipment (UE), the location server comprising: an external interface configured to communicate with other entities in a wireless network; at least one memory; and at least one processor coupled to the external interface and the at least one memory and configured to: receive, via the external interface, time differences measured by a plurality of sidelink UEs, wherein the time difference measured by each sidelink UE is a time difference between receiving a sidelink reference signal from the first UE and receiving a reference signal from a network entity; and send, via the external interface, the time differences measured by the plurality of sidelink UEs to the first UE for determining the position of the first UE based on the time differences measured by the plurality of sidelink UEs and receive-transmit (Rx-Tx) time difference associated with each sidelink UE, wherein the Rx-Tx time difference associated with each sidelink UE is a time difference measured by the first UE between receiving a second reference signal from the network entity and sending the sidelink reference signal to a respective sidelink UE.

In one implementation, a location server configured for determining a position of a first user equipment (UE), the location server comprising: means for receiving time differences measured by a plurality of sidelink UEs, wherein the time difference measured by each sidelink UE is a time difference between receiving a sidelink reference signal from the first UE and receiving a reference signal from a network entity; and means for sending the time differences measured by the plurality of sidelink UEs to the first UE for determining the position of the first UE based on the time differences measured by the plurality of sidelink UEs and receive-transmit (Rx-Tx) time difference associated with each sidelink UE, wherein the Rx-Tx time difference associated with each sidelink UE is a time difference measured by the first UE between receiving a second reference signal from the network entity and sending the sidelink reference signal to a respective sidelink UE.

In one implementation, a non-transitory storage medium including program code stored thereon, the program code is operable to configure at least one processor in location server for determining a position of a first user equipment (UE), the program code comprising instructions to: receive time differences measured by a plurality of sidelink UEs, wherein the time difference measured by each sidelink UE is a time difference between receiving a sidelink reference signal from the first UE and receiving a reference signal from a network entity; and send the time differences measured by the plurality of sidelink UEs to the first UE for determining the position of the first UE based on the time differences measured by the plurality of sidelink UEs and receive-transmit (Rx-Tx) time difference associated with each sidelink UE, wherein the Rx-Tx time difference associated with each sidelink UE is a time difference measured by the first UE between receiving a second reference signal from the network entity and sending the sidelink reference signal to a respective sidelink UE.

In one implementation, a method performed by a first user equipment (UE) for determining a position of a second UE, the first UE in sidelink communication with the second UE, the method includes receiving a first reference signal from a network entity; receiving a sidelink reference signal from the second UE; and determining a time difference between receiving the sidelink reference signal from the second UE and receiving the first reference signal from the network entity; and processing the time difference between receiving the sidelink reference signal from the second UE and receiving the first reference signal from the network entity for generating differential range-sums for the second UE and a plurality of sidelink UEs including the first UE based on receive-transmit (Rx-Tx) time difference associated with each sidelink UE measured by the second UE, wherein the Rx-Tx time difference associated with each sidelink UE is a time difference measured by the second UE between receiving a second reference signal from the network entity and sending a sidelink reference signal to a respective sidelink UEs, wherein the differential range-sums for the second UE and the plurality of sidelink UEs is further based on time differences measured by the plurality of sidelink UEs, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the second UE and the network entity and a second range between the second UE and the respective sidelink UE, and wherein the position of the second UE is determined based at least in part on the differential range-sums for the plurality of sidelink UEs.

In one implementation, a first user equipment (UE) configured for determining a position of a second UE, the first UE in sidelink communication with the second UE, the first UE comprising: at least one wireless transceiver configured to wirelessly communicate with other entities in a wireless network; at least one memory; and at least one processor coupled to the at least one wireless transceiver and the at least one memory and configured to: receive, via the at least one wireless transceiver, a first reference signal from a network entity; receive, via the at least one wireless transceiver, a sidelink reference signal from the second UE; and determine a time difference between receiving the sidelink reference signal from the second UE and receiving the first reference signal from the network entity; and process the time difference between receiving the sidelink reference signal from the second UE and receiving the first reference signal from the network entity for generating differential range-sums for the second UE and a plurality of sidelink UEs including the first UE based on receive-transmit (Rx-Tx) time difference associated with each sidelink UE measured by the second UE, wherein the Rx-Tx time difference associated with each sidelink UE is a time difference measured by the second UE between receiving a second reference signal from the network entity and sending a sidelink reference signal to a respective sidelink UEs, wherein the differential range-sums for the second UE and the plurality of sidelink UEs is further based on time differences measured by the plurality of sidelink UEs, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the second UE and the network entity and a second range between the second UE and the respective sidelink UE, and wherein the position of the second UE is determined based at least in part on the differential range-sums for the plurality of sidelink UEs.

In one implementation, a first user equipment (UE) configured for determining a position of a second UE, the first UE in sidelink communication with the second UE, the first UE comprising: means for receiving a first reference signal from a network entity; means for receiving a sidelink reference signal from the second UE; and means for determining a time difference between receiving the sidelink reference signal from the second UE and receiving the first reference signal from the network entity; and means for processing the time difference between receiving the sidelink reference signal from the second UE and receiving the first reference signal from the network entity for generating differential range-sums for the second UE and a plurality of sidelink UEs including the first UE based on receive-transmit (Rx-Tx) time difference associated with each sidelink UE measured by the second UE, wherein the Rx-Tx time difference associated with each sidelink UE is a time difference measured by the second UE between receiving a second reference signal from the network entity and sending a sidelink reference signal to a respective sidelink UEs, wherein the differential range-sums for the second UE and the plurality of sidelink UEs is further based on time differences measured by the plurality of sidelink UEs, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the second UE and the network entity and a second range between the second UE and the respective sidelink UE, and wherein the position of the second UE is determined based at least in part on the differential range-sums for the plurality of sidelink UEs.

In one implementation, a non-transitory storage medium including program code stored thereon, the program code is operable to configure at least one processor in first user equipment (UE) for determining a position of a second UE, the first UE in sidelink communication with the second UE, the program code comprising instructions to: receive a first reference signal from a network entity; receive a sidelink reference signal from the second UE; and determine a time difference between receiving the sidelink reference signal from the second UE and receiving the first reference signal from the network entity; and process the time difference between receiving the sidelink reference signal from the second UE and receiving the first reference signal from the network entity for generating differential range-sums for the second UE and a plurality of sidelink UEs including the first UE based on receive-transmit (Rx-Tx) time difference associated with each sidelink UE measured by the second UE, wherein the Rx-Tx time difference associated with each sidelink UE is a time difference measured by the second UE between receiving a second reference signal from the network entity and sending a sidelink reference signal to a respective sidelink UEs, wherein the differential range-sums for the second UE and the plurality of sidelink UEs is further based on time differences measured by the plurality of sidelink UEs, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the second UE and the network entity and a second range between the second UE and the respective sidelink UE, and wherein the position of the second UE is determined based at least in part on the differential range-sums for the plurality of sidelink UEs.

BRIEF DESCRIPTION OF THE FIGURES

Claimed subject matter is particularly pointed out and distinctly claimed in the concluding portion of the specification. However, both as to organization and/or method of operation, together with features and/or advantages thereof, it may best be understood by reference to the following detailed description if read with the accompanying drawings in which:

FIG. 13 shows a flow diagram for an exemplary method for determining a position of a target UE performed by the target UE, in a manner consistent with disclosed implementations.

FIG. 14 shows a flow diagram for an exemplary method for determining a position of a target UE performed by a location server, in a manner consistent with disclosed implementations.

FIG. 15 shows a flow diagram for an exemplary method for determining a position of a target UE performed by a location server, in a manner consistent with disclosed implementations.

FIG. 16 shows a flow diagram for an exemplary method for determining a position of a target UE performed by a sidelink UE, in a manner consistent with disclosed implementations.

Like reference symbols in the various drawings indicate like elements, in accordance with certain example implementations. In addition, multiple instances of an element may be indicated by following a first number for the element with a letter or a hyphen and a second number. For example, multiple instances of an element 210 may be indicated as 210-1, 210-2, 210-3 etc. or as 210*a*, 210*b*, 210*c*, etc. When referring to such an element using only the first number, any instance of the element is to be understood (e.g., element 210 in the previous example would refer to elements 110-1, 210-2, and 210-3 or to elements 210*a*, 210*b*, and 210*c*).

It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

Several illustrative embodiments will now be described with respect to the accompanying drawings, which form a part hereof. While some embodiments in which one or more aspects of the disclosure may be implemented as described below, other embodiments may be used, and various modifications may be made without departing from the scope of the disclosure.

As used herein, an "RF signal" or "reference signal" comprises an electromagnetic wave that transports information through the space between a transmitter (or transmitting device) and a receiver (or receiving device). As used herein, a transmitter may transmit a single "reference signal" or multiple "reference signals" to a receiver. However, the receiver (or different receivers) may receive multiple "reference signals" corresponding to each transmitted RF signal due to the propagation characteristics of RF signals through multipath channels. The same transmitted RF signal on different paths between the transmitter and receiver may be referred to as a "multipath" RF signal.

Figure 1:
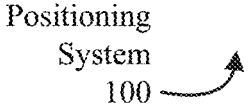
FIG. 1 is a diagram of a positioning system, according to an embodiment.

FIG. 1 is a simplified illustration of a positioning system 100 in which a UE 105, location server 160, and/or other components of the positioning system 100 can use the techniques provided herein for determining an estimated location of UE 105, according to one implementation. The techniques described herein may be implemented by one or more components of the positioning system 100. The positioning system 100 can include a UE 105, one or more sidelink (SL) UEs 105*a*, one or more satellites 110 (also referred to as space vehicles (SVs)) for a Global Navigation Satellite System (GNSS) such as the Global Positioning System (GPS), base stations 120, access points (APs) 130, location server 160, network 170, and external client 180. The UE 105 and SL UE 105*a* may be sometimes generally referred to herein as UE 105 for ease of reference. The positioning system 100 may estimate the location of the UE 105 and/or SL UE 105*a* based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only UE 105 and SL UE 105*a* are illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with Internet-connected devices, including location server 160, using a second communication link 135. Additionally, the UE 105 can send and receive information with sidelink connected devices, such as SL UE 105a directly using a third communication link 137.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." Physical transmission points may comprise an array of antennas (e.g., as in a Multiple Input-Multiple Output (MIMO) system and/or where the base station employs beamforming) of the base station. The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE 105 and a neighbor base station whose reference RF signals the UE 105 is measuring.

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate the location determination. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR radio access by UE 105. In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 (and similarly the estimated location of the SL UE 105a) may be based on measurements of RF signals sent from and/or received by the UE 105 (and similarly the SL UE 105a). In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. Moreover, in some embodiments, location of the UE 105 estimated at least in part based on measurements of RF signals communicated between the UE 105 and one or more other UEs (not shown in FIG. 1), which may be mobile. Direct communication between UEs in this manner may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may also be specified as a geodetic location (as a latitude and longitude) or as a civic location (e.g. in terms of a street address or using other location related names and labels). A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

As previously noted, the example positioning system 100 can be implemented using a wireless communication network, such as an LTE-based or 5G NR-based network. 5G NR is a wireless RF interface undergoing standardization by the 3rd Generation Partnership Project (3GPP). 5G NR is poised to offer enhanced functionality over previous generation (LTE) technologies, such as significantly faster and more responsive mobile broadband, enhanced conductivity through Internet of Things (IoT) devices, and more. Additionally, 5G NR enables new positioning techniques for UEs, including Angle of Arrival (AoA)/Angle of Departure (AoD) positioning, UE-based positioning, and multi-cell Round Trip signal propagation Time (RTT) positioning. With regard to RTT positioning, this involves taking RTT measurements between the UE and multiple base stations.

Figure 2:
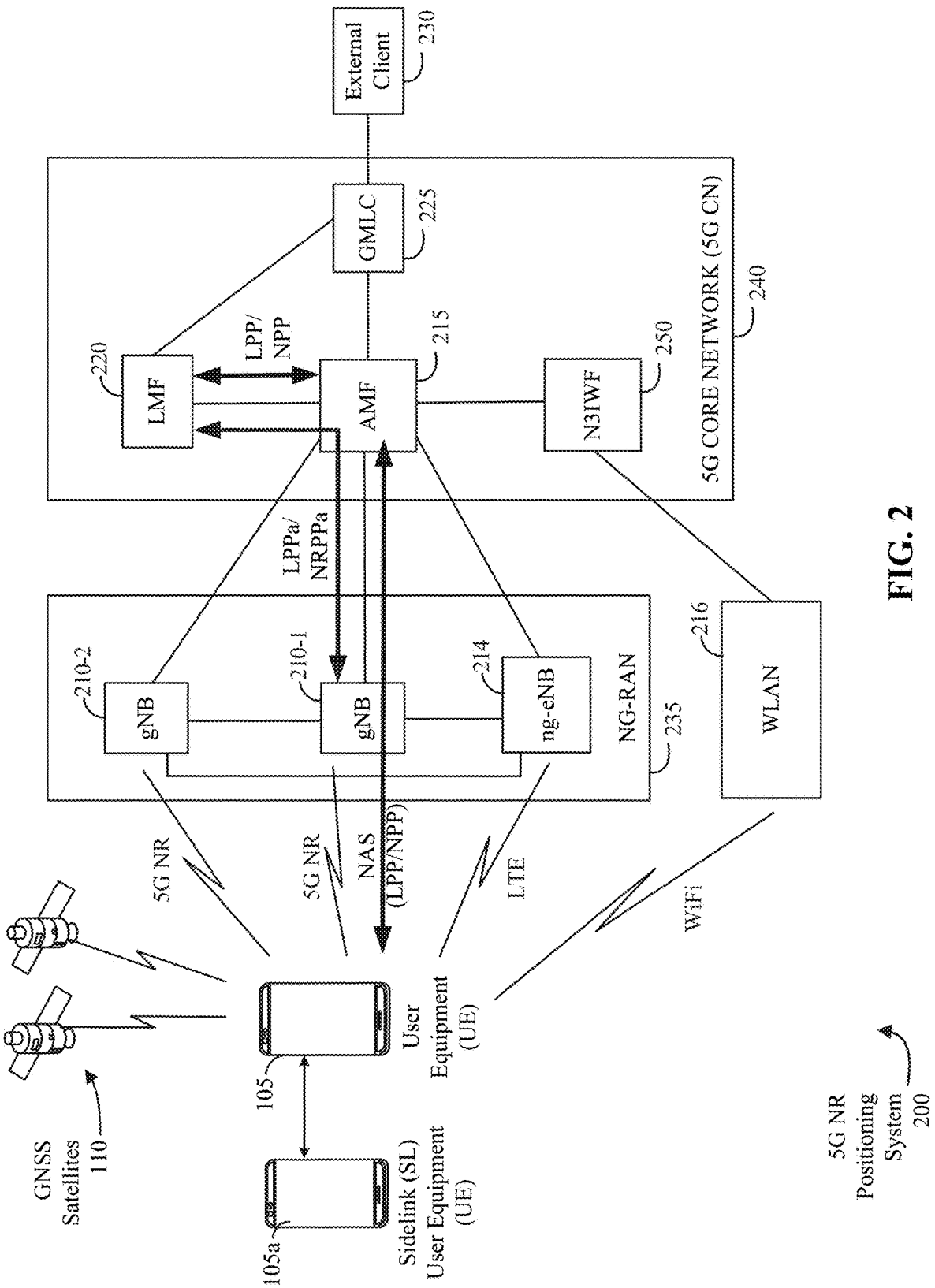
FIG. 2 is a diagram of a 5th Generation (5G) New Radio (NR) positioning system, illustrating an embodiment of a positioning system (e.g., the positioning system of FIG. 1) implemented within a 5G NR communication system.

FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, SL UE 105a, and components 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. Standardization of an NG-RAN and 5G CN is ongoing in 3GPP. Accordingly, NG-RAN 235 and 5G CN 240 may conform to current or future standards for 5G support from 3GPP. The 5G NR positioning system 200 may further utilize information from GNSS satellites 110 from a GNSS system like Global Positioning System (GPS) or similar system. Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only UE 105 and SL UE 105a are illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and Mobility Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long-Term Evolution (LTE), High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225).

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210) and/or an antenna of a gNB. Pairs of gNBs 210 in NG-RAN 235 may be connected to one another (e.g., directly as shown in FIG. 2 or indirectly via other gNBs 210). Access to the 5G network is provided to UE 105 via wireless communication between the UE 105 and one or more of the gNBs 210, which may provide wireless communications access to the 5G CN 240 on behalf of the UE 105 using 5G NR. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate indirectly via another component of the 5G NR positioning system 200, such as the LMF 220.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink and downlink control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250—e.g. if WLAN 216 is a trusted WLAN for 5G CN 240. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information for multiple RATs from the LMF 220, take measurements for one of the multiple RATs (e.g., measurements of the UE 105) and/or obtain measurements from the UE 105 that are transferred to the access node using one or more of the multiple RATs. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5G CN 240 in FIG. 2. The methods and techniques described herein for UE 105 positioning using common or generic positioning procedures may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematics (RTK), Precise Point Positioning (PPP), Differential GNSS (DGNSS), ECID, angle of arrival (AoA), angle of departure (AoD), WLAN positioning, and/or other positioning procedures and methods. The LMF 220 may also process location services requests for the UE 105, e.g., received from the AMF 215 or from the GMLC 225. The LMF 220 may be connected to AMF 215 and/or to GMLC 225. The LMF 220 may be referred to by other names such as a Location Manager (LM), Location Function (LF), commercial LMF (CLMF), or value added LMF (VLMF). In some embodiments, a node/system that implements the LMF 220 may additionally or alternatively implement other types of location-support modules, such as an Evolved Serving Mobile Location Center (E-SMLC) or Service Location Protocol (SLP). It is noted that in some embodiments, at least part of the positioning functionality (including determination of a UE's location) may be performed at the UE 105 (e.g., by processing downlink reference signals, such as DL positioning reference signals (DL-PRS) transmitted by wireless nodes such as gNBs 210, ng-eNB 214 and/or WLAN 216, and/or using assistance data provided to the UE 105, e.g., by LMF 220). The UE 105 may additionally transmit uplink reference signals, sometimes referred to as uplink PRS or UL sounding reference signals (SRS) for positioning, which may be received by wireless nodes such as gNBs 210, ng-eNB 214 and/or WLAN 216 and may be referred to as uplink SRS (UL-SRS) or UL-PRS. The UE 105 may additionally transmit sidelink reference signals that may be received by a sidelink UE 105*a*, such as SL PRS or SL Channel State Information Reference Signal (SL CSI-RS). It should be understood that PRS, SRS, and CSI-RS are examples of reference signals that may be used for positioning, but that other reference signals may be used if desired.

The Gateway Mobile Location Center (GMLC) 225 may support a location request for the UE 105 received from an external client 230 and may forward such a location request to the AMF 215 for forwarding by the AMF 215 to the LMF 220, or may forward the location request directly to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230. The GMLC 225 is shown connected to both the AMF 215 and LMF 220 in FIG. 2 though only one of these connections may be supported by 5G CN 240 in some implementations.

As further illustrated in FIG. 2, the LMF 220 may communicate with the gNBs 210 and/or with the ng-eNB 214 using the LPPa protocol (which also may be referred to as NRPPa or NPPa). LPPa protocol in NR may be the same as, similar to, or an extension of the LPPa protocol in LTE (related to LTE Positioning Protocol (LPP)), with LPPa messages being transferred between a gNB 210 and the LMF 220, and/or between an ng-eNB 214 and the LMF 220, via the AMF 215. As further illustrated in FIG. 2, LMF 220 and UE 105 may communicate using the LPP protocol. LMF 220 and UE 105 may also or instead communicate using an LPP protocol (which, in NR, also may be referred to as NRPP or NPP). Here, LPP messages may be transferred between the UE 105 and the LMF 220 via the AMF 215 and a serving gNB 210-1 or serving ng-eNB 214 for UE 105. For example, LPP and/or LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP and/or LPP protocol may be used to support positioning of UE 105 using UE assisted and/or UE based position methods such as A-GNSS, RTK, OTDOA and/or Enhanced Cell ID (ECID). The LPPa protocol may be used to support positioning of UE 105 using network based position methods such as ECID (e.g., when used with measurements obtained by a gNB 210 or ng-eNB 214) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use LPPa and/or LPP to obtain a location of UE 105 in a similar manner to that just described for UE 105 access to a gNB 210 or ng-eNB 214. Thus, LPPa messages may be transferred between a WLAN 216 and the LMF 220, via the AMF 215 and N3IWF 250 to support network-based positioning of UE 105 and/or transfer of other location information from WLAN 216 to LMF 220. Alternatively, LPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using LPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

With a UE-assisted position method, UE 105 may obtain location measurements and send the measurements to a location server (e.g., LMF 220) for computation of a location estimate for UE 105. Location measurements may include one or more of a Received Signal Strength Indication (RSSI), RTT, Reference Signal Receive Power (RSRP), Reference Signal Received Quality (RSRQ), Time of Arrival (ToA), AoA, Differential AoA (DAoA), AoD, or Timing Advance (TA) for gNBs 210, ng-eNB 214, and/or one or more access points for WLAN 216. The location measurements may also or instead include measurements of RAT-independent positioning methods such as GNSS (e.g., GNSS pseudorange, GNSS code phase, and/or GNSS carrier phase for GNSS satellites 110), WLAN, etc. With a UE-based position method, UE 105 may obtain location measurements (e.g., which may be the same as or similar to location measurements for a UE assisted position method) and may further compute a location of UE 105 (e.g., with the help of assistance data received from a location server such as LMF 220 or broadcast by gNBs 210, ng-eNB 214, or WLAN 216). With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or ToA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

In a 5G NR positioning system 200, some location measurements taken by the UE 105 (e.g., AoA, AoD, ToA) may use RF reference signals received from base stations 210 and 214. These signals may comprise PRS, which can be used, for example, to execute TDOA, AoD, and RTT-based positioning of the UE 105. Other reference signals that can be used for positioning may include Cell-specific Reference Signal (CRS), Channel State Information Reference Signal (CSI-RS), synchronization signals (e.g., Synchronization Signal Block (SSB) Synchronizations Signal (SS)), etc. Moreover, the signals may be transmitted in a Tx beam (e.g., using beamforming techniques), which may impact angular measurements, such as AoD. Additionally or alternatively, the UE 105 may transmit uplink reference signals, such as UL-SRS, which are received by base stations 210 or 214 used for positioning, such as TDOA, AoA, and RTT. The 5G native positioning technologies supported in 5G NR, for example, include DL-only, UL-only and a combination of DL and UL (DL+UL) positioning methods. For example, DL based positioning technologies include DL Time Difference of Arrival (DL-TDOA) and DL Angle of Departure (DL-AoD). UL based positioning technologies include UL Time Difference of Arrival (UL-TDOA) and UL Angle of Arrival (UL-AoA). A combination of DL and UL (DL+UL) based positioning technologies include round-trip time (RTT) with one or more neighboring base stations (multi-RTT). In addition, Enhanced Cell-ID (E-CID) based on radio resource management (RRM) measurements is supported in 5G NR Rel-16. Additionally, or alternatively, the UE 105 may transmit sidelink reference signals, such as SL-PRS, which are received by sidelink UE 105a and used for positioning.

Figure 3:
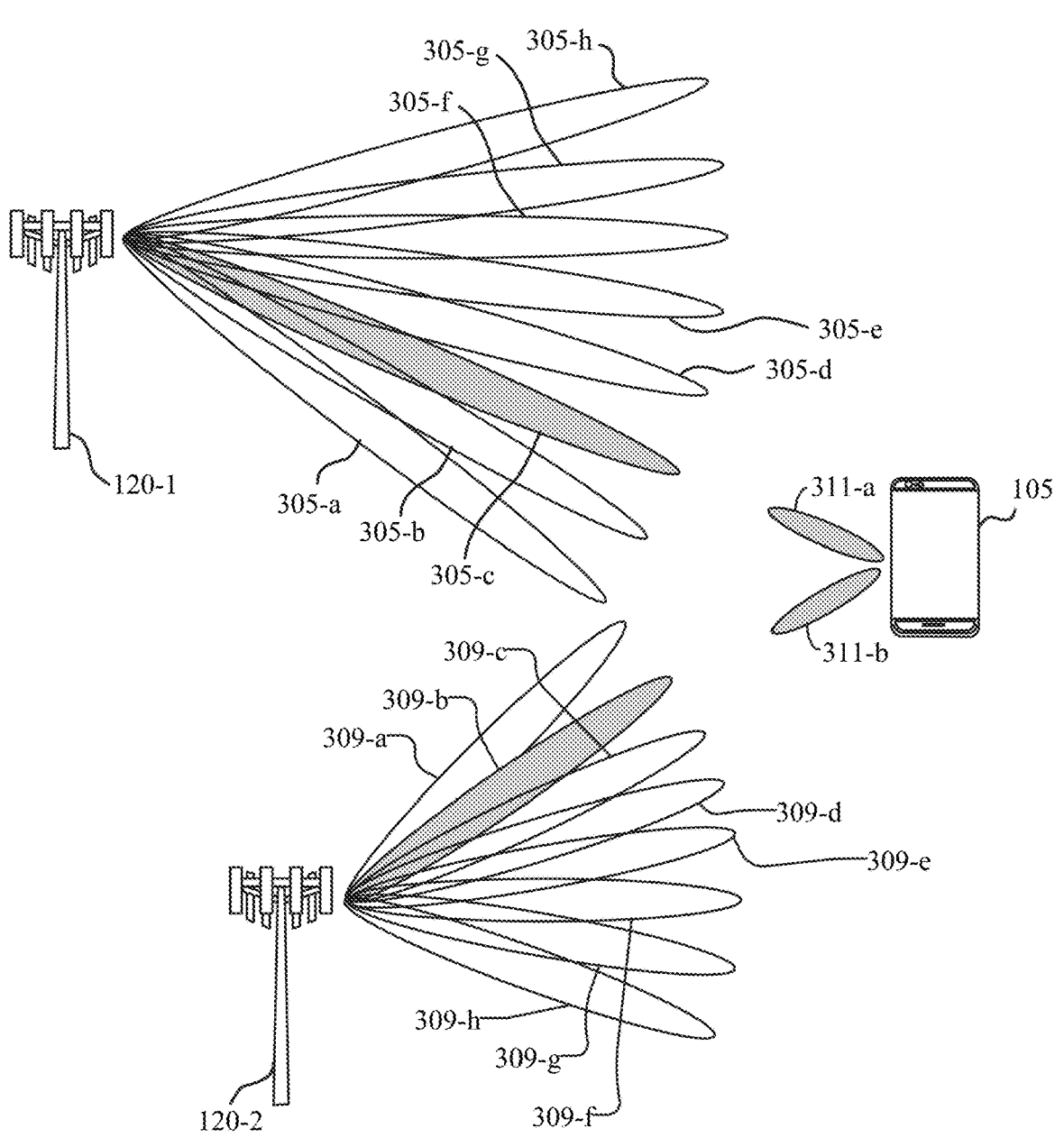
FIG. 3 is a diagram illustrating beamforming in a 5G NR positioning system.

FIG. 3 is a diagram illustrating a simplified environment 300 including two base stations 120-1 and 120-2 (which may correspond to base stations 120 of FIG. 1 and/or gNBs 210 and/or ng-eNB 214 of FIG. 2) producing directional beams for transmitting RF reference signals, and a UE 105. Each of the directional beams is rotated, e.g., through 120 or 360 degrees, for each beam sweep, which may be periodically repeated. Each direction beam can include an RF reference signal (e.g., a PRS resource), where base station 120-1 produces a set of RF reference signals that includes Tx beams 305-a, 305-b, 305-c, 305-d, 305-e, 305-f, 305-g, and 305-h, and the base station 120-2 produces a set of RF reference signals that includes Tx beams 309-a, 309-b, 309-c, 309-d, 309-e, 309-f, 309-g, and 309-h. Because UE 105 may also include an antenna array, it can receive RF reference signals transmitted by base stations 120-1 and 120-2 using beamforming to form respective receive beams (Rx beams) 311-a and 311-b. Beamforming in this manner (by base stations 120 and optionally by UEs 105) can be used to make communications more efficient. They can also be used for other purposes, including taking AoD measurements.

AoD can be measured when a base station 120 uses beam sweeping to transmit reference signals in each of a plurality of directions, using a respective plurality of beams (e.g., beams 309-a through 309-f). By using RSRP measurements of each reference signal at the UE 105, the beam 309 the most aligned with the UE 105 can be identified (as one having the highest value). Additional techniques may be performed to determine an accurate AoD based on the alignment. For UE-based positioning, information regarding each beam 309 (e.g., beam width and boresight) may be provided to the UE 105 to allow the UE to calculate AoD. Alternatively, for UE-assisted positioning, the UE may provide RSRP measurements to a location server 160 (e.g., which may be in NG-RAN 235 or may be LMF 220), which can use the RSRP measurements and beam information to calculate the AoD.

An example of a combination of DL and UL (DL+UL) based positioning technologies is round-trip time (RTT) with one or more neighboring base stations (multi-RTT). In multi-RTT, a UE 105 receives DL reference signals from multiple TRPs, e.g., gNBs 220, and transmits UL reference signals to the multiple TRPs. The UE 105 measures the Rx-Tx for the DL reference signals received from multiple TRPs, e.g., gNBs 220, and the UL reference signals transmitted to the TRPs, and the TRPs measure the Rx-Tx for the UL reference signals received from the UE 105 and the DL reference signals transmitted to the UE 105. The Rx-Tx measurements may be used to determine an RTT between UE 105 and each of the TRPs, which may be used to estimate the location of the UE by the positioning engine, e.g. at the location server 160 (e.g., in NG-RAN 235 or LMF 220) or the UE 105. The two way procedure performed for RTT avoids the need for network synchronization found in DL only or UL only positioning techniques, such as Time Difference of Arrival (TDOA).

Figure 4A:
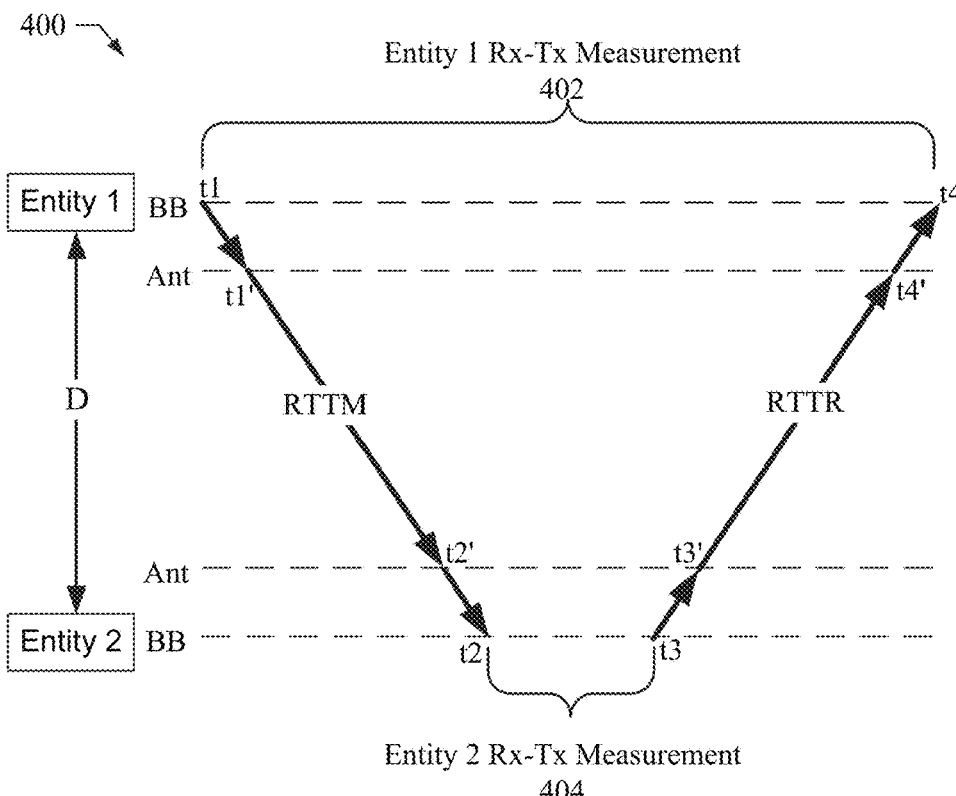
FIG. 4A illustrates a diagram with exemplary timings within Round Trip Time (RTT) measurement during a wireless probe request and a response.

FIG. 4A illustrates a diagram 400 with exemplary timings within RTT measurement during a wireless probe request and a response. In FIG. 4A, a straight line distance D between Entity 1 and Entity 2 is represented vertically, while time is represented horizontally from left to right. Entity 1 and Entity 2 are the initiating entity and responding entity, respectively. For a network centric implementation, Entity 1 may correspond to a TRP (e.g., a base station such as gNB 220) and Entity 2 may correspond to the UE 105. For a UE centric implementation, Entity 1 may correspond to the UE 105 and Entity 2 may correspond to a network node (e.g., a base station such as gNB 220).

To determine the RTT (and hence distance) between Entity 1 and Entity 2, Entity 1 sends an RTT measurement (RTTM) signal at a first time, referred to as "t1." After some propagation time, the Entity 2 detects that the RTTM signal at a second time, referred to as "t2." The Entity 2 takes time to process the received RTTM signal before sending an RTT response (RTTR) signal at a third time, referred to as "t3." After the propagation time, Entity 1 detects that the RTTR signal received at a fourth time, referred to as "t4." Entity 1 performs an Rx-Tx measurement 402 between transmission of the RTTM and reception of the RTTR signals, i.e., t4−t1, while entity 2 performs an Rx-Tx measurement 404 between reception of the RTTM and transmission of the RTTR, i.e., t3−t2. Entity 2 may send the Rx-Tx measurement 404 to Entity 1 (or vice versa) or both may send their respective measurements to a location server. The measured flight time or RTT may be determined as:

$$\text{measured } RTT = (t4-t1) - (t3-t2). \qquad \text{Eq. 1}$$

However, in order to transmit a digital signal, a Tx RF chain (also referred to as an RF front end (RFFE)) at the transmitting device performs a process to convert a digital signal into an RF signal. For example, the transmitting device's Tx RF chain may include a digital-to-analog converter (DAC) to convert the digital signal into a baseband (BB) analog signal, an upconverter to upconvert the baseband signal into an RF signal, and a power amplifier (PA) to amplify the RF signal, which is then radiated from the antenna(s) (Ant) of the transmitting device. Similarly, the receiving device may include an Rx RF chain to perform a reverse process to retrieve the original digital signal from the arriving RF signal. For example, the receiving device's Rx RF chain may include a filter (e.g., low pass, high pass, band pass) to filter the RF signal received by the antenna(s) (Ant) of the receiving device, a low noise amplifier (LNA) to amplify the filtered RF signal, a downconverter to down convert the filtered RF signal into the baseband (BB) signal, and an analog-to-digital (ADC) converter to recover the digital signal from the baseband (BB) signal.

The process performed by the transmitting device's Tx RF chain to convert the digital signal into the RF signal takes a finite amount of time (generically referred to as "Tx group-delay"). The reverse process performed by the receiving device's Rx RF chain to recover the digital signal from the RF signal also takes a finite amount of time (generically referred to as "Rx group-delay").

Thus, as illustrated in FIG. 4A, the times t1, t2, t3, and t4 are the times as measured by the Entity 1 and Entity 2 in the digital domain, while the RTTM signal actually leaves the antenna (Ant) of Entity 1 at some time after t1, referred to as "t1'," and arrives at the antenna (Ant) of Entity 2 at some time before t2, referred to as "t2'." Also, the RTTR signal leaves the antenna (Ant) of Entity 2 at some time after t3, referred to as "t3'," and arrives at the antenna (Ant) of Entity 1 at some time before t4, referred to as "t4'." The Tx group-delay is illustrated as the delay between the measured transmission time of a signal and the actual time of the signal leaving the antenna (e.g., t1'-t1 for Entity 1 and t3'-t3 for Entity 2), while the Rx group-delay is illustrated as the delay between actual time of the signal arriving at the antenna and the measured reception time of the signal (e.g., t2-t2' for Entity 2 and t4-t4' for Entity 1). Thus, the actual flight time or RTT is as follows:

$$\text{actual RTT}=(t4'-t1')-(t3'-t2'). \qquad \text{Eq. 2}$$

The distance D between a transmitter and receiver may be determined from the measured RTT based on the speed of radio waves (i.e., the speed of light c), e.g., as D=(measured RTT/2)*c. Using measured RTT from multiple base stations (e.g., multi-cell RTT), and known locations of the base stations, the position of the UE may be determined using multilateration.

However, as illustrated in FIG. 4A, the measured RTT may differ from the actual RTT due to group-delays, and consequently, position determination of a UE using RTT, e.g., using multi-cell RTT, may suffer from group-delay related errors.

Figure 4B:
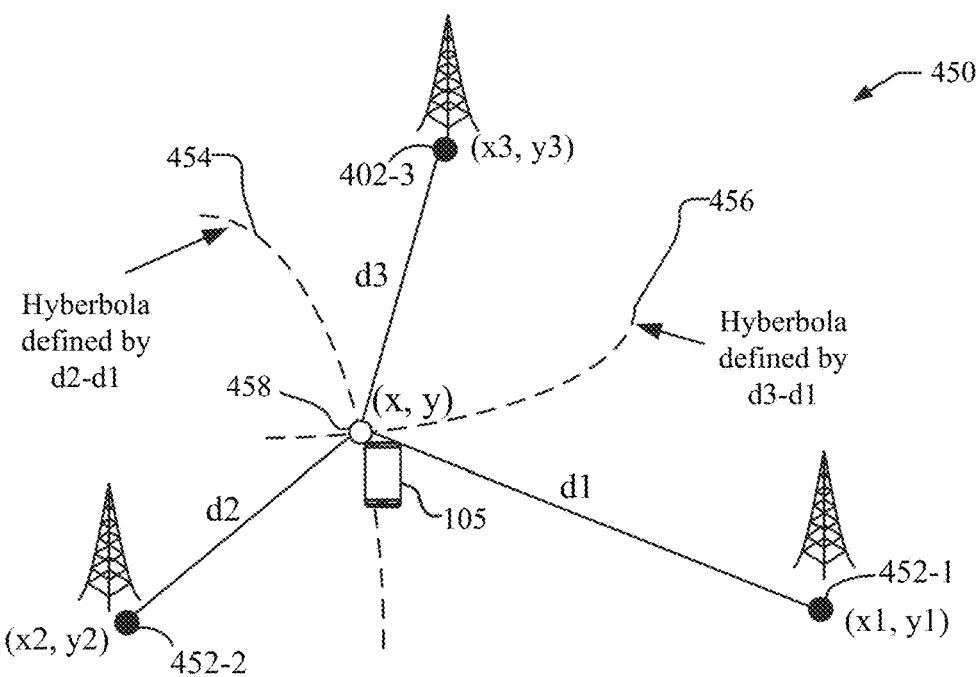
FIG. 4B illustrates a simplified environment and an exemplary technique for determining a position of a UE using a differential scheme to remove UE based group-delay related errors.

FIG. 4B illustrates a simplified environment 450 and an exemplary technique for determining a position of a UE 105 using a differential scheme to remove UE based group-delay related errors. FIG. 4B, for example, illustrates the use of differential RTT measurements to eliminate the UE based group-delay errors in the position determination. With differential RTT, RTT measurements may be performed to generate ranges between the UE 105 and each of the base stations 452-1, 452-2, and 452-3 (sometimes collectively referred to as base stations 452), e.g., illustrated in FIG. 4B as d1, d2, and d3, respectively. As discussed above, however, the ranges d1, d2, and d3 are based on the measured RTT and not the actual RTT, which differ due to group-delays. The differences in the measured RTT (or equivalently the determined ranges) cancels out the UE based group-delay, and thus, may be used for positioning when uncalibrated UE based group-delays may be present.

A differential RTT for base stations 452-1 and 452-2 in FIG. 4B is based on the difference between the RTT measured for reference base station 452-1 and base station 452-2 (e.g., equivalent to the difference between ranges d1 and d2, respectively) and locates the UE 105 on a hyperbola 554 illustrated in FIG. 4B. A similar determination of the difference between the RTT measured for reference base station 452-1 and base station 452-3 (e.g., equivalent to the difference between ranges d1 and d3, respectively) and locates the UE 105 on a hyperbola 556 illustrated in FIG. 4B. The hyperbolas 554 and 556, for example, may be determined as the set of all the points that have the same difference between the RTT measurements to each focus, i.e., the known locations of the base stations. The intersection of the two hyperbolas at the point 558 in FIG. 4B may then be used to determine a two-dimensional position of the UE 105 (though typically more hyperbolas would be obtained from RTT measurements for more pairs of base stations to remove ambiguity and reduce error in the location of UE 105). In the case of three-dimensional positioning, the hyperbola is replaced by the hyperboloid surface obtained by revolving the hyperbola around the axis passing through the foci, and the UE's position is obtained as the intersection of these hyperboloids.

The use of differential RTT builds robustness to group-delay variation by sacrificing one observation, e.g., the reference RTT measurement, because the differential RTT uses the difference between RTTs (or equivalently the ranges) as opposed to absolute ranges. The loss of one observation (the reference RTT measurement) to reduce errors from the UE based group-delay may be acceptable depending on the number of separate RTT measurements are available. The use of a differential scheme may be selected by the positioning engine, e.g., in the UE 105 or a location server 160, e.g., which may be in the NG-RAN 235 or may be LMF 220, e.g., based on whether group-delays in the UE have been calibrated. For example, with UE-based positioning, the UE 105 may select a differential scheme if the group-delay in the UE has not been calibrated. In a UE assisted positioning (e.g., the position engine is located in the gNB or location server), the UE may indicate whether the group-delay in the UE has been calibrated, and the positioning engine may select a differential scheme if the group-delay in the UE has not been calibrated.

Network-based positioning of a UE, such as RTT or differential RTT discussed above may often require the UE to communicate with a plurality of base stations. In RTT-based positioning, for example, RTT measurements can involve transmitting and receiving wireless reference signals with multiple base stations, and further reporting Rx-Tx time difference measurements to a serving base station. With many types of UEs, such as mobile phones, the power requirements of RTT-based positioning may not be an issue. However, with "light" UEs, which typically have a much tighter power budget, these types of communications can be problematic.

As used herein, the term "light" or "low-tier" UE or device refers to a wireless device having a relatively low operating bandwidth, as compared with a "premium" UE or device, which has a relatively high operating bandwidth. Light UEs may also be called "reduced-capability" UEs. For reduced-capability devices in 5G NR, 3GPP is developing "NR Light" standards that allow for NR devices with reduced complexity and energy consumption to meet the higher latency and data rate acquirements in a 5G NR environment (as compared with narrowband IoT (NB-IoT) or LTE-M in and LTE environment). As such, references to light or low tier UEs, which may sometimes be referred to as RedCap UE or devices herein may refer to 5G NR devices using NR Light, and references to premium UEs or devices herein may refer to 5G NR devices using standard NR. Examples of light UEs can include wearable devices (e.g., smart watches), relaxed/narrowband IoT devices, low-end mobile phones, and the like. The current operating bandwidth of these devices is roughly 5-20 megahertz (MHz), although some low-tier UEs may have a higher or lower operating bandwidth. Examples of premium UEs may comprise high-end mobile phones (e.g., smart phones), tablets, vehicles, and the like. Premium UEs currently operate at a bandwidth of 100 MHz or more. Generally speaking, light UEs have a relatively lower bandwidth (e.g., less than 100 MHz), lower processing capabilities, and/or lower power budgets than premium UEs.

As noted, network-based positioning often requires communication with multiple base stations. For example, high-accuracy positioning determinations (e.g. with an accuracy of 3 m or less) often require multi-RTT, in which RTT measurements are made between a UE and multiple base stations. However, the power requirements of communicating with multiple base stations can often be burdensome to light UEs. Moreover, light UEs may be incapable of obtaining reference signals (e.g., PRS) from multiple base stations due to antenna loss, low bandwidth, fewer antennas, and reduced baseband capabilities, compared with premium UEs. Additionally, light UEs have a reduced transmit power, which can result in a lower quality uplink (UL) measurement at the base station of an RF signal transmitted by a light UE.

To reduce power demands on the UE, techniques may be used in which the position of a light UE may be determined with high accuracy using fewer base stations, e.g., a single base station. This is accomplished by leveraging one or more premium UEs having known locations. Such positioning techniques may use UE-assisted and UE-based positioning.

Figure 5:
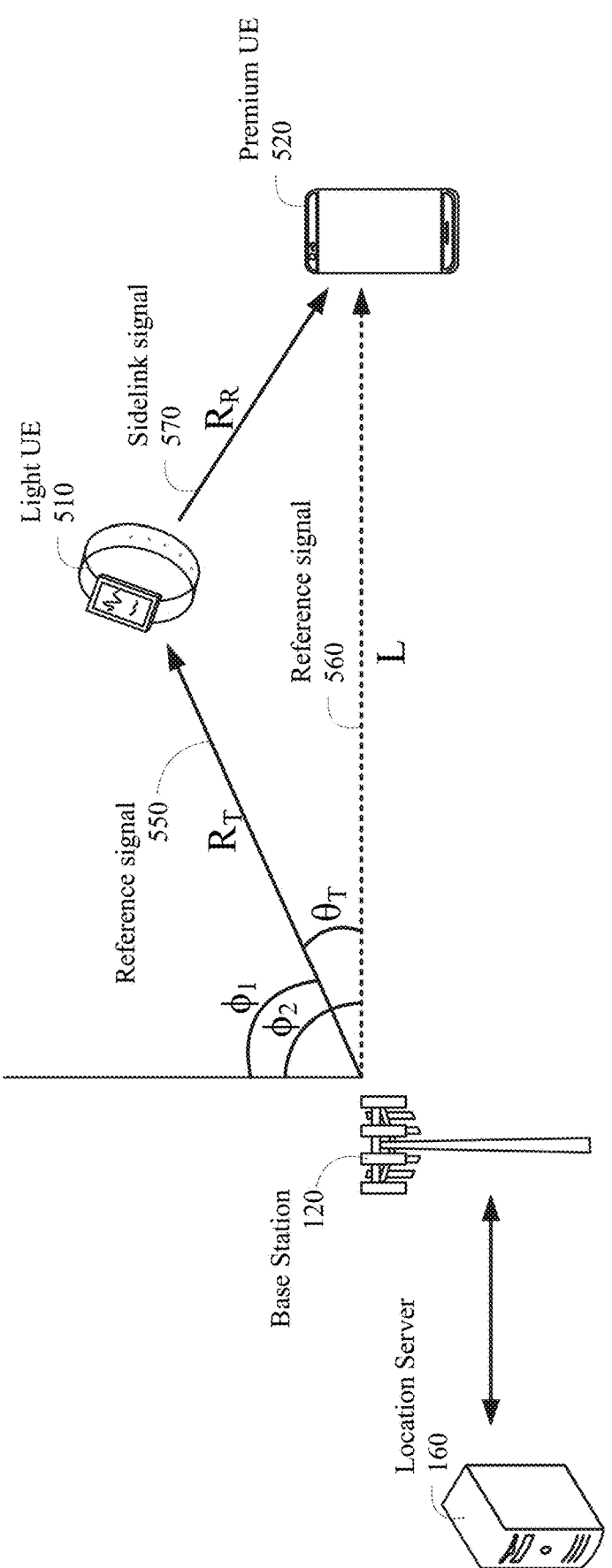
FIG. 5 is a simplified diagram illustrating position determination of a target UE may be made using a single base station and single sidelink UE using a range-sum.

FIG. 5 is a simplified diagram illustrating a network-based position determination of a light UE 510 using a single base station 120 (e.g., the serving base station of the light UE 510 and/or premium UE 520). Positioning of the light UE 510 is accomplished using communications between the light UE 510 and a premium UE 520, where both light UE 510 and premium UE 520 receive reference signals 550, 560 from the base station 120. This positioning may be facilitated with the use of a location server 160, e.g., in the NG-RAN 235 or the LMF 220.

The position of the light UE 510 can be determined mathematically by solving for the distance, $R_T$, of the light UE 510 from the base station 120, as well as a differential angle $\theta_T$, which is the difference between AoD $\phi_2$ and AoD $\phi_1$, which are the AoD of the premium UE 520 and the light UE 510, respectively (i.e., $\theta_T = \phi_2 - \phi_1$). It can be noted that the baseline from which the AoDs $\phi_1$ and $\phi_2$ are measured may be measured from true north or based on any coordinate system used by the network for positioning (e.g., geographical coordinates, East-North-Up (ENU), etc.). Solving for these two variables can be accomplished with the help of the premium UE 520, which can measure a reference signal 560, as well as a sidelink signal 570 provided by the light UE 510 in response to the light UE receiving reference signal 550.

The distance $R_T$ can be determined based on a time difference at the premium UE 520 of receiving the reference signal 560 and sidelink signal 570. Where $R_{sum}$ is the combined distance of distance $R_T$ and the distance, $R_R$, between the light UE 510 and premium UE 520, then solving for $R_T$ results in the following expression:

$$R_T = R_{sum} - R_R. \qquad \text{Eq. 3}$$

If L is defined as the distance between the base station 120 and premium UE 520, then equation 3 can be modified as follows:

$$R_T = \frac{R_{sum}^2 - L^2}{2(R_{sum} - L * \cos(\phi_2 - \phi_1))}. \qquad \text{Eq. 4}$$

Because the location of the premium UE 520 is known (or can be determined beforehand), distance L and angle $\theta_R$ can be obtained based on this premium UE location and the known location of the base station 120 (e.g., from an almanac of base station locations stored by the location server 160 and/or premium UE 520). Additionally, $\theta_T$ can be determined from an AoD measurement of a reference signal transmitted by the base station 120 (which may be different than the reference signal 550 used to determine distance $R_T$).

The AoD $\theta_T$, for example, from the base station 120 may be determined based on RSRP measurements reported by the light UE 510. Thus, once $R_{sum}$ is determined, range $R_T$ can be determined using equation 4.

To solve for $R_{sum}$, embodiments can determine differences in times at which the reference signal 550 is received at the light UE 510 and reference signal 560 is received at premium UE 520. The sidelink signal 570 sent from the light UE 510 to the premium UE 520 can be triggered by the receipt of the reference signal 550 at the light UE 510, and a time at which the reference signal 550 is received at the light UE 510 can be relayed to the premium UE 520 using a sidelink connection as well. An illustration of this is provided in FIG. 6.

Figure 6:
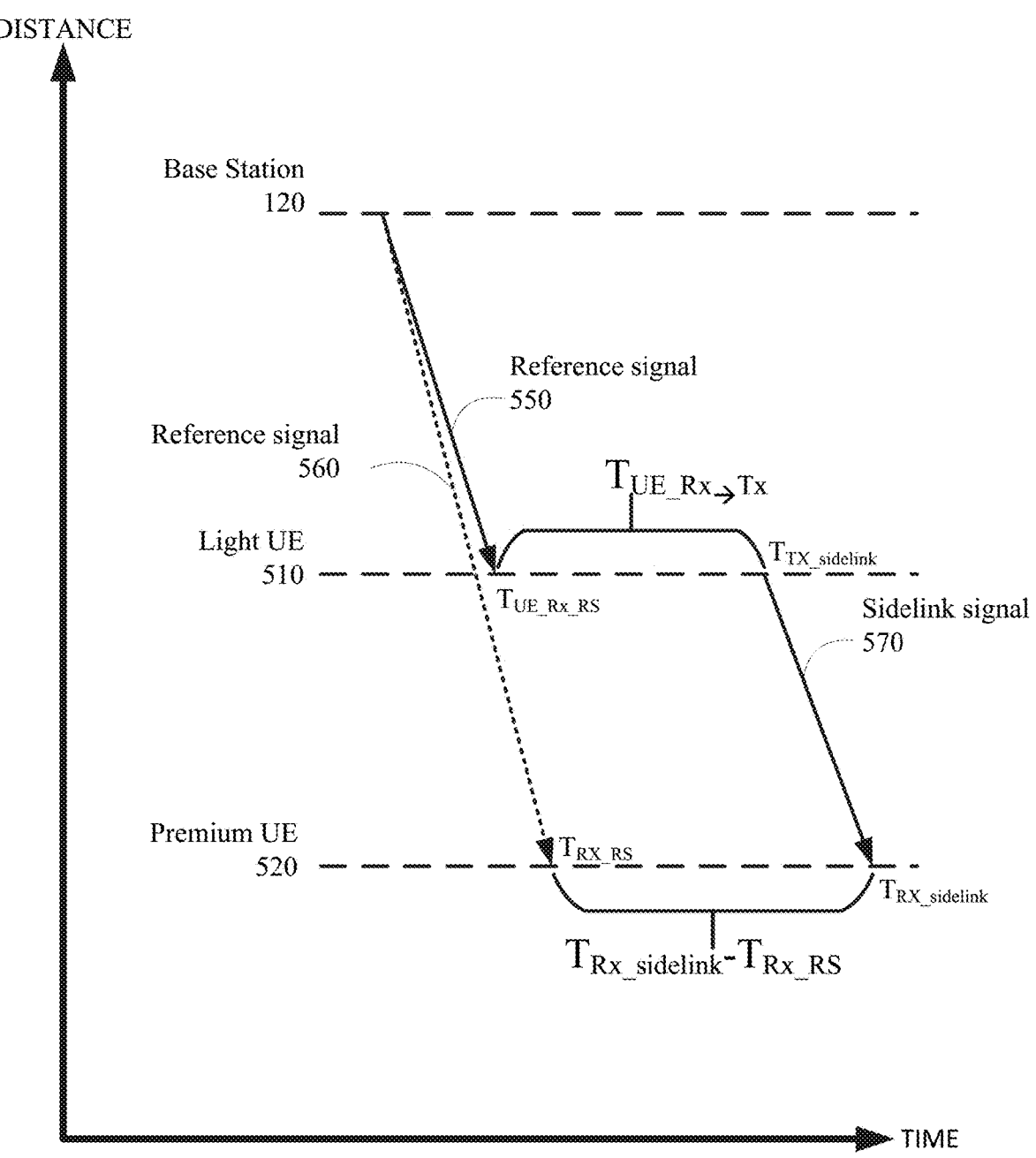
FIG. 6 is a time-distance diagram illustrating the timing to determine the position of the target UE in a network configuration shown in FIG. 5.

FIG. 6 is a time-distance diagram illustrating how timing can be used to determine $R_{sum}$ in the configuration shown in FIG. 5, according to an embodiment. Here, a base station 120 transmits reference signals 550 and 560 (e.g., a DL-PRS), which our received by both the light UE 510 (which receives reference signal 550 first) and the premium UE 520. The different angles of reference signals 550 and 560 in FIG. 6 reflect the different paths of reference signals 550 and 560 in FIG. 5.

As explained in further detail below, reference signal 550 and reference signal 560 may comprise the same or different reference signals. (Because reference signals 550 and 560 in FIG. 6 are illustrated as being transmitted at the same time, this would be reflective of transmission of a single reference signal. But embodiments are not so limited.) The location server 160 may coordinate the transmission and measurement of the reference signal(s) by providing information to the base station 120 regarding how to transmit the reference signal(s), as well as information to the light UE 510 and premium UE 520 regarding when to measure the reference signal(s).

Because reference signals travel at approximately the speed of light, c, the value for R sum can be determined from:

$$R_{sum} = (T_{Rx\_sidelink} - T_{Rx\_RS} - T_{UE\_Rx \to Tx}) * c + L, \qquad \text{Eq. 5}$$

where $T_{Rx\_sidelink}$ is the time (ToA) at which the sidelink signal 570 is received by the premium UE, $T_{Rx\_RS}$ is the time (ToA) at which the reference signal 560 is received by the premium UE, and $T_{UE\_Rx \to Tx}$ is the Time difference between the time (ToA) at which the light UE 510 receives the reference signal 550 ($T_{UE\_Rx\_RS}$) and the time at which the light UE 510 transmits (i.e., the time of departure (ToD) the sidelink signal 570 ($T_{Tx\_sidelink}$). With the value of $R_{sum}$, distance $R_T$ can be determined from equation 4 above, and the position of the light UE 510 can be determined based on distance $R_T$, angle $\theta_T$, and the position of the base station 120. Because the value of R sum is based on a difference between times at which the light UE 510 and premium UE 520 receive the reference signals 550 and 560, no synchronization is required between the light UE 510, premium UE 520, or base station 120 to perform the positioning of the light UE 510 using the techniques described herein.

Figure 7A:
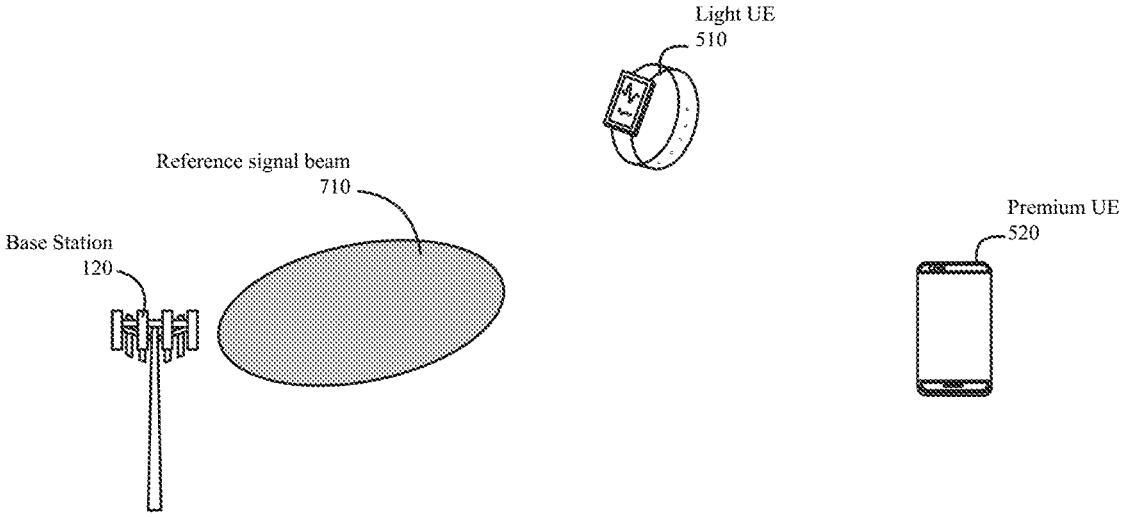
FIGS. 7A and 7B are diagrams of a base station, target UE, and sidelink UE, showing different configurations of beams that may be used for positioning.
Figure 7B:
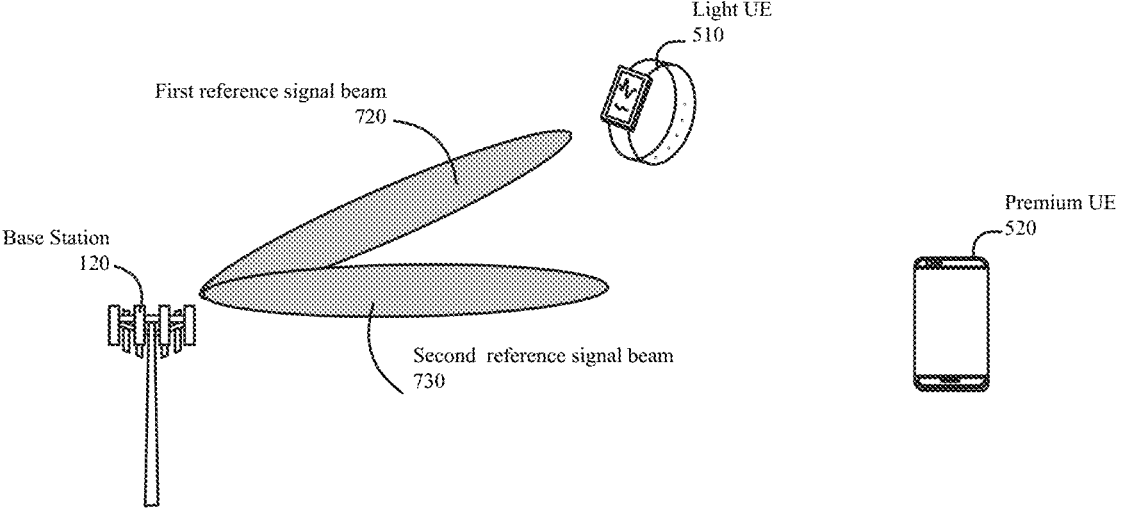

As noted, depending on desired functionality, a single reference beam may be used for the determination of distance $R_{sum}$ as described in relation to FIGS. 5 and 6. FIGS. 7A and 7B illustrate an example of this.

FIGS. 7A and 7B are diagrams of a base station 120, light UE 510, and premium UE 520 similar to those shown in FIG. 5, provided to illustrate how beams may be used differently in different embodiments and/or situations, depending on desired functionality. In FIG. 7A, for example, a single reference signal beam 710 is wide enough to be received by both light UE 510 and premium UE 520, allowing it to be used in the previously-described process regarding determining $R_{sum}$. As can be seen, whether the reference signal beam 710 is sufficiently wide may depend not only on the width of the reference signal beam, but also how close the light UE 510 and the premium UE 520 are to each other. (In some instances, for example, the light UE 510 and premium UE 520 may be sufficiently close such that a relatively narrow beam—as illustrated in FIG. 7B, for example—may be used by both the light UE 510 and premium UE 520.) In FIG. 7B, however, the light UE 510 is aligned with a first reference signal beam 710, and a premium UE 520 is more aligned with a second reference signal beam 730. In such instances, even if the premium UE 520 is capable of detecting both first reference signal beam 720 and a second reference signal beam 730, it may be preferable for the premium UE 520 to take a ToA measurement of the second reference signal beam 730, rather than the first reference signal beam 720 (e.g., due to more favorable SNR values to take a ToA measurement). Although reference signal beams 720, 730 may be transmitted at different times, because the time difference in the transmission of first reference signal beam 720 and the second reference signal beam 730 is known, this time difference can be accounted for in equation 5, allowing for the determination of $R_{sum}$ in cases where different reference signal beams transmitted at different times are used.

Thus, the position of the light UE 510 can be determined based on distance $R_T$, angle $\theta_T$, and the position of a base station 120. This technique does not require the transmission of an UL reference signal from the light UE 510 to the base station 120, which is efficient for a power limited UE, such as light UE 510. Moreover, similar to RTT based positioning, there is no requirement for network synchronization. Further, positioning is achieved using a single base station, which is advantageous for situations with limited cell coverage, e.g., which is a potential scenario for NR Light UE positioning.

In the positioning technique illustrated in FIG. 5, the light UE 510 is required to report its Rx-Tx time difference between receiving the reference signal 550 and transmitting the sidelink signal 570, i.e., $T_{UE\_Rx\rightarrow Tx}$, illustrated in FIG. 6. Accordingly, similar to the RTT based technique discussed in FIG. 4A, the hardware group-delay in the light UE 510 may impact positioning performance, particularly, if the UE group-delay is not well calibrated. In particular, in some cases, the group-delay calibration capability may be reduced due to lower operation bandwidth and lower cost UE implementation, which may impact UE positioning based on the single base station technique illustrated in FIG. 5.

Figure 8:
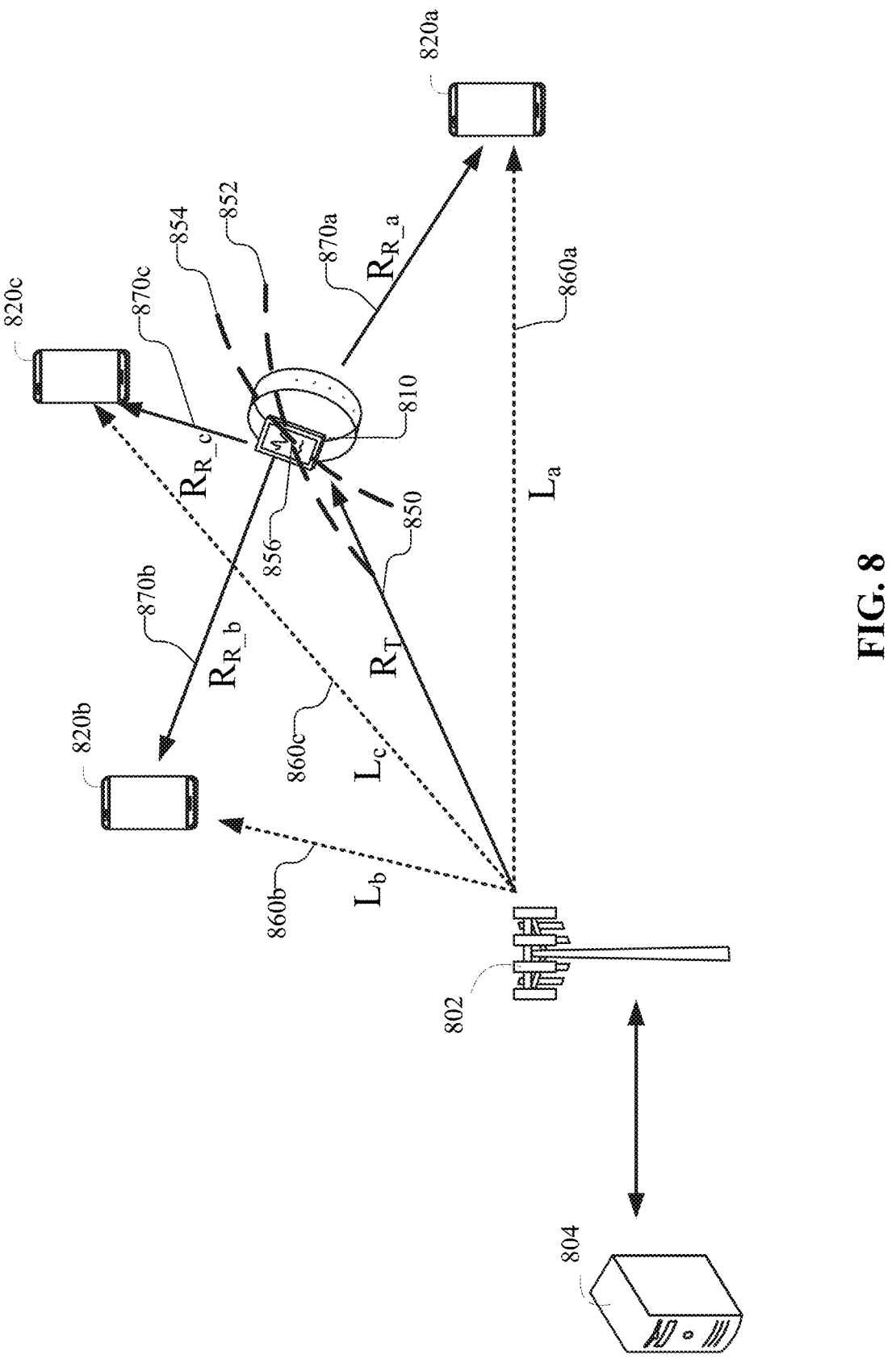
FIG. 8 is a simplified diagram illustrating position determination of a target UE using a single base station and a plurality of sidelink UEs using differential range-sums.

The positioning method illustrated in FIG. 5, however, may be extended to the case with multiple anchor UEs, where multiple sidelink signals are transmitted between the light UE and the multiple anchor UEs (e.g., premium UEs) to enable time-domain measurement-based UE positioning. To overcome UE group-delay issues, a differential $R_{sum}$ approach may be used FIG. 8 is a simplified diagram illustrating a network-based position determination of a target UE 810 using a single base station 802, and which is similar to that shown in FIG. 5, but uses and a plurality of sidelink UEs 820a, 820b, and 820c (sometimes collectively referred to as sidelink UEs 820, or sidelink UE 820i, where i=a, b, and c). The target UE 810 may be, e.g., UE 105 or 105a shown in FIGS. 1 and 2, and in some implementations may be a light UE.

The sidelink UEs 820 serve as anchor UEs and may be, e.g., UE 105a or 105 shown in FIGS. 1 and 2, and in some implementations may be a premium UE. The base station 802 may be, e.g., an eNB or gNB, such as gNB 210 or ng-eNB 214 shown in FIG. 2. In some implementations, an access point, such as access point 130 shown in FIG. 1, may be used in place of base station 802. Positioning of the target UE 810 is accomplished using one or more reference signals transmitted by the base station 802 and received by the target UE 810 (e.g., reference signal 850) and received by sidelink UEs 820 (e.g., reference signals 860a, 860b, and 860c (sometimes collectively referred to as reference signals 860 or reference signals 860i, where i=a, b, and c)), and sidelink communications between the target UE 810 and the sidelink UEs 820. The position determination of the target 810 may be facilitated with the use of a location server 804, e.g., in the NG-RAN 235 or the LMF 220.

In operation, the positioning technique illustrated in FIG. 8 is similar to that shown in FIG. 5, but uses multiple anchor UEs (sidelink UEs 820). For example, the base station 802 transmits one or more reference signals 850 and 860, e.g., DL PRS, which are received by the target UE 810 and each of the sidelink UEs 820. In response to receiving the reference signal 850, the target UE 810 transmits one or more sidelink reference signals 870a, 870b, and 870c to the sidelink UEs 820a, 820b, and 820c, respectively. The sidelink reference signals 870a, 870b, and 870c (sometimes collectively referred to as sidelink reference signals 870 or sidelink reference signals 870i, where i=a, b, and c) may comprise the same or different sidelink reference signals, and may be, e.g., SL-PRS.

The target UE 810 measures multiple Rx-Tx time differences, e.g., $T_{UE\_Rx\rightarrow Tx\_a}$, $T_{UE\_Rx\rightarrow Tx\_b}$, $T_{UE\_Rx\rightarrow Tx\_c}$ between the reception (i.e., the measured ToA) of the reference signal 850 and the transmission (i.e., the measured ToD) of each of the sidelink reference signals 870a, 870b, and 870c, respectively. The target UE 810 may report the Rx-Tx time differences (e.g., $T_{UE\_Rx\rightarrow Tx\_i}$, where i=a, b, and c) to the location server 804 or may retain the Rx-Tx time differences ($T_{UE\_Rx\rightarrow Tx\_i}$) for further processing. In each Rx-Tx time difference ($T_{UE\_Rx\rightarrow Tx\_i}$) report, the target UE 810 may include the TRP ID, reference signal ID (e.g., PRS ID), the sidelink reference signal ID (e.g., SL-PRS ID), the UE ID that transmitted the sidelink reference signal, and the UE ID that received the corresponding sidelink reference signal. The target UE 810 may further include a time stamp associated with each Rx-Tx time differences ($T_{UE\_Rx\rightarrow Tx\_i}$) in the report.

The sidelink UEs 820 receive the reference signals 860 from the base station 802 and the sidelink reference signals 870 from the target UE 810. Each sidelink UE 820a, 820b, 820c measures the time difference between the reception of the reference signal 860 and sidelink reference signal 870, e.g., $T_{Rx\_sidelink\_a}-T_{Rx\_RS\_a}$, $T_{Rx\_sidelink\_b}-T_{Rx\_RS\_b}$, $T_{Rx\_sidelink\_c}-T_{Rx\_RS\_c}$, respectively. The sidelink UEs 820 may report the measured time differences (e.g., $T_{Rx\_sidelink\_i}-T_{Rx\_RS\_i}$, where i=a, b, and c) to the location server 804 or to the target UE 810. In the measured time difference (e.g., $T_{Rx\_sidelink\_i}-T_{Rx\_RS\_i}$) report, each sidelink UEs 820 may include the TRP ID, reference signal ID (e.g., PRS ID), the sidelink reference signal ID (e.g., SL-PRS ID), the UE ID that transmitted the sidelink reference signal, and the UE ID that received the corresponding sidelink reference signal. Each sidelink UEs 820 may further include a time stamp associated with measured time difference (e.g., $T_{Rx\_sidelink\_i}-T_{Rx\_RS\_i}$) in the report.

The position of the target UE 810 can be determined mathematically based on the differences between the range-sums $R_{sum}$ for the plurality of sidelink UEs 820. Each range-sum $R_{sum\_i}$, wherein i=a, b, and c, is the combined distance of distance $R_T$ between the base station and the target UE 810 and the distance, $R_{R\_i}$, between the target UE 810 and sidelink UE 820$i$, e.g., $$R_{sum\_i} = R_T + R_{R\_i}.$$  Eq. 6

The range-sum $R_{sum\_i}$ can be determined based on the Rx-Tx time differences $(T_{UE\_Rx \to Tx\_i})$ measured by the target UE 810 and the measured time difference (e.g., $T_{Rx\_sidelink\_i} - T_{Rx\_RS\_i}$) measured by each of the sidelink UEs 820. Because reference signals travel at approximately the speed of light, c, the value for the range-sum $R_{sum\_i}$ can be determined from:

$$R_{sum\_i} = (T_{Rx\_sidelink\_i} - T_{Rx\_RS\_i} - T_{UE\_Rx \to Tx\_i})^* c + L_i,$$  Eq. 7 where $T_{Rx\_sidelink\_i}$ is the time (ToA) at which the sidelink signal 870$i$ is received by the sidelink UE 820$i$, $T_{Rx\_RS\_i}$ is the time (ToA) at which the reference signal 860$i$ is received by the sidelink UE 820$i$, $T_{UE\_Rx \to Tx\_i}$ is the time difference between the time (ToA) at which the target UE 810 receives the reference signal 850 and the time at which the target UE 810 transmits the sidelink signal 870$i$, and $L_i$ is the distance between base station 802 and the sidelink UE 820$i$, which is known (or can be determined beforehand).

In one implementation, each range-sum $R_{sum\_i}$ can be determined by the location server 804, e.g., where the target UE 810 reports the Rx-Tx time differences (e.g., $T_{UE\_Rx \to Tx\_i}$) and each sidelink UE 820 reports the time differences $(T_{Rx\_sidelink\_i} - T_{Rx\_RS\_i})$ to the location server 804. In another implementation, each range-sum $R_{sum\_i}$ can be determined by the target UE 810, e.g., each sidelink UE 820 reports the time differences $(T_{Rx\_sidelink\_i} - T_{Rx\_RS\_i})$ either to the target UE 810 through sidelink communications or to the target UE 810 via a network node, such as the base station 802 or the location server 804.

Differential range-sums $R_{sum\_diff}$ may be determined for the plurality of the sidelink UEs 820 based on the Rx-Tx time differences (e.g., $T_{UE\_Rx \to Tx\_i}$) measured by the target UE 810 and the time differences $(T_{Rx\_sidelink\_i} - T_{Rx\_RS\_i})$ measured by the sidelink UEs 820$i$.

Each differential range-sums $R_{sum\_diff\_j}$ is a difference between a range-sum for a reference sidelink UE $(R_{sum\_Ref})$ from the plurality of sidelink UEs 820 and a range-sum for another sidelink UE $(R_{sum\_j}$, where j represents each of the remaining sidelink UEs in the plurality of sidelink UEs), $$R_{sum\_diff\_j} = R_{sum\_Ref} - R_{sum\_j}$$  Eq. 8

For example, treating sidelink UE 820$a$ as the reference sidelink UE, a differential range-sum $R_{sum\_diff\_b}$ is a difference between the range-sum for sidelink UE 820$a$, e.g., range-sum $R_{sum\_diff\_a}$, and the range-sum for sidelink UE 820$b$, e.g., range-sum $R_{sum\_diff\_b}$, while a differential range-sum $R_{sum\_diff\_c}$ is a difference between the range-sum for sidelink UE 820$a$, e.g., range-sum $R_{sum\_diff\_a}$, and the range-sum for sidelink UE 820$c$, e.g., range-sum $R_{sum\_diff\_c}$. The selection of the reference sidelink UE may be based on side information, such as the RSRP or other parameters, such as RSSI, RSRQ, SNR, etc. Where the location server 804 determines the differential range-sums $R_{sum\_diff\_i}$ the target UE 810 may include the RSRP or other parameter measurements to the location server 804 to assist in the selection of the reference sidelink UE.

Each differential range-sum $R_{sum\_diff\_j}$ defines a hyperbola that may be determined as the set of all the points that have the same difference between range-sums to each focus, i.e., the known locations of the reference sidelink UE and the other sidelink UE. For example, as illustrated in FIG. 8, the differential range-sum $R_{sum\_diff\_b}$ defines a hyperbola 852 and the differential range-sum $R_{sum\_diff\_b}$ defines a hyperbola 854. The intersection of the two hyperbolas at the point 856 in FIG. 8 may then be used to determine a two-dimensional position of the UE 810 (though if desired more hyperbolas may be obtained from range-sum measurements for more sidelink UEs to remove ambiguity and reduce error in the location of UE 810). In the case of three-dimensional positioning, the hyperbola is replaced by the hyperboloid surface obtained by revolving the hyperbola around the axis passing through the foci, and the UE's position is obtained as the intersection of these hyperboloids.

In a differential range-sum based UE assisted positioning process, the location server 804 determines the position of the target UE 810 based on the differential range-sums $R_{sum\_diff\_i}$. In some implementations, the location server 804 may receive the time differences (e.g., $T_{Rx\_sidelink\_i} - T_{Rx\_RS\_i}$) from the sidelink UEs 820 and the measured Rx-Tx time differences (e.g., $T_{UE\_Rx \to Tx\_i}$) from the target UE 810. The location server 804, may further receive the locations of the sidelink UEs 820. The location server 804 may determine the range-sums $R_{sum\_i}$ based on the time differences (e.g., $T_{Rx\_sidelink\_i} - T_{Rx\_RS\_i}$) and the measured Rx-Tx time differences (e.g., $T_{UE\_Rx \to Tx\_i}$), and then determine the differential range-sums $R_{sum\_diff\_i}$ before determining the position of the target UE 810. In some implementations, the sidelink UEs 820 may report their time differences (e.g., $T_{Rx\_sidelink\_i} - T_{Rx\_RS\_i}$) to the target UE 810, e.g., via sidelink communication, and the target UE 810 may determine the range-sums $R_{sum\_i}$ based on the time differences (e.g., $T_{Rx\_sidelink\_i} - T_{Rx\_RS\_i}$) and the measured Rx-Tx time differences (e.g., $T_{UE\_Rx \to Tx\_i}$). The target UE 810 may determine the differential range-sums $R_{sum\_diff\_i}$ based on the range-sums $R_{sum\_i}$. The location server 804 may receive the differential range-sums $R_{sum\_diff\_i}$ from the target UE 810 and determine the position of the target UE 810. In some implementations, the location server 804 may receive the range-sums $R_{sum\_i}$ from the target UE 810 and determine the differential range-sums $R_{sum\_diff\_i}$ before determining the position of the target UE 810.

In a differential range-sum based UE based positioning process, the target UE 810 determines the position of the target UE 810 based on the differential range-sums $R_{sum\_diff\_i}$, along with assistance data including the location of the base station 802 and the locations of the sidelink UEs 820. The assistance data may be provided by the location server 804 and/or the sidelink UEs 820. For example, the sidelink UEs 820 may provide their locations to the target UE 810 in a sidelink communication or via the location server. In some implementations, the target UE 810 may receive the time differences (e.g., $T_{Rx\_sidelink\_i} - T_{Rx\_RS\_i}$) from the sidelink UEs 820, e.g., via sidelink communication, and the target UE 810 may determine the range-sums $R_{sum\_i}$ based on the time differences (e.g., $T_{Rx\_sidelink\_i} - T_{Rx\_RS\_i}$) and the measured Rx-Tx time differences (e.g., $T_{UE\_Rx \to Tx\_i}$), and then determine the differential range-sums $R_{sum\_diff\_i}$ before determining the position of the target UE 810. In some implementations, the sidelink UEs 820 may report their time differences (e.g., $T_{Rx\_sidelink\_i} - T_{Rx\_RS\_i}$) to the location server 804, and the target UE 810 may receive the time differences (e.g., $T_{Rx\_sidelink\_i} - T_{Rx\_RS\_i}$) from the location server 804 and the target UE 810 may determine the range-sums $R_{sum\_i}$ based on the time differences (e.g., $T_{Rx\_sidelink\_i}-T_{Rx\_RS\_i}$) and the measured Rx-Tx time differences (e.g., $T_{UE\_Rx \rightarrow Tx\_i}$), and then determine the differential range-sums $R_{sum\_diff\_j}$ before determining the position of the target UE 810.

The use of differential range-sums $R_{sum\_diff\_i}$ advantageously removes the need for the differential angle $\theta_T$ based on AoD $\phi_2$ and AoD $\phi_1$ measurements referred to in equation 4. Moreover, use of differential range-sums $R_{sum\_diff\_i}$ advantageously removes the target UE group-delay from the positioning process. The use of differential range-sums thus builds robustness to group-delay variation. The use of a differential scheme may be selected by the positioning engine, e.g., in the UE 105 or the location server 804, e.g., which may be in the NG-RAN 235 or may be LMF 220, based on whether group-delays in the UE have been calibrated. For example, for UE-based positioning, the target UE 810 may select whether to use differential range-sums $R_{sum\_diff\_j}$ based at least in part on its group-delay calibration status, e.g., a differential scheme may be used if the group-delay in the UE has not been calibrated adequately or recently. Similarly, for UE assisted positioning, the location server 804 may likewise select whether to use differential range-sums $R_{sum\_diff\_j}$ based at least in part on the group-delay calibration status of the target UE 810, which may be provided to the location server 804 by the target UE 810. The target UE 810, for example, may provide an indication to the location server 804 whether it is calibrated. In some implementations, the target UE 810 may report its calibration error statistics, for example the mean and variance of the calibration error. The calibration status report from the target UE 810 to the location server 804 may be periodic or aperiodic, which may be triggered by some event, such as a UE temperature change.

Figure 9:
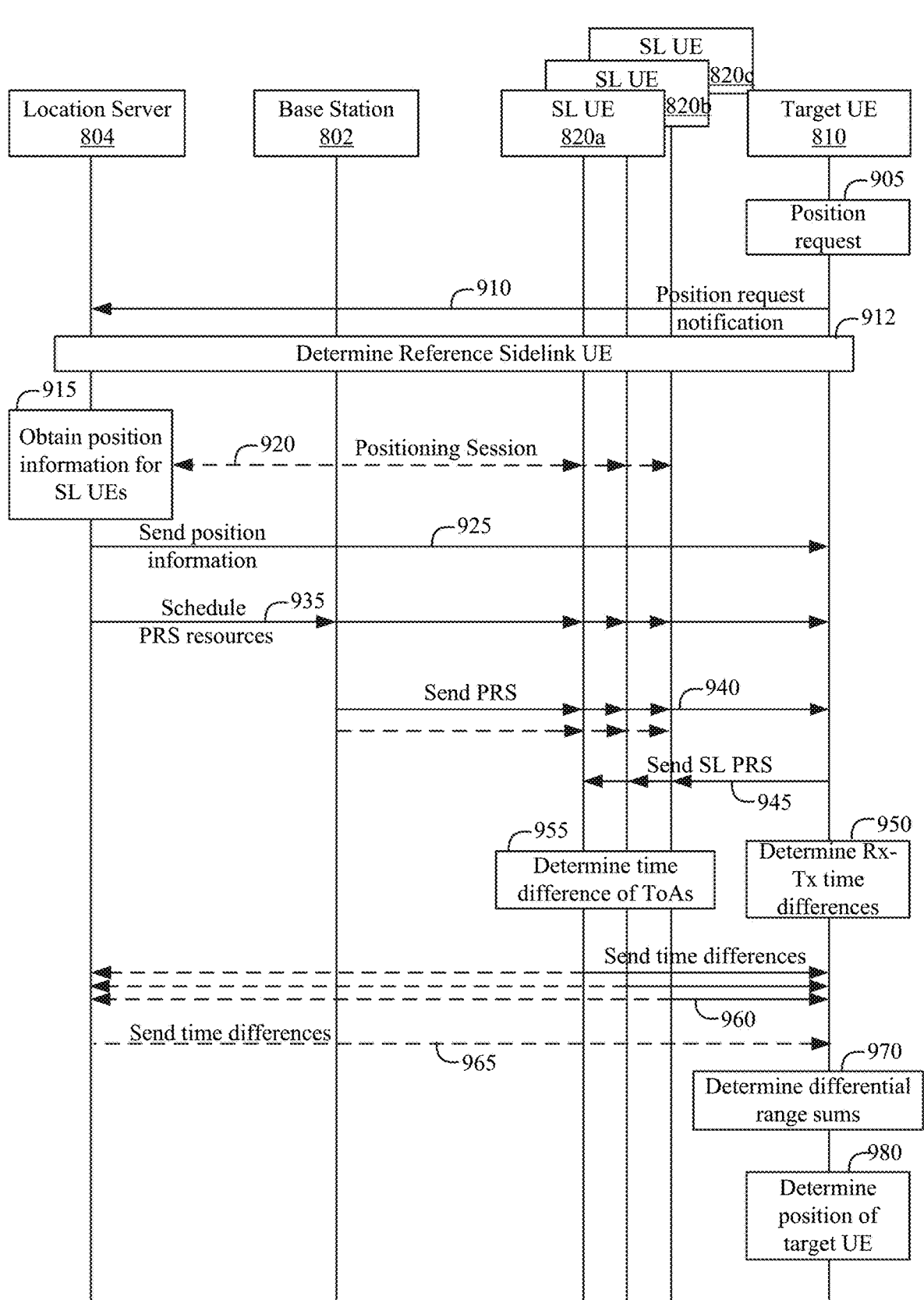
FIG. 9 is a call-flow diagram illustrating a process of performing UE-based positioning of a target UE using differential range-sums.

FIG. 9 is a call-flow diagram illustrating an embodiment of UE-based positioning procedure for determining the position of a target UE 810 using differential range-sums determined for a plurality of sidelink UEs 820*a*, 820*b*, and 820*c* (sometimes collectively referred to as sidelink UEs 820, or sidelink UE 820*i*, where i=a, b, and c), as illustrated in FIG. 8. As discussed in FIG. 8, the target UE 810 may correspond to UE 105 or 105*a* shown in FIGS. 1 and 2, and in some implementations may be a light UE. The sidelink UEs 820 serve as anchor UEs and may correspond to the other of UE 105*a* or 105 shown in FIGS. 1 and 2, and in some implementations may be a premium UE. The base station 802 may correspond to one of base stations 120 or access point 130 shown in FIG. 1 and may be, e.g., an eNB or gNB, such as gNB 210 or ng-eNB 214 shown in FIG. 2. The location server 804 may correspond to location server 160 shown in FIG. 1, which in some implementations may be part of the NG-RAN 235 or LMF 220 shown in FIG. 2, or any other suitable location server such as an E-SMLC. As with the other figures provided herein, FIG. 9 is provided as a nonlimiting example. As discussed in more detail below, alternative embodiments may perform certain functions (e.g., the determination of the sidelink UE position, the ToA measurements, etc.) in a different order, simultaneously, etc. It can be noted that arrows between the various components illustrated in FIG. 9 illustrate messages or information sent from one component to another. It will be understood, however, that there may be any number of intervening devices, servers, etc. that may relay such messages, including other components in FIG. 9 (e.g., a message from the target UE 810 to the location server 804 may pass through the base station 802 and perhaps the sidelink UE 820, as well as other entities, such as AMF 215). Additionally, although wireless reference signals are sometimes referred to as PRS (e.g., DL-PRS transmitted by the base station 802 and SL-PRS transmitted by the target UE 810), alternative embodiments may utilize other wireless reference signal types.

At block 905, the target UE 810 obtains a position request. This position request may come, for example, from an application (or app) executed by the target UE 810. This may be a result from user interaction with the target UE 810, based on a determined schedule, or based on other triggers. Additionally or alternatively, a position request may come from a separate device (e.g., the sidelink UE 820, the location server 804, or another device in communication with the target UE 810) requesting the position of the target UE 810.

If the position request did not originate with the location server 804, the target UE 810 in response to the position request at 905 may generate a position request notification. As indicated at arrow 910, the request can be sent to the location server 804, which can coordinate the functionality of the various components illustrated in FIG. 9 to determine of the position of the target UE 810. According to some embodiments, additional communications between the target UE 810 and location server 804 may occur to determine capabilities of the target UE 810 (including, for example, the capability of the target UE 810 to communicate with the sidelink UEs 820), whether the target UE 810 is capable of or will use differential range-sums $R_{sum\_diff\_j}$. The target UE 810, for example, may provide an indication of whether the UE group-delay is calibrated, e.g., by reporting whether it is calibrated or reporting calibration error statistics, such as the mean and variance of the calibration error. The calibration status report from the target UE 810 to the location server 804 in some implementations may be periodic or aperiodic, which may be triggered by an event, such as a UE temperature change. In some embodiments, communication between the location server 804 and target UE 810 may occur via an LPP positioning session.

In some embodiments the position request notification may additionally be sent to the sidelink UE 820. This can notify the sidelink UEs 820 of the position request received by the target UE 810 (at block 905) and trigger the sidelink UEs 820 to determine the reference sidelink UE at block 912 and to obtain their position information, at block 915. Here, too, the position request notification provided to the sidelink UEs 820 may be part of a larger communication exchange in which positioning capabilities are shared between the target UE 810 and sidelink UEs 820. According to some embodiments, communications between the target UE 810 and one or more sidelink UEs 820 may occur over an existing sidelink connection. Alternatively, a new sidelink connections may be created with one or more sidelink UEs 820 in response to the position request received at block 905. According to some embodiments, rather than the target UE 810 providing the position request notification to the sidelink UEs 820, the notification may be provided to the sidelink UEs 820 by the location server 804, in response to the location server's receipt of the position request notification at stage 910.

At block 912, the selection of sidelink UEs 820 to use in the position determination of the target UE 810 and a determination of a reference sidelink UE may be made in any of a variety of ways, depending on desired functionality. For example, as noted, the target UE 810 may have an existing sidelink communication channel with one or more sidelink UEs 820 that can be leveraged for positioning purposes. It should be understood that the position request notification to the sidelink UEs 820 sent by the target UE 810 or the location server 804 as part of stage 910 may be sent to the selected sidelink UEs 820 after or as part of the selection of the sidelink UEs 820. One or more sidelink UEs 820 may be selected based on an existing sidelink channel (s). Additionally or alternatively, one or more sidelink UEs 820 may be selected by the target UE 810 based on a scan of nearby sidelink UEs as well as a confirmed capability of performing positioning and this manner. In some embodiments, a signal quality metric such as SNR, RSSI, RSRP, or some combination thereof, for example, may be used to select of the sidelink UEs 820. Additionally, the signal quality metric may be used by the target UE 810 or by the location server 804 (after the target UE 810 reports the signal quality metrics to the location server 804) to determine which sidelink UE 820 will serve as the reference sidelink UE. For example, the target UE 810 may measure the signal strengths from each sidelink UE 820 and determine which sidelink UE 820 to use as the reference sidelink UE. In another example, the sidelink UEs 820 may measure the signal strengths of signals received from the target 810. The sidelink UEs 820 may send the signal strengths to the location server 804, which may determine which sidelink UE 820 to use as the reference sidelink UE and, in some implementations, may send the identifier for selected sidelink UE 820 to the target UE 810. Signal quality measures can be used to select sidelink UEs 820 that have adequate signal quality to perform the functions described herein, while not being too close to the target UE 810 to result in positioning errors for the position determination of the target UE 810. Accordingly, in such embodiments, a certain range of SNR, RSSI, RSRP, or some combination thereof, values may be selected to balance these considerations, and sidelink UEs having signal quality measurement values that fall within this range may be selected over other sidelink UEs having signal quality measurement values falling outside this range, with sidelink UE 820 having the best (highest) signal quality measurement(s) selected to serve as the reference sidelink UE. Other embodiments may utilize additional or alternative techniques for sidelink UE selection and reference sidelink UE selection.

At block 915 and positioning session 920, the locations of the sidelink UEs 820 is determined by the location server 915, e.g., in a UE-assisted positioning procedure, or in some implementations by the each respective sidelink UE 820, e.g., in a UE-based positioning procedure. This can be performed in any of a variety of ways, including GNSS and/or other non-network means and the resulting locations may be reported to the location server 804. Additionally or alternatively, position determination for the sidelink UEs 820 can be network-based and may involve the location server 804. In some instances, the sidelink UEs 820 may perform position measurements, e.g., for TDOA, multi-RTT, AoD, etc. positioning, based on communications with a plurality of base stations (which may include communication with the base station 802), which may be reported to the location server 804 and the location server 804 may determine a high-accuracy position determination for the sidelink UEs 820. In some instances, the sidelink UEs 820 may request assistance data and the location server 804 may send the requested assistance data and the sidelink UEs 820 may obtain high-accuracy positions determination based on position measurements, e.g., for TDOA, multi-RTT, AoD, etc. positioning, based on communications with a plurality of base stations (which may include communication with the base station 802). The assistance data, for example, may include a location of each base station with which positioning measurements are made.

At stage 925, the location server 804 sends assistance data including position information for the sidelink UEs 820 obtained at block 915 to the target UE 810. In implementations, where the sidelink UEs 820 obtained their own position information, the sidelink UEs 820 may send their position information to the target UE 810 directly, e.g., in a sidelink communication or via the location server 804. The assistance data sent by the location server 804 may further include the location of the base station 802. In some implementations, the base station 802 may send assistance data to the target UE 810 that includes the location of the base station 802. In some implementations, the location server 804 may determine the distance $L_i$ between the base station 802 and each sidelink UE 820, and may send the locations of the sidelink UEs 820 and the distance $L_i$ for each sidelink UE 820 instead of the location of the base station 804. The assistance data may further include timing and/or other information regarding the PRS to be transmitted by the base station 802.

As indicated by arrow 935, the location server can then schedule the transmission and receipt of PRS resources by the base station 802, sidelink UEs 820, and the target UE 810. According to embodiments, this may include the scheduling of PRS for measurement of ToA (at stage 945) by the target UE 810 and the sidelink UEs 820. Alternatively, different PRS may be scheduled for measurement at different times by the target UE 810 and the sidelink UEs 820. In some embodiments, the base station 802 may configure the sidelink UEs 820 and/or target UE 810 to measure the PRS. (In such instances, the scheduling of PRS resources may be viewed as being sent from the base station 802, rather than the location server 804, to the sidelink UEs 820 and/or target UE 810.)

At stage 940, the base station 802 sends PRS, which is received by the sidelink UEs 820 and target UE 810 as previously described and illustrated as signals 850 and 860 in FIG. 8. The sidelink UEs 820 measure the ToA of the PRS and the target UE 810 measures the ToA of the PRS. In some implementations, as illustrate by the dotted lines, the base station 802 may send one or more different PRS (e.g., a PRS resource using a different beam) for ToA measurement by the sidelink UEs 820 than the PRS received by the target UE 810.

At stage 945, the target UE 810 sends PRS to the sidelink UEs 820 as previously described and illustrated as signals 870 in FIG. 8. The PRS may comprise one or more signals (e.g., sidelink signal 870) sent via sidelink communication channels. This can comprise, for example, a sidelink reference signal (SL-PRS or SL-CSI-RS), or other reference signal. The target UE 810 measures the ToD of the one or more SL-PRS sent to each sidelink UE 820 and each sidelink UE 820 measures the ToA of the SL-PRS.

At stage 950, the target UE 810 determines the Rx-Tx time difference Rx-Tx time differences ($T_{UE\_Rx \rightarrow Tx\_i}$) between the measured ToA of the PRS received from the base station 802 at stage 940 and the measured ToD of each sidelink reference signal sent at stage 945, e.g., as discussed in FIG. 8.

At stage 955, each sidelink UE 820 determines the time difference (e.g., $T_{Rx\_sidelink\_i} - T_{Rx\_RS\_i}$) between the measured ToA of the PRS received from the base station 802 at stage 940 and the measured ToA of the SL-PRS received from the target UE 810 at stage 945, e.g., as discussed in FIG. 8.

At stage 960, each sidelink UE 820 sends its measured time difference (e.g., $T_{Rx\_sidelink\_i} - T_{Rx\_RS\_i}$) from stage 955 to the target UE 810. In some implementations, the measured time differences may be reported to the target UE 810 via a sidelink communication. In some implementations, the measured time differences may be reported to the target UE 810 via the location server 804, e.g., by sending the time differences to the location server 804 as illustrated with the dotted lines in stage 960, at stage 965, the location server 804 sends the measured time differences to the target UE 810. In the measured time difference report, each sidelink UEs 820 may include the TRP ID for the base station 802, the PRS ID for the PRS received at stage 940, the SL-PRS ID for the SL-PRS received at stage 945, the UE ID for the target UE 810, and the UE ID for the respective sidelink UE 820. Each sidelink UEs 820 may further include a time stamp associated with measured time difference (e.g., $T_{Rx\_sidelink\_i} - T_{Rx\_RS\_i}$) in the report.

At stage 970, the target UE 810 may determine the differential range-sums (e.g., $R_{sum\_diff\_j}$) for the sidelink UEs 820, as discussed in FIG. 8. For example, the target UE 810 may determine a range-sum ($R_{sum\_i}$) for each sidelink UE 820 based on Rx-Tx time differences (e.g., $T_{UE\_Rx \rightarrow Tx\_i}$) determined at stage 950 and the time difference ($T_{Rx\_sidelink\_i} - T_{Rx\_RS\_i}$) reported by each sidelink UE 820 in stage 960 (or stages 960 and 965). As illustrated in equation 7, the range-sum ($R_{sum\_i}$) for each sidelink UE 820 may be based further on the distance $L_i$ between the base station 802 and each sidelink UE 820, which the target UE 810 may determine from the position information received in stage 925. The target UE 810 may determine the differential range-sums $R_{sum\_diff\_j}$ for the sidelink UEs 820 using a reference sidelink UE, e.g., as determined in stage 912.

At stage 980, the target UE 810 may determine its position based on the differential range-sums $R_{sum\_diff\_j}$ for the sidelink UEs 820 and the locations of the sidelink UEs 820 received at stage 925, e.g., as discussed in FIG. 8. For example, each differential range-sum $R_{sum\_diff\_j}$ defines a hyperbola (or hyperboloid surface in three dimensions) with respect to the known locations of the reference sidelink UE and the other sidelink UE. The position of the target UE 810 may be determined as the intersection of the hyperbolas (or hyperboloid surfaces).

Figure 10:
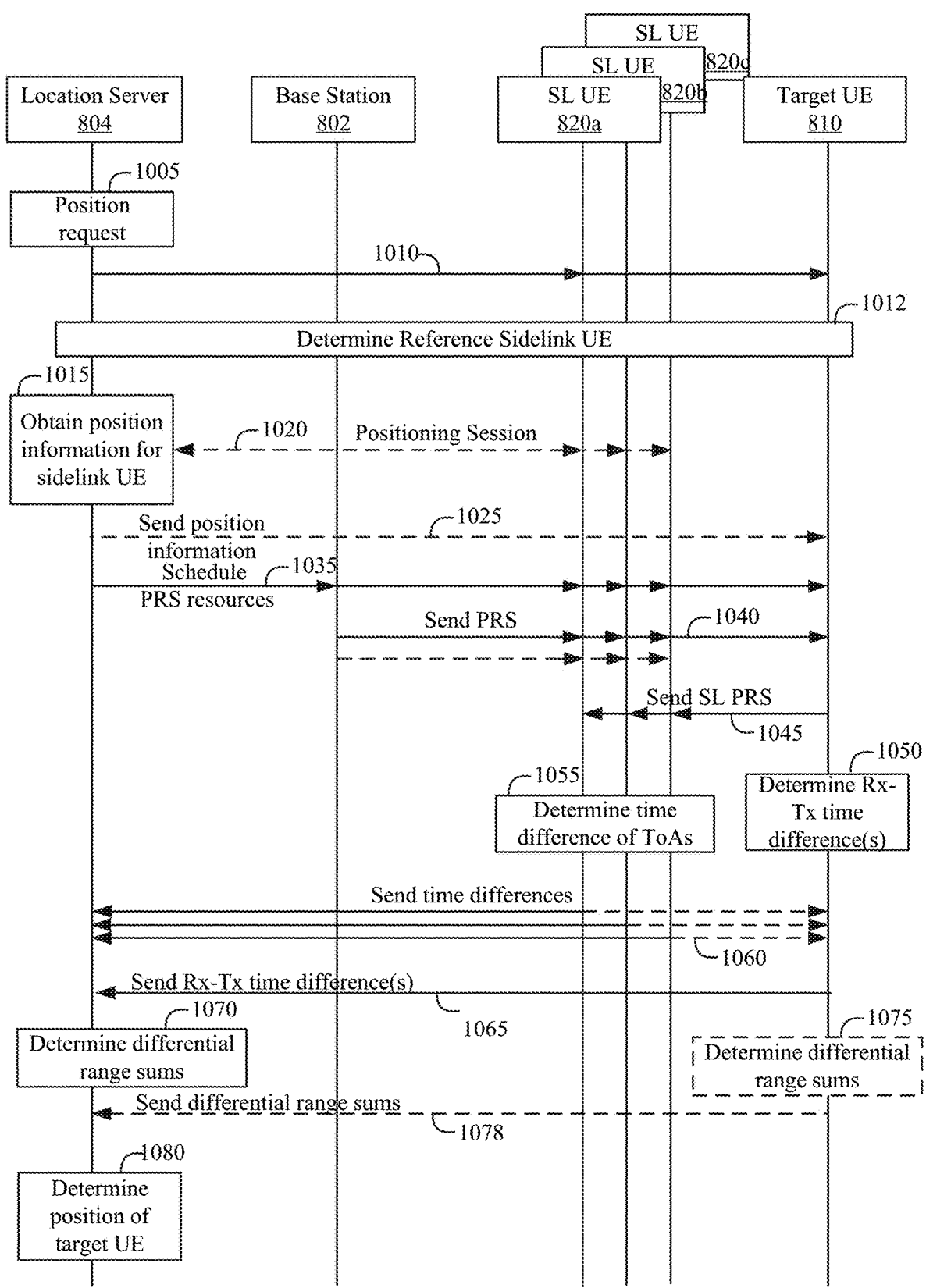
FIG. 10 is a call-flow diagram illustrating a process of performing UE-assisted positioning of a target UE using differential range-sums.

FIG. 10 is a call-flow diagram illustrating an embodiment of UE-assisted positioning procedure for determining the position of a target UE 810 using differential range-sums determined for a plurality of sidelink UEs 820*a*, 820*b*, and 820*c* (sometimes collectively referred to as sidelink UEs 820, or sidelink UE 820*i*, where i=a, b, and c), as illustrated in FIG. 8. As discussed in FIG. 8, the target UE 810 may correspond to UE 105 or 105*a* shown in FIGS. 1 and 2, and in some implementations may be a light UE. The sidelink UEs 820 serve as anchor UEs and may correspond to the other of UE 105*a* or 105 shown in FIGS. 1 and 2, and in some implementations may be a premium UE. The base station 802 may correspond to one of base stations 120 or access point 130 shown in FIG. 1 and may be, e.g., an eNB or gNB, such as gNB 210 or ng-eNB 214 shown in FIG. 2. The location server 804 may correspond to location server 160 shown in FIG. 1, which in some implementations may be part of the NG-RAN 235 or LMF 220 shown in FIG. 2, or any other suitable location server such as an E-SMLC. As with the other figures provided herein, FIG. 10 is provided as a nonlimiting example. As discussed in more detail below, alternative embodiments may perform certain functions (e.g., the determination of the sidelink UE position, the ToA measurements, etc.) in a different order, simultaneously, etc.

It can be noted that arrows between the various components illustrated in FIG. 10 illustrate messages or information sent from one component to another. It will be understood, however, that there may be any number of intervening devices, servers, etc. that may relay such messages, including other components in FIG. 10 (e.g., a message from the target UE 810 to the location server 804 may pass through the base station 802 and perhaps the sidelink UE 820, as well as other entities, such as AMF 215). Additionally, although wireless reference signals are sometimes referred to as PRS (e.g., DL-PRS transmitted by the base station 802 and SL-PRS transmitted by the target UE 810), alternative embodiments may utilize other wireless reference signal types.

At block 1005, the location server 804 obtains a position request for the target UE 810. This position request may come, for example, from an external client (e.g., external client 180 of FIG. 1 and/or external client 230 of FIG. 2). Additionally or alternatively, the request may come from a service within the wireless network that may need the position of the light UE 410 to provide particular functionality.

In response to the position request at 1005, the location server 804 may generate a position request notification. The location server 804 may send the position request notification to the target UE 810 at stage 1010 and (optionally) to the sidelink UEs 820. In some embodiments, this may comprise initiating a communication session between the location server 804 and the target UE 810, and/or between the location server 804 and one or more of the sidelink UEs 820, to coordinate the functionality of the various components illustrated in FIG. 10 to determine of the position of the target UE 810. According to some embodiments, additional communications between the target UE 810 and location server 804 may occur to determine capabilities of the target UE 810 (including, for example, the capability of the target UE 810 to communicate with the sidelink UEs 820), whether the target UE 810 is capable of or will use differential range-sums $R_{sum\_diff\_j}$. The target UE 810, for example, may provide an indication of whether the UE group-delay is calibrated, e.g., by reporting whether it is calibrated or reporting calibration error statistics, such as the mean and variance of the calibration error. The calibration status report from the target UE 810 to the location server 804 in some implementations may be periodic or aperiodic, which may be triggered by an event, such as a UE temperature change. In some embodiments, communication between the location server 804 and target UE 810 may occur via an LPP positioning session.

The position request notification may be sent to the sidelink UE 820 to notify the sidelink UEs 820 of the position request received by the target UE 810 (at block 1010). The sidelink UEs 820 may be triggered by the position request notification to determine the reference sidelink UE at block 1012 and to obtain their position information, at block 1015. According to some embodiments, rather than the location server 804 providing the position request notification to the sidelink UEs 820, the notification may be provided to the sidelink UEs 820 by the target UE 810, in response to the receipt of the position request notification at stage 1010. According to some embodiments, communications between the target UE 810 and one or more sidelink UEs 820 may occur over an existing sidelink connection. Alternatively, a new sidelink connections may be created with one or more sidelink UEs 820 in response to the position request received at block 1010.

Elements 1012-1055 may be similar to corresponding features 912-955 in FIG. 9, as previously described. If the determination of the differential range-sums is made at the location server 804 instead of the target UE 810, the locations of the sidelink UEs 820 and base station 802 or the distance L*i* for each sidelink UE 820 need not be sent to the target UE 810 in assistance data. Moreover, if the determination of the differential range-sums is made at the location server 804 instead of the target UE 810, the selection of the reference sidelink UE may be made by the location server 804 and need to be conveyed to the target UE 810. Otherwise, the assistance data may be sent to the target UE 810 in stage 1025.

At stage 1060, each sidelink UE 820 sends its measured time difference (e.g., $T_{Rx\_sidelink\_i}-T_{Rx\_RS\_i}$) from stage 1055 to the location server 804. In some implementations, e.g., where the target UE 810 determines the differential range-sums, the sidelink UE 820 may send their measured time differences to the target UE 81, e.g., via a sidelink communication as illustrated with the dotted lines in stage 1060. In the measured time difference report, each sidelink UEs 820 may include the TRP ID for the base station 802, the PRS ID for the PRS received at stage 1040, the SL-PRS ID for the SL-PRS received at stage 1045, the UE ID for the target UE 810, and the UE ID for the respective sidelink UE 820. Each sidelink UEs 820 may further include a time stamp associated with measured time difference (e.g., $T_{Rx\_sidelink\_i}-T_{Rx\_RS\_i}$) in the report.

At stage 1065, the target UE 810 processes the Rx-Tx time differences (e.g., $T_{UE\_Rx\rightarrow Tx\_i}$) measured at stage 1050 for generating differential range-sums, e.g., by preparing and sending a report with the measured Rx-Tx differences to the location server 804. For each Rx-Tx time difference ($T_{UE\_Rx\rightarrow Tx\_i}$) reported, the target UE 810 may include the TRP ID for the base station 802, the PRS ID for the PRS received at stage 1040, the SL-PRS ID for the corresponding SL-PRS transmitted at stage 1045, the UE ID for the target UE 810, and the UE ID for the sidelink UE 820 that received the corresponding sidelink reference signal. The target UE 810 may further include a time stamp associated with each Rx-Tx time differences ($T_{UE\_Rx\rightarrow Tx\_i}$) in the report.

At stage 1070, the location server 804 may determine the differential range-sums (e.g., $R_{sum\_diff\_i}$) for the sidelink UEs 820, as discussed in FIG. 8. For example, the location server 804 may determine a range-sum ($R_{sum\_i}$) for each sidelink UE 820 based on Rx-Tx time differences (e.g., $T_{UE\_Rx\rightarrow Tx\_i}$) reported by the target UE 810 at stage 1065 and the time difference ($T_{Rx\_sidelink\_i}-T_{Rx\_RS\_i}$) reported by each sidelink UE 820 in stage 1060. As illustrated in equation 7, the range-sum ($R_{sum\_i}$) for each sidelink UE 820 may be based further on the distance L*i* between the base station 802 and each sidelink UE 820, which the location server 804 may determine from the positions received from the sidelink UEs 820 in stage 1015. The location server 804 may determine the differential range-sums $R_{sum\_diff\_j}$ for the sidelink UEs 820 using a reference sidelink UE, e.g., as determined in stage 1012.

At optional stage 1075, the target UE 810 processes the Rx-Tx time differences (e.g., $T_{UE\_Rx\rightarrow Tx\_i}$) measured at stage 1050 for generating differential range-sums, e.g., by determining the differential range-sums using the Rx-Tx time differences and the time difference ($T_{Rx\_sidelink\_i}-T_{Rx\_RS\_i}$) reported to the target UE 810 by each sidelink UE 820 in stage 1060 (similar to stage 970 in FIG. 9) instead of the location server 804.

At optional stage 1078, if the target UE 810 determines the differential range-sums at stage 1075, the target UE 810 reports the differential range-sums to the location server 804. For each differential range-sum reported to the location server 804, the target UE 810 may include the TRP ID for the base station 802, the PRS ID for the PRS received at stage 1040, the SL-PRS IDs for the corresponding SL-PRSs transmitted at stage 1045, the UE ID for the target UE 810, and the UE IDs for the reference sidelink UE 820 and the other sidelink UE 820 that received the corresponding sidelink reference signals at stage 1045. The target UE 810 may further include a time stamp associated with each differential range-sum in the report.

At stage 1080, the location server 804 may determine the position of the target UE 810 based on the differential range-sums $R_{sum\_diff\_j}$ for the sidelink UEs 820 and the locations of the sidelink UEs 820 received at stage 1015, e.g., as discussed in FIG. 8. For example, each differential range-sum $R_{sum\_diff\_j}$ defines a hyperbola (or hyperboloid surface in three dimensions) with respect to the known locations of the reference sidelink UE and the other sidelink UE. The position of the target UE 810 may be determined as the intersection of the hyperbolas (or hyperboloid surfaces).

Figure 11:
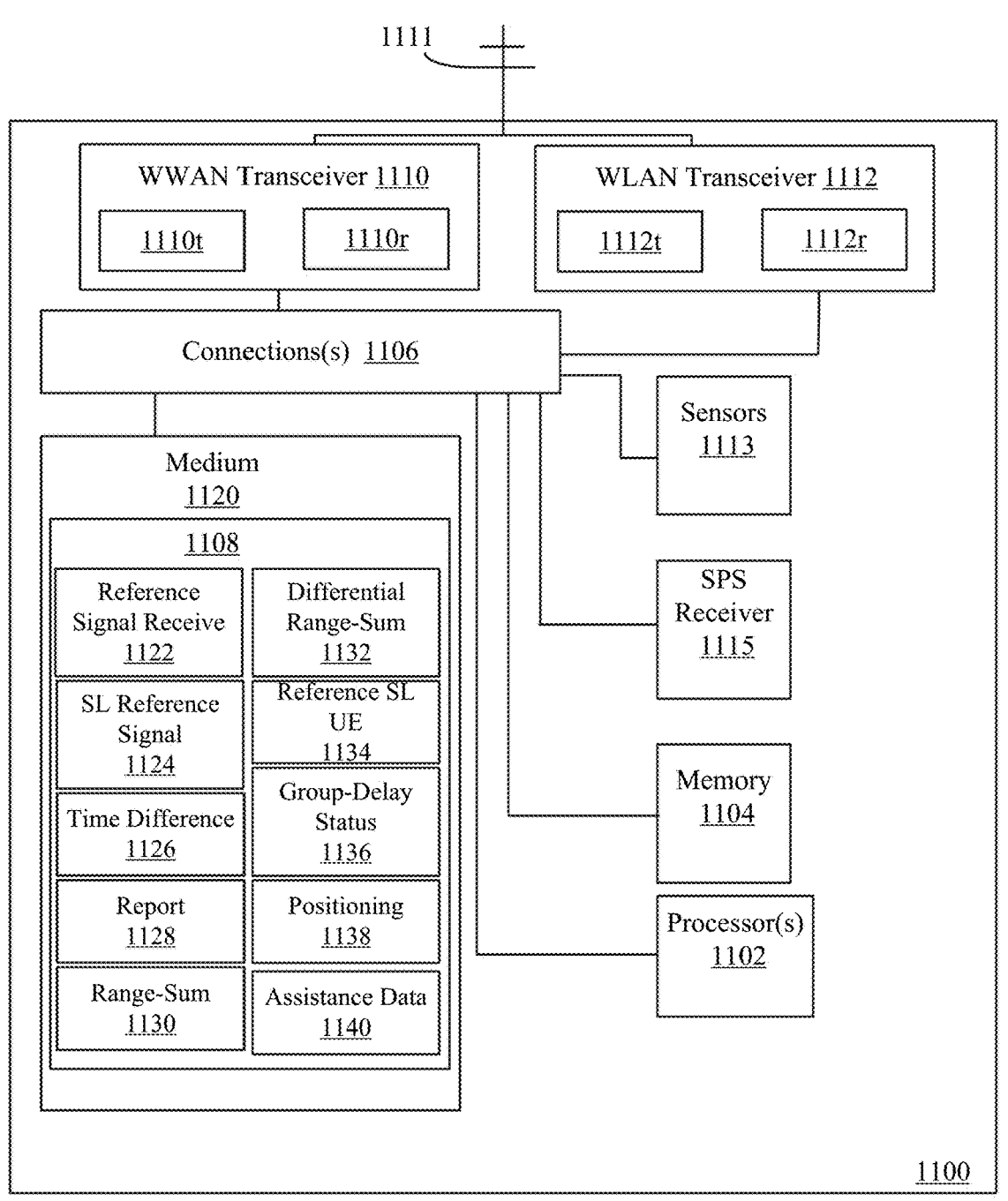
FIG. 11 shows a schematic block diagram illustrating certain exemplary features of a UE that is configured for supporting positioning using differential range-sums.

FIG. 11 shows a schematic block diagram illustrating certain exemplary features of a UE 1100, e.g., which may be a target UE, sidelink UE, or other UE as described herein, that is configured for supporting positioning using differential range-sums, e.g., as discussed herein. The UE 1100, for example, may perform the signal flows shown in FIGS. 9 and 10 and the process flows shown in FIGS. 13 and 16 and algorithms disclosed herein. The UE 1100 may, for example, include one or more processors 1102, memory 1104, an external interface such as at least one wireless transceivers (e.g., wireless network interface) illustrated as WWAN transceiver 1110 and WLAN transceiver 1112, SPS receiver 1115, and one or more sensors 1113, which may be operatively coupled with one or more connections 1106 (e.g., buses, lines, fibers, links, etc.) to non-transitory computer readable medium 1120 and memory 1104. The SPS receiver 1115, for example, may receive and process SPS signals from SVs 190 shown in FIG. 1. The one or more sensors 1113, for example, may be an inertial measurement unit (IMU) that may include one or more accelerometers, one or more gyroscopes, a magnetometer, etc. The UE 1100 may further include additional items, which are not shown, such as a user interface that may include e.g., a display, a keypad or other input device, such as virtual keypad on the display, through which a user may interface with the UE. In certain example implementations, all or part of UE 1100 may take the form of a chipset, and/or the like.

The UE 1100 may include at least one wireless transceiver, such as transceiver 1110 for a WWAN communication system and transceiver 1112 for a WLAN communication system, or a combined a transceiver for both WWAN and WLAN. The WWAN transceiver 1110 may include a transmitter 1110*t* and receiver 1110*r* coupled to one or more antennas 1111 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 1112 may include a transmitter 1112*t* and receiver 1112*r* coupled to one or more antennas 1111 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 1110*t* and 1112*t* may include multiple transmitters that may be discrete components or combined/integrated components, and/or the receivers 1110*r* and 1112*r* may include multiple receivers that may be discrete components or combined/integrated components. The WWAN transceiver 1110 may be configured to communicate signals (e.g., with base stations and/or one or more other devices) according to a variety of radio access technologies (RATs) such as 11G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio may use mm-wave frequencies and/or sub-6 GHz frequencies. The WLAN transceiver 1112 may be configured to communicate signals (e.g., with access points and/or one or more other devices) according to a variety of radio access technologies (RATs) such as 3GPP LTE-V2X (PC5), IEEE 802.11 (including IEEE 802.11p), WiFi, WiFi Direct (WiFi-D), Bluetooth®, Zigbee etc. The transceivers 1110 and 1112 may be communicatively coupled to a transceiver interface, e.g., by optical and/or electrical connection, which may be at least partially integrated with the transceivers 1110 and 1112.

In some embodiments, UE 1100 may include antenna 1111, which may be internal or external. UE antenna 1111 may be used to transmit and/or receive signals processed by wireless transceivers 1110 and 1112. In some embodiments, UE antenna 1111 may be coupled to wireless transceivers 1110 and 1112. In some embodiments, measurements of signals received (transmitted) by UE 1100 may be performed at the point of connection of the UE antenna 1111 and wireless transceivers 1110 and 1112. For example, the measurement point of reference for received (transmitted) RF signal measurements may be an input (output) terminal of the receiver 1110*r* (transmitter 1110*t*) and an output (input) terminal of the UE antenna 1111. In a UE 1100 with multiple UE antennas 1111 or antenna arrays, the antenna connector may be viewed as a virtual point representing the aggregate output (input) of multiple UE antennas. In some embodiments, UE 1100 may measure received signals including signal strength and TOA measurements and the raw measurements may be processed by the one or more processors 1102.

The one or more processors 1102 may be implemented using a combination of hardware, firmware, and software. For example, the one or more processors 1102 may be configured to perform the functions discussed herein by implementing one or more instructions or program code 1108 on a non-transitory computer readable medium, such as medium 1120 and/or memory 1104. In some embodiments, the one or more processors 1102 may represent one or more circuits configurable to perform at least a portion of a data signal computing procedure or process related to the operation of UE 1100.

The medium 1120 and/or memory 1104 may store instructions or program code 1108 that contain executable code or software instructions that when executed by the one or more processors 1102 cause the one or more processors 1102 to operate as a special purpose computer programmed to perform the techniques disclosed herein. As illustrated in UE 1100, the medium 1120 and/or memory 1104 may include one or more components or modules that may be implemented by the one or more processors 1102 to perform the methodologies described herein. While the components or modules are illustrated as software in medium 1120 that is executable by the one or more processors 1102, it should be understood that the components or modules may be stored in memory 1104 or may be dedicated hardware either in the one or more processors 1102 or off the processors.

A number of software modules and data tables may reside in the medium 1120 and/or memory 1104 and be utilized by the one or more processors 1102 in order to manage both communications and the functionality described herein. It should be appreciated that the organization of the contents of the medium 1120 and/or memory 1104 as shown in UE 1100 is merely exemplary, and as such the functionality of the modules and/or data structures may be combined, separated, and/or be structured in different ways depending upon the implementation of the UE 1100.

The medium 1120 and/or memory 1104 may include reference signal receive module 1122 that when implemented by the one or more processors 1102 configures the one or more processors 1102 to receive, e.g., via the wireless transceiver 1110, a reference signal, such as a DL PRS, SL PRS, CSI-RS for positioning, etc., from an access point, base station, or another UE and to measure the time of arrival ToA) of the reference signal.

The medium 1120 and/or memory 1104 may include sidelink reference signal module 1124 that when implemented by the one or more processors 1102 configures the one or more processors 1102 to transmit, e.g., via the wireless transceiver 1110, one or more sidelink reference signals, such as a SL PRS, SL CSI-RS for positioning, etc. to a plurality of sidelink UEs and to measure the time of departure (ToD) of the transmission of the reference signal.

The medium 1120 and/or memory 1104 may include a time difference module 1126 that when implemented by the one or more processors 1102 configures the one or more processors 1102 to determine Rx-Tx time differences ($T_{UE\_Rx \to Rx\_i}$) between the reception (e.g., the measured ToA) of a reference signal received from a network entity, and the transmission (e.g., the measured ToD) of sidelink reference signals sent to each of a plurality of sidelink UEs. The one or more processors 1102 may be further or alternatively configured to determine the time difference ($T_{Rx\_sidelink\_i} - T_{Rx\_RS\_i}$) between the reception (e.g., ToA) of a reference signal from a network entity and the reception (e.g., ToA) of a sidelink reference signal received from another UE.

The medium 1120 and/or memory 1104 may include a report module 1128 that when implemented by the one or more processors 1102 configures the one or more processors 1102 to receive or send, e.g., via the wireless transceiver 1110, a report that includes one or more measured parameters, such as the Rx-Tx time difference ($T_{UE\_Rx \to Tx\_i}$), time difference ($T_{Rx\_sidelink\_i} - T_{Rx\_RS\_i}$), a determined range-sum, differential range-sums, etc. The one or more processors 1102 may be further configured to include in the report an identifier for the network entity from which a reference signal was received, an identifier for the reference signal received from the network entity, an identifier for the SL reference signal transmitted or received, and identifier for the UE and an identifier for each sidelink UE, and a time stamp associated with the measured parameter. The one or more processors 1102 may be further configured to send, e.g., via the wireless transceiver 1110, the group-delay status of the UE, which may be sent periodically, aperiodically, triggered by an event, or a combination thereof.

The medium 1120 and/or memory 1104 may include a range-sum module 1130 that when implemented by the one or more processors 1102 configures the one or more processors 1102 to determine the range-sum for each sidelink UE, which is a sum of a first range between the UE and a network entity and a second range between the UE and each respective sidelink UE. The one or more processors 1102 may be configured to determine the range-sum ($R_{sum\_i}$) based on the Rx-Tx time difference ($T_{UE\_Rx \to Tx\_i}$), time difference ($T_{Rx\_sidelink\_i}-T_{Rx\_RS\_i}$), and a distance between the sidelink UE and the network entity, e.g., as described in reference to FIG. 8.

The medium 1120 and/or memory 1104 may include a differential range-sum module 1132 that when implemented by the one or more processors 1102 configures the one or more processors 1102 to determine the differential range-sum for the plurality of sidelink UEs. For example, the one or more processors 1102 may be configured to determine the differential range-sums $R_{sum\_diff\_j}$ as a difference between a range-sum for a reference sidelink UE ($R_{sum\_Ref}$) from the plurality of sidelink UEs and the range-sum for each of the other sidelink UEs ($R_{sum\_j}$), e.g., as described in reference to FIG. 8.

The medium 1120 and/or memory 1104 may include a reference SL UE module 1134 that when implemented by the one or more processors 1102 configures the one or more processors 1102 to receive from a location server, e.g., via the wireless transceiver 1110, an identifier for a reference sidelink UE or to determine the reference sidelink UE. For example, the one or more processors 1102 may be configured to determine a signal strength of the sidelink signals received, via the wireless transceiver 1110, from one or more other UEs, such as RSSI, RSRP, SNR, etc. For example, the one or more processors 1102 may be configured to determine a signal strength of the sidelink signals received from each of the sidelink UEs. In another example, the one or more processors 1102 may be configured to determine a signal strength of the sidelink signals received from the target UE and to report the signal strength to a location server or the target UE. The one or more processors 1102 may be configured to select the reference sidelink UE based, at least in part, on the highest signal strength. Other parameters that may be used, for example, may be related to the sidelink connections, e.g., the persistency of the sidelink connections, or the geometry of the sidelink UEs positions, geometric dilution of precision (GDOP), etc.

The medium 1120 and/or memory 1104 may include a group-delay status module 1136 that when implemented by the one or more processors 1102 configures the one or more processors 1102 to determine the group-delay status for the wireless transceiver 1110 and/or wireless transceiver 1112. The group-delay status may be an indication of whether the group-delay is calibrated or not calibrated. The group-delay status may a calibration error statistic for the group-delay, such as the mean and variance of the calibration error. The one or more processors 1102 may be configured to report the group-delay status to a location server, via the wireless transceiver 1110. The group-delay status may be reported, for example, periodically, aperiodically, triggered by an event, or a combination thereof.

The medium 1120 and/or memory 1104 may include a positioning module 1138 that when implemented by the one or more processors 1102 configures the one or more processors 1102 to determine the position of the UE 1100 based at least in part on the differential range-sums for the plurality of sidelink UEs. The position of the UE 1100, for example, may be determined further based on positions of the sidelink UEs, e.g., received in assistance data. The position of the UE may be determined, for example, based on the intersection of hyperbolas or hyperboloids produced by the differential range-sums and the locations of sidelink UEs, e.g., as discussed in FIG. 8.

The medium 1120 and/or memory 1104 may include an assistance data module 1140 that when implemented by the one or more processors 1102 configures the one or more processors 1102 to receive, via wireless transceiver 1110, assistance data from any of the location server, the base station, or the sidelink UEs, which may include the position of the sidelink UEs and position of the base station.

The methodologies described herein may be implemented by various means depending upon the application. For example, these methodologies may be implemented in hardware, firmware, software, or any combination thereof. For a hardware implementation, the one or more processors 1102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1120 or memory 1104 that is connected to and executed by the one or more processors 1102. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1108 on a non-transitory computer readable medium, such as medium 1120 and/or memory 1104. Examples include computer readable media encoded with a data structure and computer readable media encoded with a computer program 1108. For example, the non-transitory computer readable medium including program code 1108 stored thereon may include program code 1108 to support location of the UE by storing UE positioning capabilities in the core network in a manner consistent with disclosed embodiments. Non-transitory computer readable medium 1120 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1108 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1120, instructions and/or data may be provided as signals on transmission media included in a communication apparatus. For example, a communication apparatus may include a wireless transceiver 1110 having signals indicative of instructions and data. The instructions and data are configured to cause one or more processors to implement the functions outlined in the claims. That is, the communication apparatus includes transmission media with signals indicative of information to perform disclosed functions.

Memory 1104 may represent any data storage mechanism. Memory 1104 may include, for example, a primary memory and/or a secondary memory. Primary memory may include, for example, a random access memory, read only memory, etc. While illustrated in this example as being separate from one or more processors 1102, it should be understood that all or part of a primary memory may be provided within or otherwise co-located/coupled with the one or more processors 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1120. As such, in certain example implementations, the methods and/or apparatuses presented herein may take the form in whole or part of a computer readable medium 1120 that may include computer implementable code 1108 stored thereon, which if executed by one or more processors 1102 may be operatively enabled to perform all or portions of the example operations as described herein. Computer readable medium 1120 may be a part of memory 1104.

Figure 12:
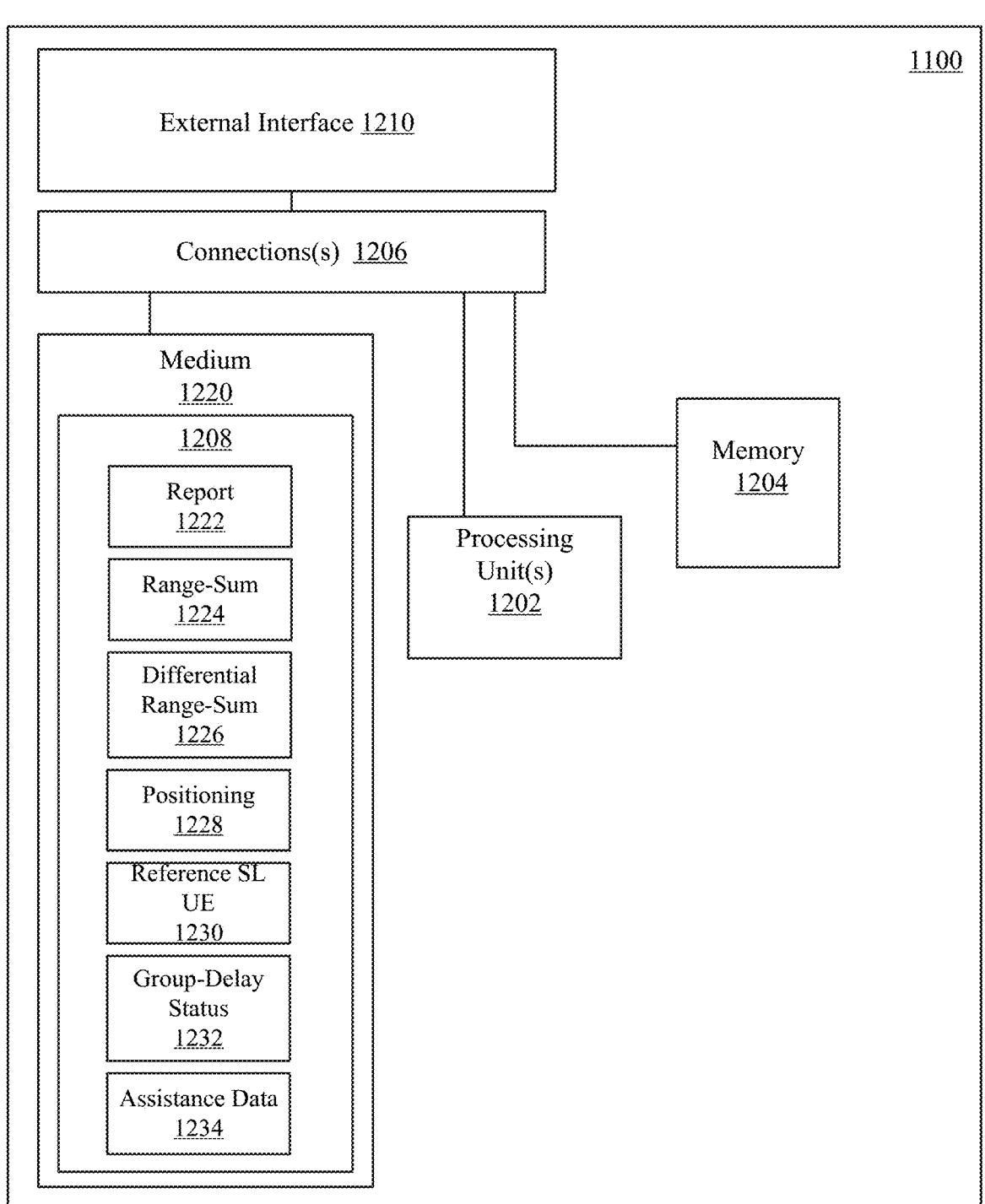
FIG. 12 shows a schematic block diagram illustrating certain exemplary features of a location server that is configured for supporting positioning using differential range-sums.

FIG. 12 shows a schematic block diagram illustrating certain exemplary features of a location server 1200, e.g., LMF 152 or SLP 162, shown in FIG. 1, that is configured to support positioning of a UE using differential range-sums, e.g., as discussed herein. The location server 1200 may perform the signaling flow show in in FIGS. 9 and 10 and the process flows, e.g., shown in FIGS. 14 and 15 and algorithms disclosed herein. Location server 1200 may, for example, include one or more processors 1202, memory 1204, an external interface 1216 (e.g., wireline or wireless network interface to base stations and/or entities in the core network), which may be operatively coupled with one or more connections 1206 (e.g., buses, lines, fibers, links, etc.) to non-transitory computer readable medium 1220 and memory 1204. In certain example implementations, all or part of location server 1200 may take the form of a chipset, and/or the like.

The one or more processors 1202 may be implemented using a combination of hardware, firmware, and software. For example, the one or more processors 1202 may be configured to perform the functions discussed herein by implementing one or more instructions or program code 1208 on a non-transitory computer readable medium, such as medium 1220 and/or memory 1204. In some embodiments, the one or more processors 1202 may represent one or more circuits configurable to perform at least a portion of a data signal computing procedure or process related to the operation of location server 1200.

The medium 1220 and/or memory 1204 may store instructions or program code 1208 that contain executable code or software instructions that when executed by the one or more processors 1202 cause the one or more processors 1202 to operate as a special purpose computer programmed to perform the techniques disclosed herein. As illustrated in location server 1200, the medium 1220 and/or memory 1204 may include one or more components or modules that may be implemented by the one or more processors 1202 to perform the methodologies described herein. While the components or modules are illustrated as software in medium 1220 that is executable by the one or more processors 1202, it should be understood that the components or modules may be stored in memory 1204 or may be dedicated hardware either in the one or more processors 1202 or off the processors.

A number of software modules and data tables may reside in the medium 1220 and/or memory 1204 and be utilized by the one or more processors 1202 in order to manage both communications and the functionality described herein. It should be appreciated that the organization of the contents of the medium 1220 and/or memory 1204 as shown in location server 1200 is merely exemplary, and as such the functionality of the modules and/or data structures may be combined, separated, and/or be structured in different ways depending upon the implementation of the location server 1200.

The medium 1220 and/or memory 1204 may include a report module 1222 that when implemented by the one or more processors 1202 configures the one or more processors 1202 to receive, e.g., via the external interface 1210, reports from the sidelink UEs and target UE that include one or more measured parameters, such as the Rx-Tx time difference $(T_{UE\_Rx \to Tx\_i})$ from the target UE, time difference $(T_{Rx\_sidelink\_i} - T_{Rx\_RS\_i})$ from the sidelink UEs, a determined range-sum and/or differential range-sums from the target UE, etc. The one or more processors 1202 may be further configured to receive in the report an identifier for the network entity from which a reference signal was received, an identifier for the reference signal received from the network entity, an identifier for the SL reference signal transmitted or received, and identifier for the UE and an identifier for each sidelink UE, and a time stamp associated with the measured parameter. The one or more processors 1202 may be configured to send or forward, e.g., via the external interface 1210, reports from the sidelink UEs to the target UE, such as time difference $(T_{Rx\_sidelink\_i} - T_{Rx\_RS\_i})$ from the sidelink UEs, e.g., along with any received identifiers and time stamp. The one or more processors 1202 may be further configured to receive, e.g., via the external interface 1210, the group-delay status of the UE, which may be sent periodically, aperiodically, triggered by an event, or a combination thereof.

The medium 1220 and/or memory 1204 may include a range-sum module 1224 that when implemented by the one or more processors 1202 configures the one or more processors 1202 to determine the range-sum for each sidelink UE, which is a sum of a first range between the UE and a network entity and a second range between the UE and each respective sidelink UE. The one or more processors 1202 may be configured to determine the range-sum $(R_{sum\_i})$ based on the Rx-Tx time difference $(T_{UE\_Rx \to Tx\_i})$, time difference $(T_{Rx\_sidelink\_i} - T_{Rx\_RS\_i})$, and a distance between the sidelink UE and the network entity, e.g., as described in reference to FIG. 8.

The medium 1220 and/or memory 1204 may include a differential range-sum module 1226 that when implemented by the one or more processors 1202 configures the one or more processors 1202 to determine the differential range-sum for the plurality of sidelink UEs. For example, the one or more processors 1202 may be configured to determine the differential range-sums $R_{sum\_diff\_j}$ as a difference between a range-sum for a reference sidelink UE $(R_{sum\_Ref})$ from the plurality of sidelink UEs and the range-sum for each of the other sidelink UEs ($R_{sum\_j}$), e.g., as described in reference to FIG. 8.

The medium 1220 and/or memory 1204 may include a positioning module 1228 that when implemented by the one or more processors 1202 configures the one or more processors 1202 to determine the position of the target UE based at least in part on the differential range-sums for the plurality of sidelink UEs. The position of the UE, for example, may be determined further based on positions of the sidelink UEs. The position of the UE may be determined, for example, based on the intersection of hyperbolas or hyperboloids produced by the differential range-sums and the locations of sidelink UEs, e.g., as discussed in FIG. 8.

The medium 1220 and/or memory 1204 may include a reference SL UE module 1230 that when implemented by the one or more processors 1202 configures the one or more processors 1202 to receive, via the external interface 1210, information used to determine a reference sidelink UE and to determine the reference sidelink UE. For example, the one or more processors 1202 may be configured to receive, via the external interface 1210, an identifier for the reference sidelink UE, e.g., from the target UE, or signal strength measurements of the sidelink signals from the target UE and/or the sidelink UEs, such as RSSI, RSRP, SNR, etc. The one or more processors 1202 may be configured to select the reference sidelink UE based, at least in part, on the highest signal strength. Other parameters that may be used, for example, may be related to the sidelink connections, e.g., the persistency of the sidelink connections, or the geometry of the sidelink UEs positions, geometric dilution of precision (GDOP), etc. The one or more processors 1202 may be configured to send, via the external interface 1210, the identifier for the reference sidelink UE to the target UE.

The medium 1220 and/or memory 1204 may include a group-delay status module 1232 that when implemented by the one or more processors 1202 configures the one or more processors 1202 to receive the group-delay status from the UE, via the external interface 1210. The group-delay status may be an indication of whether the group-delay is calibrated or not calibrated. The group-delay status may a calibration error statistic for the group-delay, such as the mean and variance of the calibration error. The group-delay status may be received, for example, periodically, aperiodically, triggered by an event, or a combination thereof.

The medium 1220 and/or memory 1204 may include an assistance data module 1234 that when implemented by the one or more processors 1202 configures the one or more processors 1202 prepare and to send, via external interface 1210, assistance data to the target UE, which may include the position of the sidelink UEs and position of the base station.

The methodologies described herein may be implemented by various means depending upon the application. For example, these methodologies may be implemented in hardware, firmware, software, or any combination thereof. For a hardware implementation, the one or more processors 1202 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1220 or memory 1204 that is connected to and executed by the one or more processors 1202. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1208 on a non-transitory computer readable medium, such as medium 1220 and/or memory 1204. Examples include computer readable media encoded with a data structure and computer readable media encoded with a computer program 1208. For example, the non-transitory computer readable medium including program code 1208 stored thereon may include program code 1208 to support position determination of a target UE using differential range-sums in a manner consistent with disclosed embodiments. Non-transitory computer readable medium 1220 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1208 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1220, instructions and/or data may be provided as signals on transmission media included in a communication apparatus. For example, a communication apparatus may include an external interface 1216 having signals indicative of instructions and data. The instructions and data are configured to cause one or more processors to implement the functions outlined in the claims. That is, the communication apparatus includes transmission media with signals indicative of information to perform disclosed functions.

Memory 1204 may represent any data storage mechanism. Memory 1204 may include, for example, a primary memory and/or a secondary memory. Primary memory may include, for example, a random access memory, read only memory, etc. While illustrated in this example as being separate from one or more processors 1202, it should be understood that all or part of a primary memory may be provided within or otherwise co-located/coupled with the one or more processors 1202. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1220. As such, in certain example implementations, the methods and/or apparatuses presented herein may take the form in whole or part of a computer readable medium 1220 that may include computer implementable code 1208 stored thereon, which if executed by one or more processors 1202 may be operatively enabled to perform all or portions of the example operations as described herein. Computer readable medium 1220 may be a part of memory 1204.

FIG. 13 shows a flow diagram for an exemplary method 1300 for determining a position of a first UE in wireless network, that is performed by the first UE, in a manner consistent with disclosed implementations. The first UE may be a target UE or light UE, such as UE 105 shown in FIGS. 1 and 2, the target UE 810 shown in FIGS. 8, 9, and 10, or the UE 1100 shown in FIG. 11 operating as a target UE.

At block 1302, the first UE receives a first reference signal from a network entity, e.g., as discussed at stage 940 in FIG. 9 and stage 1040 in FIG. 10. For example, the reference signal may be a DL PRS signal or other DL reference signal used for positioning, such as reference signal 850 shown in FIG. 8, and the network entity may be a base station, such as an eNB or gNB, or an access point, and is illustrated as base station 802 shown in FIGS. 8, 9, and 10. A means for receiving a first reference signal from a network entity may include, e.g., the wireless transceiver 1110 or wireless transceiver 1112 and one or more processors 1102 with dedicated hardware or implementing executable code or software instructions in memory 1104 and/or medium 1120 in UE 1100, such as the reference signal receive module 1122, shown in FIG. 11.

At block 1304, the first UE sends one or more sidelink reference signals to a plurality of sidelink UEs, e.g., as discussed at stage 945 in FIG. 9 and stage 1045 in FIG. 10. The sidelink reference signals, for example, may be SL-PRS or SL-CSI-RS for positioning, such as reference signals 860 shown in FIG. 8. A means for sending one or more sidelink reference signals to a plurality of sidelink UEs may include, e.g., the wireless transceiver 1110 or wireless transceiver 1112 and one or more processors 1102 with dedicated hardware or implementing executable code or software instructions in memory 1104 and/or medium 1120 in UE 1100, such as the sidelink reference signal module 1124, shown in FIG. 11.

At block 1306, the first UE determines a receive-transmit (Rx-Tx) time difference associated with each sidelink UE, wherein the Rx-Tx time difference associated with each sidelink UE is a time difference between receiving the first reference signal from the network entity and sending the sidelink reference signal to a respective sidelink UE, e.g., as discussed at stage 950 in FIG. 9 and stage 1050 in FIG. 10. The Rx-Tx time difference for each sidelink UE, for example, may be determined as the Rx-Tx time differences $(T_{UE\_Rx \rightarrow Tx\_i})$ between the reception (e.g., the measured ToA) of the reference signal 850 and the transmission (e.g., the measured ToD) of the sidelink reference signal 870*i* sent to the respective sidelink UE 820*i*, e.g., as described in FIG. 8. A means for determining a receive-transmit (Rx-Tx) time difference associated with each sidelink UE, wherein the Rx-Tx time difference associated with each sidelink UE is a time difference between receiving the first reference signal from the network entity and sending the sidelink reference signal to a respective sidelink UE may include, e.g., the one or more processors 1102 with dedicated hardware or implementing executable code or software instructions in memory 1104 and/or medium 1120 in UE 1100, such as the time difference module 1126, shown in FIG. 11.

At block 1308, the first UE processes the Rx-Tx time difference associated with each sidelink UE for generating differential range-sums for the plurality of sidelink UEs based on the Rx-Tx time differences associated with each sidelink UE and a time difference measured by each sidelink UE, where the time difference measured by each sidelink UE is the time difference between receiving the sidelink reference signal from the first UE and receiving a second reference signal from the network entity, each differential range-sum is a difference between a range-sum for a reference sidelink UE from the plurality of sidelink UEs and a range-sum for another sidelink UE from the plurality of sidelink UEs, and where the range-sum for each sidelink UE is a sum of a first range between the first UE and the network entity and a second range between the first UE and the respective sidelink UE, wherein the position of the first UE is determined based at least in part on the differential range-sums for the plurality of sidelink UEs, e.g., as discussed at stages 970 and 980 of FIG. 9 and at stages 1065, 1075, 1078, and 1080 of FIG. 10. In one example, the first UE may engage in UE-based positioning in which the first UE processes the Rx-Tx time difference associated with each sidelink UE for generating differential range-sums by determining the differential range-sums, as discussed in FIG. 8 and discussed at stage 970 in FIG. 9. In one example, the first UE may engage in UE-assisted positioning in which the first UE processes the Rx-Tx time difference associated with each sidelink UE for generating differential range-sums by preparing a report and sending the Rx-Tx time difference associated with each sidelink UE to a location server for generating the differential range-sums, as discussed in FIG. 8 and discussed at stage 1065 of FIG. 10, or by determining the differential range-sums and sending the differential range-sums to the location server for determining the position of the UE, as discussed in FIG. 8 and discussed at stage 1075 and 1078 in FIG. 10. The time difference measured by each sidelink UE, for example, is the time difference $(T_{Rx\_sidelink\_i} - T_{Rx\_RS\_i})$ measured by each sidelink UE 820*i* between the reception (e.g., ToA) of the reference signal 860 sent by the base station 802 and the reception (e.g., ToA) of the sidelink reference signal 870*i* sent by the first UE 810, e.g., as discussed in FIG. 8. A means for processing the Rx-Tx time difference associated with each sidelink UE for generating differential range-sums for the plurality of sidelink UEs based on the Rx-Tx time differences associated with each sidelink UE and a time difference measured by each sidelink UE, wherein the time difference measured by each sidelink UE is the time difference between receiving the sidelink reference signal from the first UE and receiving a second reference signal from the network entity, each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE, wherein the position of the first UE is determined based at least in part on the differential range-sums for the plurality of sidelink UEs may include, e.g., the wireless transceiver 1110 or wireless transceiver 1112 and one or more processors 1102 with dedicated hardware or implementing executable code or software instructions in memory 1104 and/or medium 1120 in UE 1100, such as the report module 1128 and/or the range-sum module 1130 and the differential range-sum module 1132, shown in FIG. 11.

In one implementation, the first UE may further receive the time difference measured by each sidelink UE in the plurality of sidelink UEs, e.g., as discussed at stage 960 and 965 in FIG. 9 and at stage 1060 in FIG. 10. For example, the time difference measured by each sidelink UE may be received directly, e.g., using sidelink communications, from each sidelink UE, or may be received from a location server. A means for receiving the time difference measured by each sidelink UE in the plurality of sidelink UEs may include, e.g., the wireless transceiver 1110 or wireless transceiver 1112 and one or more processors 1102 with dedicated hardware or implementing executable code or software instructions in memory 1104 and/or medium 1120 in UE 1100, such as the report module 1128, shown in FIG. 11. The processing the Rx-Tx time difference associated with each sidelink UE for generating the differential range-sums for the plurality of sidelink UEs, for example, may comprise determining the differential range-sums for the plurality of sidelink UEs based on the Rx-Tx time differences associated with each sidelink UE and the time difference measured by each sidelink UE, e.g., as discussed at stage 970 of FIG. 9 or stage 1075 of FIG. 10. A means for determining the differential range-sums for the plurality of sidelink UEs based on the Rx-Tx time differences associated with each sidelink UE and the time difference measured by each sidelink UE may include, e.g., the one or more processors 1102 with dedicated hardware or implementing executable code or software instructions in memory 1104 and/or medium 1120 in UE 1100, such as the range-sum module 1130 and the differential range-sum module 1132, shown in FIG. 11.

For example, the first UE may determine the differential range-sums by determining, for each sidelink UE, the range-sum based on the Rx-Tx time difference associated with a respective sidelink UE and the time difference measured by the respective sidelink UE, e.g., as discussed at stage 970 of FIG. 9 or stage 1075 of FIG. 10. For example, the first UE may determine the range-sum ($R_{sum}$) for each of the plurality of sidelink UEs 820 as discussed in stage 8. A means for determining, for each sidelink UE, the range-sum based on the Rx-Tx time difference associated with a respective sidelink UE and the time difference measured by the respective sidelink UE may include, e.g., the one or more processors 1102 with dedicated hardware or implementing executable code or software instructions in memory 1104 and/or medium 1120 in UE 1100, such as the range-sum module 1130, shown in FIG. 11. The first UE may further determine the difference between the range-sum for the reference sidelink UE and the range-sum for each other sidelink UE from the plurality of sidelink UEs, e.g., as discussed at stage 970 of FIG. 9 or stage 1075 of FIG. 10. For example, the first UE may determine the differential range-sums ($R_{sum\_diff\_j}$) for each pair of sidelink UEs that include a reference sidelink UE and another sidelink UE, as discussed in FIG. 8. A means for determining the difference between the range-sum for the reference sidelink UE and the range-sum for each other sidelink UE from the plurality of sidelink UEs may include, e.g., the one or more processors 1102 with dedicated hardware or implementing executable code or software instructions in memory 1104 and/or medium 1120 in UE 1100, such as the differential range-sum module 1132, shown in FIG. 11.

The first UE may further receive with the time difference measured by the respective sidelink UE, an identifier for the network entity, an identifier for the second reference signal received from the network entity, an identifier for the sidelink reference signal received from the first UE, and an identifier for the sidelink UE, e.g., as discussed at stage 960 and 965 of FIG. 9 or stage 1060 of FIG. 10. The first UE may further receive a time stamp with the time difference measured by the respective sidelink UE, e.g., as discussed at stage 960 and 965 of FIG. 9 or stage 1060 of FIG. A means for receiving with the time difference measured by the respective sidelink UE, an identifier for the network entity, an identifier for the second reference signal received from the network entity, an identifier for the sidelink reference signal received from the first UE, and an identifier for the sidelink UE, and a means for receiving a time stamp with the time difference measured by the respective sidelink UE may include, e.g., the wireless transceiver 1110 or wireless transceiver 1112 and one or more processors 1102 with dedicated hardware or implementing executable code or software instructions in memory 1104 and/or medium 1120 in UE 1100, such as the report module 1128, shown in FIG. 11.

The first UE, in one example, may receive from a location server, an identifier for the reference sidelink UE, e.g., as discussed at stage 912 of FIG. 9 and stage 1012 of FIG. 10. A means for receiving from a location server, an identifier for the reference sidelink UE may include, e.g., the wireless transceiver 1110 or wireless transceiver 1112 and one or more processors 1102 with dedicated hardware or implementing executable code or software instructions in memory 1104 and/or medium 1120 in UE 1100, such as the reference SL UE module 1134, shown in FIG. 11.

The first UE, for example, may determine to use the differential range-sums for determining the position of the first UE based at least in part on a group-delay calibration status of the first UE, e.g., as discussed in stage 910 of FIG. 9 and stage 1010 of FIG. 10. A means for determining to use the differential range-sums for determining the position of the first UE based at least in part on a group-delay calibration status of the first UE may include, e.g., the one or more processors 1102 with dedicated hardware or implementing executable code or software instructions in memory 1104 and/or medium 1120 in UE 1100, such as the group-delay status module 1136, shown in FIG. 11.

In one implementation, the first UE may further determine the position of the first UE based at least in part on the differential range-sums for the plurality of sidelink UEs, e.g., as discussed at stage 980 of FIG. 9. The position of the first UE, for example, may be determined in a UE-based positioning procedure based on the intersection of hyperbolas or hyperboloids produced by the differential range-sums and the locations of sidelink UEs, e.g., as discussed in FIG. 8 and at stage 980 of FIG. 9. A means for determining the position of the first UE based at least in part on the differential range-sums for the plurality of sidelink UEs may include, e.g., the one or more processors 1102 with dedicated hardware or implementing executable code or software instructions in memory 1104 and/or medium 1120 in UE 1100, such as the positioning module 1138, shown in FIG. 11.

For example, the first UE may receive assistance data comprising a position of the network entity and positions of the sidelink UEs, wherein determining the position of the first UE is further based on the position of the network entity and positions of the sidelink UEs, e.g., as discussed at stage 925 of FIG. 9. A means for receiving assistance data comprising a position of the network entity and positions of the sidelink UEs, wherein determining the position of the first UE is further based on the position of the network entity and positions of the sidelink UEs may include, e.g., the wireless transceiver 1110 or wireless transceiver 1112 and one or more processors 1102 with dedicated hardware or implementing executable code or software instructions in memory 1104 and/or medium 1120 in UE 1100, such as the assistance data module 1140, shown in FIG. 11.

In one implementation, the first UE may send the differential range-sums for the plurality of sidelink UEs to a location server, wherein the position of the first UE is determined by the location server based at least in part on the differential range-sums for the plurality of sidelink UEs, e.g., as discussed at stage 1078 of FIG. 10. A means for sending the differential range-sums for the plurality of sidelink UEs to a location server, wherein the position of the first UE is determined by the location server based at least in part on the differential range-sums for the plurality of sidelink UEs may include, e.g., the wireless transceiver 1110 or wireless transceiver 1112 and one or more processors 1102 with dedicated hardware or implementing executable code or software instructions in memory 1104 and/or medium 1120 in UE 1100, such as the report module 1128, shown in FIG. 11.

The first UE, for example, may send with the differential range-sums for the plurality of sidelink UEs to the location server an identifier for the network entity, an identifier for the first reference signal received from the network entity, an identifier for the one or more sidelink reference signals sent to the plurality of sidelink UEs, an identifier for the first UE, and an identifier for each of the sidelink UEs, e.g., as discussed at stage 1078 of FIG. 10. The first UE may further send a time stamp with the differential range-sums for the plurality of sidelink UEs, e.g., as discussed at stage 1078 of FIG. 10. A means for sending with the differential range-sums for the plurality of sidelink UEs to the location server an identifier for the network entity, an identifier for the first reference signal received from the network entity, an identifier for the one or more sidelink reference signals sent to the plurality of sidelink UEs, an identifier for the first UE, and an identifier for each of the sidelink UEs, and a means for sending a time stamp with the differential range-sums for the plurality of sidelink UEs may include, e.g., the wireless transceiver 1110 or wireless transceiver 1112 and one or more processors 1102 with dedicated hardware or implementing executable code or software instructions in memory 1104 and/or medium 1120 in UE 1100, such as the report module 1128, shown in FIG. 11.

In one implementation, the processing the Rx-Tx time difference associated with each sidelink UE for generating the differential range-sums for the plurality of sidelink UEs, for example, may comprise sending the Rx-Tx time difference associated with each sidelink UE to a location server, wherein the differential range-sums for the plurality of sidelink UEs is determined by the location server based on the Rx-Tx time differences associated with each sidelink UE and the time difference measured by each sidelink UE, and wherein the position of the first UE is determined by the location server based at least in part on the differential range-sums for the plurality of sidelink UEs, e.g., as discussed at stages 1065, 1070, and 1080 of FIG. 10. A means for sending the Rx-Tx time difference associated with each sidelink UE to a location server, wherein the differential range-sums for the plurality of sidelink UEs is determined by the location server based on the Rx-Tx time differences associated with each sidelink UE and the time difference measured by each sidelink UE, and wherein the position of the first UE is determined by the location server based at least in part on the differential range-sums for the plurality of sidelink UEs may include, e.g., the wireless transceiver 1110 or wireless transceiver 1112 and one or more processors 1102 with dedicated hardware or implementing executable code or software instructions in memory 1104 and/or medium 1120 in UE 1100, such as the report module 1128, shown in FIG. 11.

The first UE, for example, may send with the Rx-Tx time difference associated with each sidelink UE to the location server an identifier for the network entity, an identifier for the first reference signal received from the network entity, an identifier for the one or more sidelink reference signals sent to the plurality of sidelink UEs, an identifier for the first UE, and an identifier for each of the sidelink UEs, e.g., as discussed at stage 1065 of FIG. 10. The first UE may further send a time stamp with the Rx-Tx time difference associated with each sidelink UE, e.g., discussed at stage 1065 of FIG. 10. A means for sending with the Rx-Tx time difference associated with each sidelink UE to the location server an identifier for the network entity, an identifier for the first reference signal received from the network entity, an identifier for the one or more sidelink reference signals sent to the plurality of sidelink UEs, an identifier for the first UE, and an identifier for each of the sidelink UEs, and a means for sending a time stamp with the Rx-Tx time difference associated with each sidelink UE may include, e.g., the wireless transceiver 1110 or wireless transceiver 1112 and one or more processors 1102 with dedicated hardware or implementing executable code or software instructions in memory 1104 and/or medium 1120 in UE 1100, such as the report module 1128, shown in FIG. 11.

In one implementation, the first UE may send to the location server a group-delay calibration status of the first UE, wherein the use of the differential range-sums for the plurality of sidelink UEs to determine the position for the first UE is determined by the location server based at least in part on the group-delay calibration status of the first UE, e.g., as discussed at stage 1010 of FIG. 10. The group-delay calibration status of the first UE, for example, may comprise an indication of whether a group-delay for the first UE is calibrated or not. The group-delay calibration status of the first UE, for example, may comprise a calibration error statistic for a group-delay for the first UE. The group-delay calibration status of the first UE may be sent to the location server periodically, aperiodically, triggered by an event, or a combination thereof. A means for sending to the location server a group-delay calibration status of the first UE, wherein the use of the differential range-sums for the plurality of sidelink UEs to determine the position for the first UE is determined by the UE based at least in part on the group-delay calibration status of the first UE may include, e.g., the wireless transceiver 1110 or wireless transceiver 1112 and one or more processors 1102 with dedicated hardware or implementing executable code or software instructions in memory 1104 and/or medium 1120 in UE 1100, such as the group-delay status module 1136 and the report module 1128, shown in FIG. 11.

FIG. 14 shows a flow diagram for an exemplary method 1400 for determining a position of a first UE in wireless network, that is performed by a location server, in a manner consistent with disclosed implementations. The location server may be, e.g., location server 160 shown in FIG. 1 or LMF 220 shown in FIG. 2, location server 804 shown in FIGS. 8 and 9, or the location server 1200 shown in FIG. 12.

At block 1402, the location server obtains differential range-sums for the first UE and a plurality of sidelink UEs based on receive-transmit (Rx-Tx) time difference associated with each sidelink UE measured by the first UE, wherein the Rx-Tx time difference associated with each sidelink UE is a time difference measured by the first UE between receiving a first reference signal from a network entity and sending a sidelink reference signal to a respective sidelink UE, wherein the differential range-sums for the first UE and the plurality of sidelink UEs is further based on time differences measured by the plurality of sidelink UEs, wherein the time difference measured by each sidelink UE is a time difference between receiving the sidelink reference signal from the first UE and receiving a second reference signal from the network entity, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE, e.g., as discussed at stages 1070 or 1078 in FIG. 10. For example, the Rx-Tx time difference associated with each sidelink UE, for example, may be determined by the first UE as the Rx-Tx time differences $(T_{UE\_Rx \to Tx\_i})$ between the reception (e.g., the measured ToA) of the reference signal 850 and the transmission (e.g., the measured ToD) of the sidelink reference signal 870*i* sent to the respective sidelink UE 820*i*, e.g., as described in FIG. 8. The time difference measured by each sidelink UE, for example, is the time difference $(T_{Rx\_sidelink\_i} - T_{Rx\_RS\_i})$ measured by each sidelink UE 820*i* between the reception (e.g., ToA) of the reference signal 860 sent by the base station 802 and the reception (e.g., ToA) of the sidelink reference signal 870*i* sent by the first UE 810, e.g., as discussed in FIG. 8. A means for obtaining differential range-sums for the first UE and a plurality of sidelink UEs based on receive-transmit (Rx-Tx) time difference associated with each sidelink UE measured by the first UE, wherein the Rx-Tx time difference associated with each sidelink UE is a time difference measured by the first UE between receiving a first reference signal from a network entity and sending a sidelink reference signal to a respective sidelink UE, wherein the differential range-sums for the first UE and the plurality of sidelink UEs is further based on time differences measured by the plurality of sidelink UEs, wherein the time difference measured by each sidelink UE is a time difference between receiving the sidelink reference signal from the first UE and receiving a second reference signal from the network entity, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE may include, e.g., the external interface 1210 and one or more processors 1202 with dedicated hardware or implementing executable code or software instructions in memory 1204 and/or medium 1220 in location server 1200, such as the report module 1222 and/or the range-sum module 1224 and the differential range-sum module 1226, shown in FIG. 12.

At block 1404, the location server determines the position of the first UE based at least in part on the differential range-sums for the plurality of sidelink UEs, e.g., as discussed at stage 1080 of FIG. 10. For example, the location server determines the position of the first UE further based on a position of the network entity and positions of the sidelink UEs. The position of the first UE, for example, may be determined in a UE-assisted positioning procedure based on the intersection of hyperbolas or hyperboloids produced by the differential range-sums and the locations of sidelink UEs, e.g., as discussed in FIG. 8 and at stage 1080 of FIG. 10. A means for determining the position of the first UE based at least in part on the differential range-sums for the plurality of sidelink UEs may include, e.g., the one or more processors 1202 with dedicated hardware or implementing executable code or software instructions in memory 1204 and/or medium 1220 in location server 1200, such as the positioning module 1228, shown in FIG. 12.

In one implementation, the location server obtains the differential range-sums for the first UE and the plurality of sidelink UEs by receiving the Rx-Tx time difference associated with each sidelink UE from the first UE, e.g., as discussed at stage 1065 of FIG. 10, and receiving the time difference measured by each sidelink UE, e.g., as discussed at stage 1060 of FIG. 10. The location server determines the differential range-sums for the first UE and the plurality of sidelink UEs based on the Rx-Tx time differences associated with each sidelink UE and the time difference measured by each sidelink UE, e.g., as discussed at stage 1070 of FIG. 10. A means for receiving the Rx-Tx time difference associated with each sidelink UE from the first UE and a means for receiving the time difference measured by each sidelink UE may include, e.g., the external interface 1210 and one or more processors 1202 with dedicated hardware or implementing executable code or software instructions in memory 1204 and/or medium 1220 in location server 1200, such as the report module 1222, shown in FIG. 12. A means for determining the differential range-sums for the first UE and the plurality of sidelink UEs based on the Rx-Tx time differences associated with each sidelink UE and the time difference measured by each sidelink UE may include, e.g., the one or more processors 1202 with dedicated hardware or implementing executable code or software instructions in memory 1204 and/or medium 1220 in location server 1200, such as the range-sum module 1224 and the differential range-sum module 1226, shown in FIG. 12.

For example, the location server may determine the differential range-sums by determining, for each sidelink UE, the range-sum based on the Rx-Tx time difference associated with a respective sidelink UE and the time difference measured by the respective sidelink UE, e.g., as discussed at stage 1070 of FIG. 10. For example, the location server may determine the range-sum $(R_{sum})$ for each of the plurality of sidelink UEs 820, as discussed in stage 8. A means for determining the differential range-sums by determining, for each sidelink UE, the range-sum based on the Rx-Tx time difference associated with a respective sidelink UE and the time difference measured by the respective sidelink UE may include, e.g., the one or more processors 1202 with dedicated hardware or implementing executable code or software instructions in memory 1204 and/or medium 1220 in location server 1200, such as the range-sum module 1224, shown in FIG. 12. The location server may further determine the difference between the range-sum for the reference sidelink UE the range-sum for each other sidelink UE from the plurality of sidelink UEs, e.g., as discussed at stage 1070 of FIG. 10. For example, the location server may determine the differential range-sums $(R_{sum\_diff\_j})$ for each pair of sidelink UEs that include a reference sidelink UE and another sidelink UE, as discussed in FIG. 8. A means for determining the difference between the range-sum for the reference sidelink UE the range-sum for each other sidelink UE from the plurality of sidelink UEs may include, e.g., the one or more processors 1202 with dedicated hardware or implementing executable code or software instructions in memory 1204 and/or medium 1220 in location server 1200, such as the differential range-sum module 1226, shown in FIG. 12.

The location server may further receive with the Rx-Tx time difference associated with each sidelink UE from the first UE an identifier for the network entity, an identifier for the first reference signal received from the network entity, an identifier for the one or more sidelink reference signals sent to the plurality of sidelink UEs, an identifier for the first UE, and an identifier for each of the sidelink UEs, e.g., as discussed at stage 1065 of FIG. 10. The location server may further receive a time stamp with the Rx-Tx time difference associated with each sidelink UE, e.g., as discussed at stage 1065.

The location server may further receive from each sidelink UE, with the time difference measured by the respective sidelink UE, an identifier for the network entity, an identifier for the second reference signal received from the network entity, an identifier for the sidelink reference signal received from the first UE, and an identifier for the sidelink UE, e.g., as discussed at stage 1060 of FIG. 10. The location server may further receive a time stamp from each sidelink UE with the time difference measured by the respective sidelink UE, e.g., as discussed at stage 1060 of FIG. 10.

In one implementation, the location server obtains the differential range-sums for the first UE and the plurality of sidelink UEs by receiving the differential range-sums from the first UE, e.g., as discussed at stage 1078 of FIG. 10. A means for receiving the differential range-sums from the first UE may include, e.g., the external interface 1210 and one or more processors 1202 with dedicated hardware or implementing executable code or software instructions in memory 1204 and/or medium 1220 in location server 1200, such as the report module 1222, shown in FIG. 12.

The location server may receive with the differential range-sums from the first UE an identifier for the network entity, an identifier for the first reference signal received from the network entity, an identifier for the one or more sidelink reference signals sent to the plurality of sidelink UEs, an identifier for the first UE, and an identifier for each of the sidelink UEs, e.g., as discussed at stage 1078 of FIG. 10. The location server may further receive a time stamp with the differential range-sums from the first UE, e.g., as discussed at stage 1078 of FIG. 10.

In one implementation, the location server may further receive from each of the sidelink UEs an indication of signal strength of signals from the first UE measured by each respective sidelink UE, e.g., as discussed at stage 1012 of FIG. 10. A means for receiving from each of the sidelink UEs an indication of signal strength of signals from the first UE measured by each respective sidelink UE may include, e.g., the external interface 1210 and one or more processors 1202 with dedicated hardware or implementing executable code or software instructions in memory 1204 and/or medium 1220 in location server 1200, such as the report module 1222 and the reference SL UE module 1230, shown in FIG. 12. The location server may determine the reference sidelink UE based at least in part on the indication of signal strength of signals from the first UE measured by each respective sidelink UE, e.g., as discussed at stage 1012 of FIG. 10. A means for determining the reference sidelink UE based at least in part on the indication of signal strength of signals from the first UE measured by each respective sidelink UE may include, e.g., the one or more processors 1202 with dedicated hardware or implementing executable code or software instructions in memory 1204 and/or medium 1220 in location server 1200, such as the reference SL UE module 1230, shown in FIG. 12. The location server may send to the first UE an identifier for the reference sidelink UE, e.g., as discussed at stage 1012 of FIG. 10. A means for sending to the first UE an identifier for the reference sidelink UE may include, e.g., the external interface 1210 and one or more processors 1202 with dedicated hardware or implementing executable code or software instructions in memory 1204 and/or medium 1220 in location server 1200, such as the report module 1222 and the reference SL UE module 1230, shown in FIG. 12.

The location server may further receive from the first UE a group-delay calibration status of the first UE, e.g., as discussed in stage 1010 of FIG. 10. A means for receiving from the first UE a group-delay calibration status of the first UE may include, e.g., the external interface 1210 and one or more processors 1202 with dedicated hardware or implementing executable code or software instructions in memory 1204 and/or medium 1220 in location server 1200, such as the report module 1222 and the group-delay status module 1232, shown in FIG. 12. For example, the group-delay calibration status of the first UE may comprise an indication of whether a group-delay for the first UE is calibrated or not. The group-delay calibration status of the first UE may comprise a calibration error statistic for a group-delay for the first UE. The group-delay calibration status of the first UE may be received from the first UE periodically, aperiodically, triggered by an event, or a combination thereof. The location server may determine to use the differential range-sums for the plurality of sidelink UEs to determine the position for the first UE based at least in part on the group-delay calibration status of the first UE, e.g., as discussed in stage 1010 of FIG. 10. A means for determining to use the differential range-sums for the plurality of sidelink UEs to determine the position for the first UE based at least in part on the group-delay calibration status of the first UE may include, e.g., the external interface 1210 and one or more processors 1202 with dedicated hardware or implementing executable code or software instructions in memory 1204 and/or medium 1220 in location server 1200, such as the report module 1222 and the group-delay status module 1232, shown in FIG. 12.

FIG. 15 shows a flow diagram for an exemplary method 1500 for determining a position of a first UE in wireless network, that is performed by a location server, in a manner consistent with disclosed implementations. The location server may be, e.g., location server 160 shown in FIG. 1 or LMF 220 shown in FIG. 2, location server 804 shown in FIGS. 8 and 9, or the location server 1200 shown in FIG. 12.

At block 1502, the location server receives time differences measured by a plurality of sidelink UEs, wherein the time difference measured by each sidelink UE is a time difference between receiving a sidelink reference signal from the first UE and receiving a reference signal from a network entity, e.g., as discussed at stage 960 of FIG. 9. The time difference measured by each sidelink UE, for example, is the time difference $(T_{Rx\_sidelink\_i} - T_{Rx\_RS\_i})$ measured by each sidelink UE 820$i$ between the reception (e.g., ToA) of the reference signal 860 sent by the base station 802 and the reception (e.g., ToA) of the sidelink reference signal 870$i$ sent by the first UE 810, e.g., as discussed in FIG. 8. A means for receiving time differences measured by a plurality of sidelink UEs, wherein the time difference measured by each sidelink UE is a time difference between receiving a sidelink reference signal from the first UE and receiving a reference signal from a network entity may include, e.g., the external interface 1210 and one or more processors 1202 with dedicated hardware or implementing executable code or software instructions in memory 1204 and/or medium 1220 in location server 1200, such as the report module 1222, shown in FIG. 12.

At block 1504, the location server receives sends the time differences measured by the plurality of sidelink UEs to the first UE for determining the position of the first UE based on the time differences measured by the plurality of sidelink UEs and receive-transmit (Rx-Tx) time difference associated with each sidelink UE, wherein the Rx-Tx time difference associated with each sidelink UE is a time difference measured by the first UE between receiving a second reference signal from the network entity and sending the sidelink reference signal to a respective sidelink UE, e.g., as discussed at stages 965 and 970 of FIG. 9. For example, the Rx-Tx time difference associated with each sidelink UE, for example, may be determined by the first UE as the Rx-Tx time differences ($T_{UE\_Rx \rightarrow Tx\_i}$) between the reception (e.g., the measured ToA) of the reference signal 850 and the transmission (e.g., the measured ToD) of the sidelink reference signal 870i sent to the respective sidelink UE 820i, e.g., as described in FIG. 8. A means for sending the time differences measured by the plurality of sidelink UEs to the first UE for determining the position of the first UE based on the time differences measured by the plurality of sidelink UEs and receive-transmit (Rx-Tx) time difference associated with each sidelink UE, wherein the Rx-Tx time difference associated with each sidelink UE is a time difference measured by the first UE between receiving a second reference signal from the network entity and sending the sidelink reference signal to a respective sidelink UE may include, e.g., the external interface 1210 and one or more processors 1202 with dedicated hardware or implementing executable code or software instructions in memory 1204 and/or medium 1220 in location server 1200, such as the report module 1222, shown in FIG. 12.

In one implementation, the location server may further send assistance data to the first UE comprising at least a position of the network entity, e.g., as discussed at stage 925 of FIG. 9. The assistance data, for example, may further include positions of each sidelink UE. A means for sending assistance data to the first UE comprising at least a position of the network entity may include, e.g., the external interface 1210 and one or more processors 1202 with dedicated hardware or implementing executable code or software instructions in memory 1204 and/or medium 1220 in location server 1200, such as the assistance data module 1234, shown in FIG. 12.

In one implementation, the location server may receive with the time differences measured by the plurality of sidelink UEs, an identifier for the network entity, an identifier for the second reference signal received from the network entity, an identifier for the sidelink reference signal received from the first UE, and an identifier for the sidelink UE, e.g., as discussed at stage 960. The location server may further receive time stamps with the time differences measured by the plurality of sidelink UEs, e.g., as discussed at stage 960.

In one implementation, the first UE determines differential range-sums for the plurality of sidelink UEs based on the Rx-Tx time differences associated with each sidelink UE and the time difference measured by each sidelink UE, wherein each differential range-sum is a difference between a range-sum for the reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE, e.g., as discussed in FIG. 8 and at stage 970 of FIG. 9.

The location server, for example, may further receive from each of the sidelink UEs an indication of signal strength of signals from the first UE measured by each respective sidelink UE, e.g., as discussed at stage 1012 of FIG. 10. A means for receiving from each of the sidelink UEs an indication of signal strength of signals from the first UE measured by each respective sidelink UE may include, e.g., the external interface 1210 and one or more processors 1202 with dedicated hardware or implementing executable code or software instructions in memory 1204 and/or medium 1220 in location server 1200, such as the report module 1222 and the reference SL UE module 1230, shown in FIG. 12. The location server may determine the reference sidelink UE based at least in part on the indication of signal strength of signals from the first UE measured by each respective sidelink UE, e.g., as discussed at stage 1012 of FIG. 10. A means for determining the reference sidelink UE based at least in part on the indication of signal strength of signals from the first UE measured by each respective sidelink UE may include, e.g., the one or more processors 1202 with dedicated hardware or implementing executable code or software instructions in memory 1204 and/or medium 1220 in location server 1200, such as the reference SL UE module 1230, shown in FIG. 12. The location server may send to the first UE an identifier for the reference sidelink UE, e.g., as discussed at stage 1012 of FIG. 10. A means for sending to the first UE an identifier for the reference sidelink UE may include, e.g., the external interface 1210 and one or more processors 1202 with dedicated hardware or implementing executable code or software instructions in memory 1204 and/or medium 1220 in location server 1200, such as the report module 1222 and the reference SL UE module 1230, shown in FIG. 12.

FIG. 16 shows a flow diagram for an exemplary method 1600 performed by a first UE for determining a position of a second UE in wireless network in a manner consistent with disclosed implementations. The first UE may be a sidelink UE or premium UE, such as UE 105 shown in FIGS. 1 and 2, a sidelink UE 820 shown in FIGS. 8, 9, and 10, or the UE 1100 shown in FIG. 11 operating as a sidelink UE, and the second UE may be the target UE or light UE.

At block 1602, the first UE receives a first reference signal from a network entity, e.g., as discussed at stage 940 in FIG. 9 and stage 1040 in FIG. 10. For example, the reference signal may be a DL PRS signal or other DL reference signal used for positioning, such as reference signal 850 shown in FIG. 8, and the network entity may be a base station, such as an eNB or gNB, or an access point, and is illustrated as base station 802 shown in FIGS. 8, 9, and 10. A means for receiving a first reference signal from a network entity may include, e.g., the wireless transceiver 1110 or wireless transceiver 1112 and one or more processors 1102 with dedicated hardware or implementing executable code or software instructions in memory 1104 and/or medium 1120 in UE 1100, such as the reference signal receive module 1122, shown in FIG. 11.

At block 1604, the first UE may receive a sidelink reference signal from the second UE, e.g., as discussed at stage 945 in FIG. 9 and stage 1045 in FIG. 10. The sidelink reference signals, for example, may be SL-PRS or SL-CSI-RS for positioning, such as reference signals 860 shown in FIG. 8. A means for receiving a sidelink reference signal from the second UE may include, e.g., the wireless transceiver 1110 or wireless transceiver 1112 and one or more processors 1102 with dedicated hardware or implementing executable code or software instructions in memory 1104 and/or medium 1120 in UE 1100, such as the reference signal receive module 1122, shown in FIG. 11

At block 1606, the first UE determines a time difference between receiving the sidelink reference signal from the second UE and receiving the first reference signal from the network entity, e.g., as discussed at stage 950 in FIG. 9 and stage 1050 in FIG. 10. The time difference measured by the first UE, for example, is the time difference ($T_{Rx\_sidelink\_i}$ − $T_{Rx\_RS\_i}$) measured between the reception (e.g., ToA) of the reference signal 860 sent by the base station 802 and the reception (e.g., ToA) of the sidelink reference signal 870*i* sent by the second UE 810, e.g., as discussed in FIG. 8. A means for determining a time difference between receiving the sidelink reference signal from the second UE and receiving the first reference signal from the network entity may include, e.g., the one or more processors 1102 with dedicated hardware or implementing executable code or software instructions in memory 1104 and/or medium 1120 in UE 1100, such as the time difference module 1126, shown in FIG. 11.

At block 1608, the first UE processes the time difference between receiving the sidelink reference signal from the second UE and receiving the first reference signal from the network entity for generating differential range-sums for the second UE and a plurality of sidelink UEs including the first UE based on receive-transmit (Rx-Tx) time difference associated with each sidelink UE measured by the second UE, wherein the Rx-Tx time difference associated with each sidelink UE is a time difference measured by the second UE between receiving a second reference signal from the network entity and sending a sidelink reference signal to a respective sidelink UEs, wherein the differential range-sums for the second UE and the plurality of sidelink UEs is further based on time differences measured by the plurality of sidelink UEs, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the second UE and the network entity and a second range between the second UE and the respective sidelink UE, and wherein the position of the second UE is determined based at least in part on the differential range-sums for the plurality of sidelink UEs, e.g., as discussed at stage 960 of FIG. 9 and at stage 1060 of FIG. 10. In one example, the first UE may process the time difference between receiving the sidelink reference signal from the second UE and receiving the first reference signal from the network entity for generating differential range-sums by preparing a report and sending the time difference to the second UE or a location server for generating the differential range-sums, as discussed in FIG. 8 and discussed at stages 960 of FIG. 9 and at stage 1060 of FIG. 10. The Rx-Tx time difference associated with each sidelink UE, for example, may be determined as the Rx-Tx time differences ($T_{U-E\_Rx\rightarrow Tx\_i}$) between the reception (e.g., the measured ToA) of the reference signal 850 and the transmission (e.g., the measured ToD) of the sidelink reference signal 870*i* sent to the respective sidelink UE 820*i*, e.g., as described in FIG. 8. A means for processing the time difference between receiving the sidelink reference signal from the second UE and receiving the first reference signal from the network entity for generating differential range-sums for the second UE and a plurality of sidelink UEs including the first UE based on receive-transmit (Rx-Tx) time difference associated with each sidelink UE measured by the second UE, wherein the Rx-Tx time difference associated with each sidelink UE is a time difference measured by the second UE between receiving a second reference signal from the network entity and sending a sidelink reference signal to a respective sidelink UEs, wherein the differential range-sums for the second UE and the plurality of sidelink UEs is further based on time differences measured by the plurality of sidelink UEs, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the second UE and the network entity and a second range between the second UE and the respective sidelink UE, and wherein the position of the second UE is determined based at least in part on the differential range-sums for the plurality of sidelink UEs may include, e.g., the wireless transceiver 1110 or wireless transceiver 1112 and one or more processors 1102 with dedicated hardware or implementing executable code or software instructions in memory 1104 and/or medium 1120 in UE 1100, such as the report module 1128, shown in FIG. 11.

For example, in one implementation, processing the time difference between receiving the sidelink reference signal from the second UE and receiving the first reference signal from the network entity for generating the differential range-sums comprises sending the time difference to a location server, e.g., as illustrated in at stages 960 of FIG. 9 and at stage 1060 of FIG. 10. In one example, the differential range-sums are determined by the location server and the position of the second UE is determined by the location server based on the differential range-sums, e.g., as illustrated in FIG. 10. In one example, the location server sends the time difference to the second UE and the second UE determines the differential range-sums and determines the position of the second UE based on the differential range-sums, e.g., as illustrated in FIG. 9. A means for sending the time difference to a location server may include, e.g., the wireless transceiver 1110 or wireless transceiver 1112 and one or more processors 1102 with dedicated hardware or implementing executable code or software instructions in memory 1104 and/or medium 1120 in UE 1100, such as the report module 1128, shown in FIG. 11.

For example, in one implementation, processing the time difference between receiving the sidelink reference signal from the second UE and receiving the first reference signal from the network entity for generating the differential range-sums comprises sending the time difference to the second UE, e.g., as illustrated in at stages 960 of FIG. 9 and at stage 1060 of FIG. 10. In one example, the second UE determines the differential range-sums and a location server determines the position of the second UE based on the differential range-sums, e.g., as illustrated in FIG. 10. In one example, the second UE determines the differential range-sums and determines the position of the second UE based on the differential range-sums, e.g., as illustrated in FIG. 9. A means for sending the time difference to the second UE may include, e.g., the wireless transceiver 1110 or wireless transceiver 1112 and one or more processors 1102 with dedicated hardware or implementing executable code or software instructions in memory 1104 and/or medium 1120 in UE 1100, such as the report module 1128, shown in FIG. 11.

In one implementation, processing the time difference between receiving the sidelink reference signal from the second UE and receiving the first reference signal from the network entity for generating the differential range-sums comprises sending the time difference to an entity with an identifier for the network entity, an identifier for the first reference signal received from the network entity, an identifier for the sidelink reference signal received from the second UE, and an identifier for the first UE, e.g., as discussed at stage 960 of FIG. 9 and stage 1060 of FIG. 10. The first UE may further send a time stamp with the time difference, e.g., as discussed at stage 960 of FIG. 9 and stage 1060 of FIG. 10. A means for sending the time difference to an entity with an identifier for the network entity, an identifier for the first reference signal received from the network entity, an identifier for the sidelink reference signal received from the second UE, and an identifier for the first UE, and a means for sending a time stamp with the time difference may include, e.g., the wireless transceiver 1110 or wireless transceiver 1112 and one or more processors 1102 with dedicated hardware or implementing executable code or software instructions in memory 1104 and/or medium 1120 in UE 1100, such as the report module 1128, shown in FIG. 11.

The first UE may further measure signal strength of one or more signals received from the second UE and send indications of signal strength of the one or more signals received from the second UE for determining the reference sidelink UE based at least in part on the indications of signal strength of signals from the second UE measured by each sidelink UE including the first UE, e.g., as discussed in stage 912 in FIG. 9 and stage 1012 in FIG. 10. A means for measuring signal strength of one or more signals received from the second UE may include, e.g., the wireless transceiver 1110 or wireless transceiver 1112 and one or more processors 1102 with dedicated hardware or implementing executable code or software instructions in memory 1104 and/or medium 1120 in UE 1100, such as the reference SL UE module 1134, shown in FIG. 11. A means for sending indications of signal strength of the one or more signals received from the second UE for determining the reference sidelink UE based at least in part on the indications of signal strength of signals from the second UE measured by each sidelink UE including the first UE may include, e.g., the wireless transceiver 1110 or wireless transceiver 1112 and one or more processors 1102 with dedicated hardware or implementing executable code or software instructions in memory 1104 and/or medium 1120 in UE 1100, such as the reference SL UE module 1134, shown in FIG. 11.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method performed by a first user equipment (UE) for determining a position of the first UE, the method comprising: receiving a first reference signal from a network entity; sending one or more sidelink reference signals to a plurality of sidelink UEs; determining a receive-transmit (Rx-Tx) time difference associated with each sidelink UE, wherein the Rx-Tx time difference associated with each sidelink UE is a time difference between receiving the first reference signal from the network entity and sending the sidelink reference signal to a respective sidelink UE; and processing the Rx-Tx time difference associated with each sidelink UE for generating differential range-sums for the plurality of sidelink UEs based on the Rx-Tx time differences associated with each sidelink UE and a time difference measured by each sidelink UE, wherein the time difference measured by each sidelink UE is the time difference between receiving the sidelink reference signal from the first UE and receiving a second reference signal from the network entity, each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE, wherein the position of the first UE is determined based at least in part on the differential range-sums for the plurality of sidelink UEs.

Clause 2. The method of clause 1, further comprising: receiving the time difference measured by each sidelink UE in the plurality of sidelink UEs; wherein processing the Rx-Tx time difference associated with each sidelink UE for generating the differential range-sums for the plurality of sidelink UEs comprises determining the differential range-sums for the plurality of sidelink UEs based on the Rx-Tx time differences associated with each sidelink UE and the time difference measured by each sidelink UE.

Clause 3. The method of clause 2, wherein determining the differential range-sums comprises: determining, for each sidelink UE, the range-sum based on the Rx-Tx time difference associated with a respective sidelink UE and the time difference measured by the respective sidelink UE; and determining the difference between the range-sum for the reference sidelink UE and the range-sum for each other sidelink UE from the plurality of sidelink UEs.

Clause 4. The method of either of clauses 2 or 3, wherein the time difference measured by each sidelink UE is received directly from each sidelink UE.

Clause 5. The method of either of clauses 2 or 3, wherein the time difference measured by each sidelink UE is received from a location server.

Clause 6. The method of either of clauses 2 or 3, further comprising receiving with the time difference measured by the respective sidelink UE, an identifier for the network entity, an identifier for the second reference signal received from the network entity, an identifier for the sidelink reference signal received from the first UE, and an identifier for the sidelink UE.

Clause 7. The method of clause 6, further comprising receiving a time stamp with the time difference measured by the respective sidelink UE.

Clause 8. The method of any of clauses 2-7, further comprising receiving from a location server, an identifier for the reference sidelink UE.

Clause 9. The method of any of clauses 2-8, further comprising determining to use the differential range-sums for determining the position of the first UE based at least in part on a group-delay calibration status of the first UE.

Clause 10. The method of any of clauses 2-9, further comprising determining the position of the first UE based at least in part on the differential range-sums for the plurality of sidelink UEs.

Clause 11. The method of clause 10, further comprising receiving assistance data comprising a position of the network entity and positions of the sidelink UEs, wherein determining the position of the first UE is further based on the position of the network entity and positions of the sidelink UEs.

Clause 12. The method of either of clauses 2 or 3, further comprising sending the differential range-sums for the plurality of sidelink UEs to a location server, wherein the position of the first UE is determined by the location server based at least in part on the differential range-sums for the plurality of sidelink UEs.

Clause 13. The method of clause 12, further comprising sending with the differential range-sums for the plurality of sidelink UEs to the location server an identifier for the network entity, an identifier for the first reference signal received from the network entity, an identifier for the one or more sidelink reference signals sent to the plurality of sidelink UEs, an identifier for the first UE, and an identifier for each of the sidelink UEs.

Clause 14. The method of clause 13, further comprising sending a time stamp with the differential range-sums for the plurality of sidelink UEs.

Clause 15. The method of clause 1, wherein processing the Rx-Tx time difference associated with each sidelink UE for generating the differential range-sums for the plurality of sidelink UEs comprises sending the Rx-Tx time difference associated with each sidelink UE to a location server, wherein the differential range-sums for the plurality of sidelink UEs is determined by the location server based on the Rx-Tx time differences associated with each sidelink UE and the time difference measured by each sidelink UE, and wherein the position of the first UE is determined by the location server based at least in part on the differential range-sums for the plurality of sidelink UEs.

Clause 16. The method of clause 15, further comprising sending with the Rx-Tx time difference associated with each sidelink UE to the location server an identifier for the network entity, an identifier for the first reference signal received from the network entity, an identifier for the one or more sidelink reference signals sent to the plurality of sidelink UEs, an identifier for the first UE, and an identifier for each of the sidelink UEs.

Clause 17. The method of clause 16, further comprising sending a time stamp with the Rx-Tx time difference associated with each sidelink UE.

Clause 18. The method of clause 15, further comprising sending to the location server a group-delay calibration status of the first UE, wherein the use of the differential range-sums for the plurality of sidelink UEs to determine the position for the first UE is determined by the location server based at least in part on the group-delay calibration status of the first UE.

Clause 19. The method of clause 18, wherein the group-delay calibration status of the first UE comprises an indication of whether a group-delay for the first UE is calibrated or not.

Clause 20. The method of clause 18, wherein the group-delay calibration status of the first UE comprises a calibration error statistic for a group-delay for the first UE.

Clause 21. The method of clause 20, wherein the group-delay calibration status of the first UE is sent to the location server periodically, aperiodically, triggered by an event, or a combination thereof.

Clause 22. A first user equipment (UE) configured for determining a position of the first UE, the first UE comprising: at least one wireless transceiver configured to wirelessly communicate with other entities in a wireless network; at least one memory; and at least one processor coupled to the at least one wireless transceiver and the at least one memory and configured to: receive, via the at least one wireless transceiver, a first reference signal from a network entity; send, via the at least one wireless transceiver, one or more sidelink reference signals to a plurality of sidelink UEs; determine a receive-transmit (Rx-Tx) time difference associated with each sidelink UE, wherein the Rx-Tx time difference associated with each sidelink UE is a time difference between receiving the first reference signal from the network entity and sending the sidelink reference signal to a respective sidelink UE; and process the Rx-Tx time difference associated with each sidelink UE to generate differential range-sums for the plurality of sidelink UEs based on the Rx-Tx time differences associated with each sidelink UE and a time difference measured by each sidelink UE, wherein the time difference measured by each sidelink UE is the time difference between receiving the sidelink reference signal from the first UE and receiving a second reference signal from the network entity, each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE, wherein the position of the first UE is determined based at least in part on the differential range-sums for the plurality of sidelink UEs.

Clause 23. The first UE of clause 22, wherein the at least one processor is further configured to: receive, via the at least one wireless transceiver, the time difference measured by each sidelink UE in the plurality of sidelink UEs; wherein the at least one processor is configured to process the Rx-Tx time difference associated with each sidelink UE to generate the differential range-sums for the plurality of sidelink UEs by being configured to determine the differential range-sums for the plurality of sidelink UEs based on the Rx-Tx time differences associated with each sidelink UE and the time difference measured by each sidelink UE.

Clause 24. The first UE of clause 23, wherein the at least one processor is configured to determine the differential range-sums by being configured to: determine, for each sidelink UE, the range-sum based on the Rx-Tx time difference associated with a respective sidelink UE and the time difference measured by the respective sidelink UE; and determine the difference between the range-sum for the reference sidelink UE and the range-sum for each other sidelink UE from the plurality of sidelink UEs.

Clause 25. The first UE of either of clauses 23 or 24, wherein the time difference measured by each sidelink UE is received directly from each sidelink UE.

Clause 26. The first UE of either of clauses 23 or 24, wherein the time difference measured by each sidelink UE is received from a location server.

Clause 27. The first UE of either of clauses 23 or 24, wherein the at least one processor is further configured to receive with the time difference measured by the respective sidelink UE, an identifier for the network entity, an identifier for the second reference signal received from the network entity, an identifier for the sidelink reference signal received from the first UE, and an identifier for the sidelink UE.

Clause 28. The first UE of clause 27, wherein the at least one processor is further configured to receive, via the at least one wireless transceiver, a time stamp with the time difference measured by the respective sidelink UE.

Clause 29. The first UE of any of clauses 23-28, wherein the at least one processor is further configured to receive, via the at least one wireless transceiver, from a location server, an identifier for the reference sidelink UE.

Clause 30. The first UE of any of clauses 23-29, wherein the at least one processor is further configured to determine to use the differential range-sums to determine the position of the first UE based at least in part on a group-delay calibration status of the first UE.

Clause 31. The first UE of any of clauses 23-30, wherein the at least one processor is further configured to determine the position of the first UE based at least in part on the differential range-sums for the plurality of sidelink UEs.

Clause 32. The first UE of clause 31, wherein the at least one processor is further configured to receive, via the at least one wireless transceiver, assistance data comprising a position of the network entity and positions of the sidelink UEs, wherein determine the position of the first UE is further based on the position of the network entity and positions of the sidelink UEs.

Clause 33. The first UE of either of clauses 23 or 24, wherein the at least one processor is further configured to send, via the at least one wireless transceiver, the differential range-sums for the plurality of sidelink UEs to a location server, wherein the position of the first UE is determined by the location server based at least in part on the differential range-sums for the plurality of sidelink UEs.

Clause 34. The first UE of clause 33, wherein the at least one processor is further configured to send with the differential range-sums for the plurality of sidelink UEs to the location server an identifier for the network entity, an identifier for the first reference signal received from the network entity, an identifier for the one or more sidelink reference signals sent to the plurality of sidelink UEs, an identifier for the first UE, and an identifier for each of the sidelink UEs.

Clause 35. The first UE of clause 34, wherein the at least one processor is further configured to send, via the at least one wireless transceiver, a time stamp with the differential range-sums for the plurality of sidelink UEs.

Clause 36. The first UE of clause 22, wherein the at least one processor is configured to process the Rx-Tx time difference associated with each sidelink UE to generate the differential range-sums for the plurality of sidelink UEs by being configured to send the Rx-Tx time difference associated with each sidelink UE to a location server, wherein the differential range-sums for the plurality of sidelink UEs is determined by the location server based on the Rx-Tx time differences associated with each sidelink UE and the time difference measured by each sidelink UE, and wherein the position of the first UE is determined by the location server based at least in part on the differential range-sums for the plurality of sidelink UEs.

Clause 37. The first UE of clause 36, wherein the at least one processor is further configured to send with the Rx-Tx time difference associated with each sidelink UE to the location server an identifier for the network entity, an identifier for the first reference signal received from the network entity, an identifier for the one or more sidelink reference signals sent to the plurality of sidelink UEs, an identifier for the first UE, and an identifier for each of the sidelink UEs.

Clause 38. The first UE of clause 37, wherein the at least one processor is further configured to send, via the at least one wireless transceiver, a time stamp with the Rx-Tx time difference associated with each sidelink UE.

Clause 39. The first UE of clause 36, wherein the at least one processor is further configured to send to the location server, via the at least one wireless transceiver, a group-delay calibration status of the first UE, wherein the use of the differential range-sums for the plurality of sidelink UEs to determine the position for the first UE is determined by the location server based at least in part on the group-delay calibration status of the first UE.

Clause 40. The first UE of clause 39, wherein the group-delay calibration status of the first UE comprises an indication of whether a group-delay for the first UE is calibrated or not.

Clause 41. The first UE of clause 39, wherein the group-delay calibration status of the first UE comprises a calibration error statistic for a group-delay for the first UE.

Clause 42. The first UE of clause 41, wherein the group-delay calibration status of the first UE is sent to the location server periodically, aperiodically, triggered by an event, or a combination thereof.

Clause 43. A first user equipment (UE) configured for determining a position of the first UE, the first UE comprising: means for receiving a first reference signal from a network entity; means for sending one or more sidelink reference signals to a plurality of sidelink UEs; means for determining a receive-transmit (Rx-Tx) time difference associated with each sidelink UE, wherein the Rx-Tx time difference associated with each sidelink UE is a time difference between receiving the first reference signal from the network entity and sending the sidelink reference signal to a respective sidelink UE; and means for processing the Rx-Tx time difference associated with each sidelink UE for generating differential range-sums for the plurality of sidelink UEs based on the Rx-Tx time differences associated with each sidelink UE and a time difference measured by each sidelink UE, wherein the time difference measured by each sidelink UE is the time difference between receiving the sidelink reference signal from the first UE and receiving a second reference signal from the network entity, each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE, wherein the position of the first UE is determined based at least in part on the differential range-sums for the plurality of sidelink UEs.

Clause 44. The first UE of clause 43, further comprising: means for receiving the time difference measured by each sidelink UE in the plurality of sidelink UEs; wherein the means for processing the Rx-Tx time difference associated with each sidelink UE for generating the differential range-sums for the plurality of sidelink UEs determines the differential range-sums for the plurality of sidelink UEs based on the Rx-Tx time differences associated with each sidelink UE and the time difference measured by each sidelink UE.

Clause 45. The first UE of clause 44, wherein the means for determining the differential range-sums comprises: means for determining, for each sidelink UE, the range-sum based on the Rx-Tx time difference associated with a respective sidelink UE and the time difference measured by the respective sidelink UE; and means for determining the difference between the range-sum for the reference sidelink UE and the range-sum for each other sidelink UE from the plurality of sidelink UEs.

Clause 46. The first UE of either of clauses 44 or 45, wherein the time difference measured by each sidelink UE is received directly from each sidelink UE.

Clause 47. The first UE of either of clauses 44 or 45, wherein the time difference measured by each sidelink UE is received from a location server.

Clause 48. The first UE of either of clauses 44 or 45, further comprising means for receiving with the time difference measured by the respective sidelink UE, an identifier for the network entity, an identifier for the second reference signal received from the network entity, an identifier for the sidelink reference signal received from the first UE, and an identifier for the sidelink UE.

Clause 49. The first UE of clause 48, further comprising means for receiving a time stamp with the time difference measured by the respective sidelink UE.

Clause 50. The first UE of any of clauses 44-49, further comprising means for receiving from a location server, an identifier for the reference sidelink UE.

Clause 51. The first UE of any of clauses 44-50, further comprising means for determining to use the differential range-sums for determining the position of the first UE based at least in part on a group-delay calibration status of the first UE.

Clause 52. The first UE of any of clauses 44-51, further comprising means for determining the position of the first UE based at least in part on the differential range-sums for the plurality of sidelink UEs.

Clause 53. The first UE of clause 52, further comprising means for receiving assistance data comprising a position of the network entity and positions of the sidelink UEs, wherein the means for determining the position of the first UE uses the position of the network entity and positions of the sidelink UEs.

Clause 54. The first UE of either of clauses 44 or 45, further comprising means for sending the differential range-sums for the plurality of sidelink UEs to a location server, wherein the position of the first UE is determined by the location server based at least in part on the differential range-sums for the plurality of sidelink UEs.

Clause 55. The first UE of clause 54, further comprising means for sending with the differential range-sums for the plurality of sidelink UEs to the location server an identifier for the network entity, an identifier for the first reference signal received from the network entity, an identifier for the one or more sidelink reference signals sent to the plurality of sidelink UEs, an identifier for the first UE, and an identifier for each of the sidelink UEs.

Clause 56. The first UE of clause 55, further comprising means for sending a time stamp with the differential range-sums for the plurality of sidelink UEs.

Clause 57. The first UE of clause 43, wherein the means for processing the Rx-Tx time difference associated with each sidelink UE for generating the differential range-sums for the plurality of sidelink UEs comprises means for sending the Rx-Tx time difference associated with each sidelink UE to a location server, wherein the differential range-sums for the plurality of sidelink UEs is determined by the location server based on the Rx-Tx time differences associated with each sidelink UE and the time difference measured by each sidelink UE, and wherein the position of the first UE is determined by the location server based at least in part on the differential range-sums for the plurality of sidelink UEs.

Clause 58. The first UE of clause 57, further comprising means for sending with the Rx-Tx time difference associated with each sidelink UE to the location server an identifier for the network entity, an identifier for the first reference signal received from the network entity, an identifier for the one or more sidelink reference signals sent to the plurality of sidelink UEs, an identifier for the first UE, and an identifier for each of the sidelink UEs.

Clause 59. The first UE of clause 58, further comprising means for sending a time stamp with the Rx-Tx time difference associated with each sidelink UE.

Clause 60. The first UE of clause 57, further comprising means for sending to the location server a group-delay calibration status of the first UE, wherein the use of the differential range-sums for the plurality of sidelink UEs to determine the position for the first UE is determined by the location server based at least in part on the group-delay calibration status of the first UE.

Clause 61. The first UE of clause 60, wherein the group-delay calibration status of the first UE comprises an indication of whether a group-delay for the first UE is calibrated or not.

Clause 62. The first UE of clause 60, wherein the group-delay calibration status of the first UE comprises a calibration error statistic for a group-delay for the first UE.

Clause 63. The first UE of clause 62, wherein the group-delay calibration status of the first UE is sent to the location server periodically, aperiodically, triggered by an event, or a combination thereof.

Clause 64. A non-transitory storage medium including program code stored thereon, the program code is operable to configure at least one processor in first user equipment (UE) configured for determining a position of the first UE, the program code comprising instructions to: receive a first reference signal from a network entity; send one or more sidelink reference signals to a plurality of sidelink UEs; determine a receive-transmit (Rx-Tx) time difference associated with each sidelink UE, wherein the Rx-Tx time difference associated with each sidelink UE is a time difference between receiving the first reference signal from the network entity and sending the sidelink reference signal to a respective sidelink UE; and process the Rx-Tx time difference associated with each sidelink UE to generate differential range-sums for the plurality of sidelink UEs based on the Rx-Tx time differences associated with each sidelink UE and a time difference measured by each sidelink UE, wherein the time difference measured by each sidelink UE is the time difference between receiving the sidelink reference signal from the first UE and receiving a second reference signal from the network entity, each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE, wherein the position of the first UE is determined based at least in part on the differential range-sums for the plurality of sidelink UEs.

Clause 65. The non-transitory storage medium of clause 64, further comprising instructions to: receive the time difference measured by each sidelink UE in the plurality of sidelink UEs; wherein the instructions to process the Rx-Tx time difference associated with each sidelink UE to generate the differential range-sums for the plurality of sidelink UEs comprises instructions to determine the differential range-sums for the plurality of sidelink UEs based on the Rx-Tx time differences associated with each sidelink UE and the time difference measured by each sidelink UE.

Clause 66. The non-transitory storage medium of clause 65, wherein the instructions to determine the differential range-sums comprises instructions to: determine, for each sidelink UE, the range-sum based on the Rx-Tx time difference associated with a respective sidelink UE and the time difference measured by the respective sidelink UE; and determine the difference between the range-sum for the reference sidelink UE and the range-sum for each other sidelink UE from the plurality of sidelink UEs.

Clause 67. The non-transitory storage medium of either of clauses 65 or 66, wherein the time difference measured by each sidelink UE is received directly from each sidelink UE.

Clause 68. The non-transitory storage medium of either of clauses 65 or 66, wherein the time difference measured by each sidelink UE is received from a location server.

Clause 69. The non-transitory storage medium of either of clauses 65 or 66, further comprising instructions to receive with the time difference measured by the respective sidelink UE, an identifier for the network entity, an identifier for the second reference signal received from the network entity, an identifier for the sidelink reference signal received from the first UE, and an identifier for the sidelink UE.

Clause 70. The non-transitory storage medium of clause 69, further comprising instructions to receive a time stamp with the time difference measured by the respective sidelink UE.

Clause 71. The non-transitory storage medium of any of clauses 65-70, further comprising instructions to receive from a location server, an identifier for the reference sidelink UE.

Clause 72. The non-transitory storage medium of any of clauses 65-71, further comprising instructions to determine to use the differential range-sums to determine the position of the first UE based at least in part on a group-delay calibration status of the first UE.

Clause 73. The non-transitory storage medium of any of clauses 65-72, further comprising instructions to determine the position of the first UE based at least in part on the differential range-sums for the plurality of sidelink UEs.

Clause 74. The non-transitory storage medium of clause 73, further comprising instructions to receive assistance data comprising a position of the network entity and positions of the sidelink UEs, wherein the instructions to determine the position of the first UE uses the position of the network entity and positions of the sidelink UEs.

Clause 75. The non-transitory storage medium of either of clauses 65 or 66, further comprising instructions to send the differential range-sums for the plurality of sidelink UEs to a location server, wherein the position of the first UE is determined by the location server based at least in part on the differential range-sums for the plurality of sidelink UEs.

Clause 76. The non-transitory storage medium of clause 75, further comprising instructions to send with the differential range-sums for the plurality of sidelink UEs to the location server an identifier for the network entity, an identifier for the first reference signal received from the network entity, an identifier for the one or more sidelink reference signals sent to the plurality of sidelink UEs, an identifier for the first UE, and an identifier for each of the sidelink UEs.

Clause 77. The non-transitory storage medium of clause 76, further comprising instructions to send a time stamp with the differential range-sums for the plurality of sidelink UEs.

Clause 78. The non-transitory storage medium of clause 64, wherein the instructions to process the Rx-Tx time difference associated with each sidelink UE to generate the differential range-sums for the plurality of sidelink UEs comprises instructions to send the Rx-Tx time difference associated with each sidelink UE to a location server, wherein the differential range-sums for the plurality of sidelink UEs is determined by the location server based on the Rx-Tx time differences associated with each sidelink UE and the time difference measured by each sidelink UE, and wherein the position of the first UE is determined by the location server based at least in part on the differential range-sums for the plurality of sidelink UEs.

Clause 79. The non-transitory storage medium of clause 78, further comprising instructions to send with the Rx-Tx time difference associated with each sidelink UE to the location server an identifier for the network entity, an identifier for the first reference signal received from the network entity, an identifier for the one or more sidelink reference signals sent to the plurality of sidelink UEs, an identifier for the first UE, and an identifier for each of the sidelink UEs.

Clause 80. The non-transitory storage medium of clause 79, further comprising instructions to send a time stamp with the Rx-Tx time difference associated with each sidelink UE.

Clause 81. The non-transitory storage medium of clause 78, further comprising instructions to send to the location server a group-delay calibration status of the first UE, wherein the use of the differential range-sums for the plurality of sidelink UEs to determine the position for the first UE is determined by the location server based at least in part on the group-delay calibration status of the first UE.

Clause 82. The non-transitory storage medium of clause 81, wherein the group-delay calibration status of the first UE comprises an indication of whether a group-delay for the first UE is calibrated or not.

Clause 83. The non-transitory storage medium of clause 81, wherein the group-delay calibration status of the first UE comprises a calibration error statistic for a group-delay for the first UE.

Clause 84. The non-transitory storage medium of clause 83, wherein the group-delay calibration status of the first UE is sent to the location server periodically, aperiodically, triggered by an event, or a combination thereof.

Clause 85. A method performed by a location server for determining a position of a first user equipment (UE), the method comprising: obtaining differential range-sums for the first UE and a plurality of sidelink UEs based on receive-transmit (Rx-Tx) time difference associated with each sidelink UE measured by the first UE, wherein the Rx-Tx time difference associated with each sidelink UE is a time difference measured by the first UE between receiving a first reference signal from a network entity and sending a sidelink reference signal to a respective sidelink UE, wherein the differential range-sums for the first UE and the plurality of sidelink UEs is further based on time differences measured by the plurality of sidelink UEs, wherein the time difference measured by each sidelink UE is a time difference between receiving the sidelink reference signal from the first UE and receiving a second reference signal from the network entity, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE; and determining the position of the first UE based at least in part on the differential range-sums for the plurality of sidelink UEs.

Clause 86. The method of clause 85, wherein determining the position of the first UE is further based on a position of the network entity and positions of the sidelink UEs.

Clause 87. The method of either of clauses 85 or 86, wherein obtaining the differential range-sums for the first UE and the plurality of sidelink UEs comprises: receiving the Rx-Tx time difference associated with each sidelink UE from the first UE; receiving the time difference measured by each sidelink UE; and determining the differential range-sums for the first UE and the plurality of sidelink UEs based on the Rx-Tx time differences associated with each sidelink UE and the time difference measured by each sidelink UE.

Clause 88. The method of clause 87, wherein determining the differential range-sums comprises: determining, for each sidelink UE, the range-sum based on the Rx-Tx time difference associated with a respective sidelink UE and the time difference measured by the respective sidelink UE; and determining the difference between the range-sum for the reference sidelink UE the range-sum for each other sidelink UE from the plurality of sidelink UEs.

Clause 89. The method of clause 87, further comprising receiving with the Rx-Tx time difference associated with each sidelink UE from the first UE an identifier for the network entity, an identifier for the first reference signal received from the network entity, an identifier for the one or more sidelink reference signals sent to the plurality of sidelink UEs, an identifier for the first UE, and an identifier for each of the sidelink UEs.

Clause 90. The method of clause 89, further comprising receiving a time stamp with the Rx-Tx time difference associated with each sidelink UE.

Clause 91. The method of clause 87, further comprising receiving from each sidelink UE, with the time difference measured by the respective sidelink UE, an identifier for the network entity, an identifier for the second reference signal received from the network entity, an identifier for the sidelink reference signal received from the first UE, and an identifier for the sidelink UE.

Clause 92. The method of clause 91, further comprising receiving a time stamp from each sidelink UE with the time difference measured by the respective sidelink UE.

Clause 93. The method of either of clauses 85 or 86, wherein obtaining the differential range-sums for the first UE and the plurality of sidelink UEs comprises receiving the differential range-sums from the first UE.

Clause 94. The method of clause 93, further comprising receiving with the differential range-sums from the first UE an identifier for the network entity, an identifier for the first reference signal received from the network entity, an identifier for the one or more sidelink reference signals sent to the plurality of sidelink UEs, an identifier for the first UE, and an identifier for each of the sidelink UEs.

Clause 95. The method of clause 94, further comprising receiving a time stamp with the differential range-sums from the first UE.

Clause 96. The method of clause 93, further comprising: receiving from each of the sidelink UEs an indication of signal strength of signals from the first UE measured by each respective sidelink UE; determining the reference sidelink UE based at least in part on the indication of signal strength of signals from the first UE measured by each respective sidelink UE; and sending to the first UE an identifier for the reference sidelink UE.

Clause 97. The method of either of clauses 85 or 86, further comprising: receiving from the first UE a group-delay calibration status of the first UE; and determining to use the differential range-sums for the plurality of sidelink UEs to determine the position for the first UE based at least in part on the group-delay calibration status of the first UE.

Clause 98. The method of clause 97, wherein the group-delay calibration status of the first UE comprises an indication of whether a group-delay for the first UE is calibrated or not.

Clause 99. The method of clause 97, wherein the group-delay calibration status of the first UE comprises a calibration error statistic for a group-delay for the first UE.

Clause 100. The method of clause 99, wherein the group-delay calibration status of the first UE is received from the first UE periodically, aperiodically, triggered by an event, or a combination thereof.

Clause 101. A location server configured for determining a position of a first user equipment (UE), the location server comprising: an external interface configured to communicate with other entities in a wireless network; at least one memory; and at least one processor coupled to the external interface and the at least one memory and configured to: obtain, via the external interface, differential range-sums for the first UE and a plurality of sidelink UEs based on receive-transmit (Rx-Tx) time difference associated with each sidelink UE measured by the first UE, wherein the Rx-Tx time difference associated with each sidelink UE is a time difference measured by the first UE between receiving a first reference signal from a network entity and sending a sidelink reference signal to a respective sidelink UE, wherein the differential range-sums for the first UE and the plurality of sidelink UEs is further based on time differences measured by the plurality of sidelink UEs, wherein the time difference measured by each sidelink UE is a time difference between receiving the sidelink reference signal from the first UE and receiving a second reference signal from the network entity, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE; and determine the position of the first UE based at least in part on the differential range-sums for the plurality of sidelink UEs.

Clause 102. The location server of clause 101, wherein the at least one processor is configured to determine the position of the first UE further based on a position of the network entity and positions of the sidelink UEs.

Clause 103. The location server of either of clauses 101 or 102, wherein the at least one processor is configured to obtain the differential range-sums for the first UE and the plurality of sidelink UEs by being configured to: receive, via the external interface, the Rx-Tx time difference associated with each sidelink UE from the first UE; receive, via the external interface, the time difference measured by each sidelink UE; and determine the differential range-sums for the first UE and the plurality of sidelink UEs based on the Rx-Tx time differences associated with each sidelink UE and the time difference measured by each sidelink UE.

Clause 104. The location server of clause 103, wherein the at least one processor is configured to determine the differential range-sums by being configured to: determine, for each sidelink UE, the range-sum based on the Rx-Tx time difference associated with a respective sidelink UE and the time difference measured by the respective sidelink UE; and determine the difference between the range-sum for the reference sidelink UE the range-sum for each other sidelink UE from the plurality of sidelink UEs.

Clause 105. The location server of clause 103, wherein the at least one processor is further configured to receive with the Rx-Tx time difference associated with each sidelink UE from the first UE an identifier for the network entity, an identifier for the first reference signal received from the network entity, an identifier for the one or more sidelink reference signals sent to the plurality of sidelink UEs, an identifier for the first UE, and an identifier for each of the sidelink UEs.

Clause 106. The location server of clause 105, wherein the at least one processor is further configured to receive, via the external interface, a time stamp with the Rx-Tx time difference associated with each sidelink UE.

Clause 107. The location server of clause 103, wherein the at least one processor is further configured to receive, via the external interface, from each sidelink UE, with the time difference measured by the respective sidelink UE, an identifier for the network entity, an identifier for the second reference signal received from the network entity, an identifier for the sidelink reference signal received from the first UE, and an identifier for the sidelink UE.

Clause 108. The location server of clause 107, wherein the at least one processor is further configured to receive, via the external interface, a time stamp from each sidelink UE with the time difference measured by the respective sidelink UE.

Clause 109. The location server of either of clauses 101 or 102, wherein the at least one processor is configured to obtain the differential range-sums for the first UE and the plurality of sidelink UEs by being configured to receive, via the external interface, the differential range-sums from the first UE.

Clause 110. The location server of clause 109, wherein the at least one processor is further configured to receive with the differential range-sums from the first UE an identifier for the network entity, an identifier for the first reference signal received from the network entity, an identifier for the one or more sidelink reference signals sent to the plurality of sidelink UEs, an identifier for the first UE, and an identifier for each of the sidelink UEs.

Clause 111. The location server of clause 110, wherein the at least one processor is further configured to receive, via the external interface, a time stamp with the differential range-sums from the first UE.

Clause 112. The location server of clause 109, wherein the at least one processor is further configured to: receive, via the external interface, from each of the sidelink UEs an indication of signal strength of signals from the first UE measured by each respective sidelink UE; determine the reference sidelink UE based at least in part on the indication of signal strength of signals from the first UE measured by each respective sidelink UE; and send, via the external interface, to the first UE an identifier for the reference sidelink UE.

Clause 113. The location server of either of clauses 101 or 102, wherein the at least one processor is further configured to: receive, via the external interface, from the first UE a group-delay calibration status of the first UE; and determine to use the differential range-sums for the plurality of sidelink UEs to determine the position for the first UE based at least in part on the group-delay calibration status of the first UE.

Clause 114. The location server of clause 113, wherein the group-delay calibration status of the first UE comprises an indication of whether a group-delay for the first UE is calibrated or not.

Clause 115. The location server of clause 113, wherein the group-delay calibration status of the first UE comprises a calibration error statistic for a group-delay for the first UE.

Clause 116. The location server of clause 115, wherein the group-delay calibration status of the first UE is received from the first UE periodically, aperiodically, triggered by an event, or a combination thereof.

Clause 117. A location server configured for determining a position of a first user equipment (UE), the location server comprising: means for obtaining differential range-sums for the first UE and a plurality of sidelink UEs based on receive-transmit (Rx-Tx) time difference associated with each sidelink UE measured by the first UE, wherein the Rx-Tx time difference associated with each sidelink UE is a time difference measured by the first UE between receiving a first reference signal from a network entity and sending a sidelink reference signal to a respective sidelink UE, wherein the differential range-sums for the first UE and the plurality of sidelink UEs is further based on time differences measured by the plurality of sidelink UEs, wherein the time difference measured by each sidelink UE is a time difference between receiving the sidelink reference signal from the first UE and receiving a second reference signal from the network entity, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE; and means for determining the position of the first UE based at least in part on the differential range-sums for the plurality of sidelink UEs.

Clause 118. The location server of clause 117, wherein the means for determining the position of the first UE further based on a position of the network entity and positions of the sidelink UEs.

Clause 119. The location server of either of clauses 117 or 118, wherein the means for obtaining the differential range-sums for the first UE and the plurality of sidelink UEs comprises: means for receiving the Rx-Tx time difference associated with each sidelink UE from the first UE; means for receiving the time difference measured by each sidelink UE; and means for determining the differential range-sums for the first UE and the plurality of sidelink UEs based on the Rx-Tx time differences associated with each sidelink UE and the time difference measured by each sidelink UE.

Clause 120. The location server of clause 119, wherein the means for determining the differential range-sums comprises: means for determining, for each sidelink UE, the range-sum based on the Rx-Tx time difference associated with a respective sidelink UE and the time difference measured by the respective sidelink UE; and means for determining the difference between the range-sum for the reference sidelink UE the range-sum for each other sidelink UE from the plurality of sidelink UEs.

Clause 121. The location server of clause 119, further comprising means for receiving with the Rx-Tx time difference associated with each sidelink UE from the first UE an identifier for the network entity, an identifier for the first reference signal received from the network entity, an identifier for the one or more sidelink reference signals sent to the plurality of sidelink UEs, an identifier for the first UE, and an identifier for each of the sidelink UEs.

Clause 122. The location server of clause 121, further comprising means for receiving a time stamp with the Rx-Tx time difference associated with each sidelink UE.

Clause 123. The location server of clause 119, further comprising means for receiving from each sidelink UE, with the time difference measured by the respective sidelink UE, an identifier for the network entity, an identifier for the second reference signal received from the network entity, an identifier for the sidelink reference signal received from the first UE, and an identifier for the sidelink UE.

Clause 124. The location server of clause 123, further comprising means for receiving a time stamp from each sidelink UE with the time difference measured by the respective sidelink UE.

Clause 125. The location server of either of clauses 117 or 118, wherein the means for obtaining the differential range-sums for the first UE and the plurality of sidelink UEs receives the differential range-sums from the first UE.

Clause 126. The location server of clause 125, further comprising means for receiving with the differential range-sums from the first UE an identifier for the network entity, an identifier for the first reference signal received from the network entity, an identifier for the one or more sidelink reference signals sent to the plurality of sidelink UEs, an identifier for the first UE, and an identifier for each of the sidelink UEs.

Clause 127. The location server of clause 126, further comprising means for receiving a time stamp with the differential range-sums from the first UE.

Clause 128. The location server of clause 125, further comprising: means for receiving from each of the sidelink UEs an indication of signal strength of signals from the first UE measured by each respective sidelink UE; means for determining the reference sidelink UE based at least in part on the indication of signal strength of signals from the first UE measured by each respective sidelink UE; and means for sending to the first UE an identifier for the reference sidelink UE.

Clause 129. The location server of either of clauses 117 or 118, further comprising: means for receiving from the first UE a group-delay calibration status of the first UE; and means for determining to use the differential range-sums for the plurality of sidelink UEs to determine the position for the first UE based at least in part on the group-delay calibration status of the first UE.

Clause 130. The location server of clause 129, wherein the group-delay calibration status of the first UE comprises an indication of whether a group-delay for the first UE is calibrated or not.

Clause 131. The location server of clause 129, wherein the group-delay calibration status of the first UE comprises a calibration error statistic for a group-delay for the first UE.

Clause 132. The location server of clause 131, wherein the group-delay calibration status of the first UE is received from the first UE periodically, aperiodically, triggered by an event, or a combination thereof.

Clause 133. A non-transitory storage medium including program code stored thereon, the program code is operable to configure at least one processor in location server for determining a position of a first user equipment (UE), the program code comprising instructions to: obtain differential range-sums for the first UE and a plurality of sidelink UEs based on receive-transmit (Rx-Tx) time difference associated with each sidelink UE measured by the first UE, wherein the Rx-Tx time difference associated with each sidelink UE is a time difference measured by the first UE between receiving a first reference signal from a network entity and sending a sidelink reference signal to a respective sidelink UE, wherein the differential range-sums for the first UE and the plurality of sidelink UEs is further based on time differences measured by the plurality of sidelink UEs, wherein the time difference measured by each sidelink UE is a time difference between receiving the sidelink reference signal from the first UE and receiving a second reference signal from the network entity, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE; and determine the position of the first UE based at least in part on the differential range-sums for the plurality of sidelink UEs.

Clause 134. The non-transitory storage medium of clause 133, wherein the instructions to determine the position of the first UE is further based on a position of the network entity and positions of the sidelink UEs.

Clause 135. The non-transitory storage medium of either of clauses 133 or 134, wherein the instructions to obtain the differential range-sums for the first UE and the plurality of sidelink UEs comprises instructions to: receive the Rx-Tx time difference associated with each sidelink UE from the first UE; receive the time difference measured by each sidelink UE; and determine the differential range-sums for the first UE and the plurality of sidelink UEs based on the Rx-Tx time differences associated with each sidelink UE and the time difference measured by each sidelink UE.

Clause 136. The non-transitory storage medium of clause 135, wherein the instructions to determine the differential range-sums comprises instructions to: determine, for each sidelink UE, the range-sum based on the Rx-Tx time difference associated with a respective sidelink UE and the time difference measured by the respective sidelink UE; and determine the difference between the range-sum for the reference sidelink UE the range-sum for each other sidelink UE from the plurality of sidelink UEs.

Clause 137. The non-transitory storage medium of clause 135, further comprising instructions to receive with the Rx-Tx time difference associated with each sidelink UE from the first UE an identifier for the network entity, an identifier for the first reference signal received from the network entity, an identifier for the one or more sidelink reference signals sent to the plurality of sidelink UEs, an identifier for the first UE, and an identifier for each of the sidelink UEs.

Clause 138. The non-transitory storage medium of clause 137, further comprising instructions to receive a time stamp with the Rx-Tx time difference associated with each sidelink UE.

Clause 139. The non-transitory storage medium of clause 135, further comprising instructions to receive from each sidelink UE, with the time difference measured by the respective sidelink UE, an identifier for the network entity, an identifier for the second reference signal received from the network entity, an identifier for the sidelink reference signal received from the first UE, and an identifier for the sidelink UE.

Clause 140. The non-transitory storage medium of clause 139, further comprising instructions to receive a time stamp from each sidelink UE with the time difference measured by the respective sidelink UE.

Clause 141. The non-transitory storage medium of either of clauses 133 or 134, wherein the instructions to obtain the differential range-sums for the first UE and the plurality of sidelink UEs comprises instructions to receive the differential range-sums from the first UE.

Clause 142. The non-transitory storage medium of clause 141, further comprising instructions to receive with the differential range-sums from the first UE an identifier for the network entity, an identifier for the first reference signal received from the network entity, an identifier for the one or more sidelink reference signals sent to the plurality of sidelink UEs, an identifier for the first UE, and an identifier for each of the sidelink UEs.

Clause 143. The non-transitory storage medium of clause 142, further comprising instructions to receive a time stamp with the differential range-sums from the first UE.

Clause 144. The non-transitory storage medium of clause 141, further comprising instructions to: receive from each of the sidelink UEs an indication of signal strength of signals from the first UE measured by each respective sidelink UE; determine the reference sidelink UE based at least in part on the indication of signal strength of signals from the first UE measured by each respective sidelink UE; and send to the first UE an identifier for the reference sidelink UE.

Clause 145. The non-transitory storage medium of either of clauses 133 or 134, further comprising instructions to: receive from the first UE a group-delay calibration status of the first UE; and determine to use the differential range-sums for the plurality of sidelink UEs to determine the position for the first UE based at least in part on the group-delay calibration status of the first UE.

Clause 146. The non-transitory storage medium of clause 145, wherein the group-delay calibration status of the first UE comprises an indication of whether a group-delay for the first UE is calibrated or not.

Clause 147. The non-transitory storage medium of clause 145, wherein the group-delay calibration status of the first UE comprises a calibration error statistic for a group-delay for the first UE.

Clause 148. The non-transitory storage medium of clause 147, wherein the group-delay calibration status of the first UE is received from the first UE periodically, aperiodically, triggered by an event, or a combination thereof.

Clause 149. A method performed by a location server for determining a position of a first user equipment (UE), the method comprising: receiving time differences measured by a plurality of sidelink UEs, wherein the time difference measured by each sidelink UE is a time difference between receiving a sidelink reference signal from the first UE and receiving a reference signal from a network entity; and sending the time differences measured by the plurality of sidelink UEs to the first UE for determining the position of the first UE based on the time differences measured by the plurality of sidelink UEs and receive-transmit (Rx-Tx) time difference associated with each sidelink UE, wherein the Rx-Tx time difference associated with each sidelink UE is a time difference measured by the first UE between receiving a second reference signal from the network entity and sending the sidelink reference signal to a respective sidelink UE.

Clause 150. The method of clause 149, further comprising sending assistance data to the first UE comprising at least a position of the network entity.

Clause 151. The method of clause 150, wherein the assistance data further comprises positions of each sidelink UE.

Clause 152. The method of any of clauses 149-151, further comprising receiving with the time differences measured by the plurality of sidelink UEs, an identifier for the network entity, an identifier for the second reference signal received from the network entity, an identifier for the sidelink reference signal received from the first UE, and an identifier for the sidelink UE.

Clause 153. The method of clause 152, further comprising receiving time stamps with the time differences measured by the plurality of sidelink UEs.

Clause 154. The method of any of clauses 149-153, wherein the first UE determines differential range-sums for the plurality of sidelink UEs based on the Rx-Tx time differences associated with each sidelink UE and the time difference measured by each sidelink UE, wherein each differential range-sum is a difference between a range-sum for the reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE.

Clause 155. The method of clause 154, further comprising: receiving from each of the sidelink UEs an indication of signal strength of signals from the first UE measured by each respective sidelink UE; determining a reference sidelink UE based at least in part on the indication of signal strength of signals from the first UE measured by each respective sidelink UE; and sending to the first UE an identifier for the reference sidelink UE.

Clause 156. A location server configured for determining a position of a first user equipment (UE), the location server comprising: an external interface configured to communicate with other entities in a wireless network; at least one memory; and at least one processor coupled to the external interface and the at least one memory and configured to: receive, via the external interface, time differences measured by a plurality of sidelink UEs, wherein the time difference measured by each sidelink UE is a time difference between receiving a sidelink reference signal from the first UE and receiving a reference signal from a network entity; and send, via the external interface, the time differences measured by the plurality of sidelink UEs to the first UE for determining the position of the first UE based on the time differences measured by the plurality of sidelink UEs and receive-transmit (Rx-Tx) time difference associated with each sidelink UE, wherein the Rx-Tx time difference associated with each sidelink UE is a time difference measured by the first UE between receiving a second reference signal from the network entity and sending the sidelink reference signal to a respective sidelink UE.

Clause 157. The location server of clause 156, wherein the at least one processor is further configured to send, via the external interface, assistance data to the first UE comprising at least a position of the network entity.

Clause 158. The location server of clause 157, wherein the assistance data further comprises positions of each sidelink UE.

Clause 159. The location server of any of clauses 156-158, wherein the at least one processor is further configured to receive with the time differences measured by the plurality of sidelink UEs, an identifier for the network entity, an identifier for the second reference signal received from the network entity, an identifier for the sidelink reference signal received from the first UE, and an identifier for the sidelink UE.

Clause 160. The location server of clause 159, wherein the at least one processor is further configured to receive, via the external interface, time stamps with the time differences measured by the plurality of sidelink UEs.

Clause 161. The location server of any of clauses 156-160, wherein the first UE determines differential range-sums for the plurality of sidelink UEs based on the Rx-Tx time differences associated with each sidelink UE and the time difference measured by each sidelink UE, wherein each differential range-sum is a difference between a range-sum for the reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE.

Clause 162. The location server of clause 161, wherein the at least one processor is further configured to: receive, via the external interface, from each of the sidelink UEs an indication of signal strength of signals from the first UE measured by each respective sidelink UE; determine a reference sidelink UE based at least in part on the indication of signal strength of signals from the first UE measured by each respective sidelink UE; and send, via the external interface, to the first UE an identifier for the reference sidelink UE.

Clause 163. A location server configured for determining a position of a first user equipment (UE), the location server comprising: means for receiving time differences measured by a plurality of sidelink UEs, wherein the time difference measured by each sidelink UE is a time difference between receiving a sidelink reference signal from the first UE and receiving a reference signal from a network entity; and means for sending the time differences measured by the plurality of sidelink UEs to the first UE for determining the position of the first UE based on the time differences measured by the plurality of sidelink UEs and receive-transmit (Rx-Tx) time difference associated with each sidelink UE, wherein the Rx-Tx time difference associated with each sidelink UE is a time difference measured by the first UE between receiving a second reference signal from the network entity and sending the sidelink reference signal to a respective sidelink UE.

Clause 164. The location server of clause 163, further comprising means for sending assistance data to the first UE comprising at least a position of the network entity.

Clause 165. The location server of clause 164, wherein the assistance data further comprises positions of each sidelink UE.

Clause 166. The location server of any of clauses 163-165, further comprising means for receiving with the time differences measured by the plurality of sidelink UEs, an identifier for the network entity, an identifier for the second reference signal received from the network entity, an identifier for the sidelink reference signal received from the first UE, and an identifier for the sidelink UE.

Clause 167. The location server of clause 166, further comprising means for receiving time stamps with the time differences measured by the plurality of sidelink UEs.

Clause 168. The location server of any of clauses 163-167, wherein the first UE determines differential range-sums for the plurality of sidelink UEs based on the Rx-Tx time differences associated with each sidelink UE and the time difference measured by each sidelink UE, wherein each differential range-sum is a difference between a range-sum for the reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE.

Clause 169. The location server of clause 168, further comprising: means for receiving from each of the sidelink UEs an indication of signal strength of signals from the first UE measured by each respective sidelink UE; means for determining a reference sidelink UE based at least in part on the indication of signal strength of signals from the first UE measured by each respective sidelink UE; and means for sending to the first UE an identifier for the reference sidelink UE.

Clause 170. A non-transitory storage medium including program code stored thereon, the program code is operable to configure at least one processor in location server for determining a position of a first user equipment (UE), the program code comprising instructions to: receive time differences measured by a plurality of sidelink UEs, wherein the time difference measured by each sidelink UE is a time difference between receiving a sidelink reference signal from the first UE and receiving a reference signal from a network entity; and send the time differences measured by the plurality of sidelink UEs to the first UE for determining the position of the first UE based on the time differences measured by the plurality of sidelink UEs and receive-transmit (Rx-Tx) time difference associated with each sidelink UE, wherein the Rx-Tx time difference associated with each sidelink UE is a time difference measured by the first UE between receiving a second reference signal from the network entity and sending the sidelink reference signal to a respective sidelink UE.

Clause 171. The non-transitory storage medium of clause 170, further comprising instructions to send assistance data to the first UE comprising at least a position of the network entity.

Clause 172. The non-transitory storage medium of clause 171, wherein the assistance data further comprises positions of each sidelink UE.

Clause 173. The non-transitory storage medium of any of clauses 170-172, further comprising instructions to receive with the time differences measured by the plurality of sidelink UEs, an identifier for the network entity, an identifier for the second reference signal received from the network entity, an identifier for the sidelink reference signal received from the first UE, and an identifier for the sidelink UE.

Clause 174. The non-transitory storage medium of clause 173, further comprising receive time stamps with the time differences measured by the plurality of sidelink UEs.

Clause 175. The non-transitory storage medium of any of clauses 170-174, wherein the first UE determines differential range-sums for the plurality of sidelink UEs based on the Rx-Tx time differences associated with each sidelink UE and the time difference measured by each sidelink UE, wherein each differential range-sum is a difference between a range-sum for the reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE.

Clause 176. The non-transitory storage medium of clause 175, further comprising instructions to: receive from each of the sidelink UEs an indication of signal strength of signals from the first UE measured by each respective sidelink UE; determine a reference sidelink UE based at least in part on the indication of signal strength of signals from the first UE measured by each respective sidelink UE; and send to the first UE an identifier for the reference sidelink UE.

Clause 177. A method performed by a first user equipment (UE) for determining a position of a second UE, the first UE in sidelink communication with the second UE, the method comprising: receiving a first reference signal from a network entity; receiving a sidelink reference signal from the second UE; and determining a time difference between receiving the sidelink reference signal from the second UE and receiving the first reference signal from the network entity; and processing the time difference between receiving the sidelink reference signal from the second UE and receiving the first reference signal from the network entity for generating differential range-sums for the second UE and a plurality of sidelink UEs including the first UE based on receive-transmit (Rx-Tx) time difference associated with each sidelink UE measured by the second UE, wherein the Rx-Tx time difference associated with each sidelink UE is a time difference measured by the second UE between receiving a second reference signal from the network entity and sending a sidelink reference signal to a respective sidelink UEs, wherein the differential range-sums for the second UE and the plurality of sidelink UEs is further based on time differences measured by the plurality of sidelink UEs, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the second UE and the network entity and a second range between the second UE and the respective sidelink UE, and wherein the position of the second UE is determined based at least in part on the differential range-sums for the plurality of sidelink UEs.

Clause 178. The method of clause 177, wherein the differential range-sums are determined by the location server and the position of the second UE is determined by the location server based on the differential range-sums.

Clause 179. The method of clause 178, wherein the location server determines the differential range-sums and determines the position of the second UE based on the differential range-sums.

Clause 180. The method of clause 178, wherein the location server sends the time difference to the second UE and the second UE determines the differential range-sums and determines the position of the second UE based on the differential range-sums.

Clause 181. The method of clause 177, wherein processing the time difference between receiving the sidelink reference signal from the second UE and receiving the first reference signal from the network entity for generating the differential range-sums comprises sending the time difference to the second UE.

Clause 182. The method of clause 181, wherein the second UE determines the differential range-sums and a location server determines the position of the second UE based on the differential range-sums.

Clause 183. The method of clause 181, wherein the second UE determines the differential range-sums and determines the position of the second UE based on the differential range-sums.

Clause 184. The method of clause 177, wherein processing the time difference between receiving the sidelink reference signal from the second UE and receiving the first reference signal from the network entity for generating the differential range-sums comprises sending the time difference to an entity, further comprising sending with the time difference, an identifier for the network entity, an identifier for the first reference signal received from the network entity, an identifier for the sidelink reference signal received from the second UE, and an identifier for the first UE.

Clause 185. The method of clause 184, further comprising sending a time stamp with the time difference.

Clause 186. The method of clause 177, further comprising: measuring signal strength of one or more signals received from the second UE; sending indications of signal strength of the one or more signals received from the second UE for determining the reference sidelink UE based at least in part on the indications of signal strength of signals from the second UE measured by each sidelink UE including the first UE.

Clause 187. A first user equipment (UE) configured for determining a position of a second UE, the first UE in sidelink communication with the second UE, the first UE comprising: at least one wireless transceiver configured to wirelessly communicate with other entities in a wireless network; at least one memory; and at least one processor coupled to the at least one wireless transceiver and the at least one memory and configured to: receive, via the at least one wireless transceiver, a first reference signal from a network entity; receive, via the at least one wireless transceiver, a sidelink reference signal from the second UE; and determine a time difference between receiving the sidelink reference signal from the second UE and receiving the first reference signal from the network entity; and process the time difference between receiving the sidelink reference signal from the second UE and receiving the first reference signal from the network entity for generating differential range-sums for the second UE and a plurality of sidelink UEs including the first UE based on receive-transmit (Rx-Tx) time difference associated with each sidelink UE measured by the second UE, wherein the Rx-Tx time difference associated with each sidelink UE is a time difference measured by the second UE between receiving a second reference signal from the network entity and sending a sidelink reference signal to a respective sidelink UEs, wherein the differential range-sums for the second UE and the plurality of sidelink UEs is further based on time differences measured by the plurality of sidelink UEs, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the second UE and the network entity and a second range between the second UE and the respective sidelink UE, and wherein the position of the second UE is determined based at least in part on the differential range-sums for the plurality of sidelink UEs.

Clause 188. The first UE of clause 187, wherein the at least one processor is configured to process the time difference between receiving the sidelink reference signal from the second UE and receiving the first reference signal from the network entity for generating the differential range-sums by being configured to send, via the at least one wireless transceiver, the time difference to a location server.

Clause 189. The first UE of clause 188, wherein the differential range-sums are determined by the location server and the position of the second UE is determined by the location server based on the differential range-sums.

Clause 190. The first UE of clause 188, wherein the location server sends the time difference to the second UE and the second UE determines the differential range-sums and determines the position of the second UE based on the differential range-sums.

Clause 191. The first UE of clause 187, wherein the at least one processor is configured to process the time difference between receiving the sidelink reference signal from the second UE and receiving the first reference signal from the network entity for generating the differential range-sums by being configured to send, via the at least one wireless transceiver, the time difference to the second UE.

Clause 192. The first UE of clause 191, wherein the second UE determines the differential range-sums and a location server determines the position of the second UE based on the differential range-sums.

Clause 193. The first UE of clause 191, wherein the second UE determines the differential range-sums and determines the position of the second UE based on the differential range-sums.

Clause 194. The first UE of clause 187, wherein the at least one processor is configured to process the time difference between receiving the sidelink reference signal from the second UE and receiving the first reference signal from the network entity for generating the differential range-sums by being configured to send, via the at least one wireless transceiver, the time difference to an entity, wherein the at least one processor is further configured to send with the time difference, an identifier for the network entity, an identifier for the first reference signal received from the network entity, an identifier for the sidelink reference signal received from the second UE, and an identifier for the first UE.

Clause 195. The first UE of clause 194, wherein the at least one processor is further configured to send, via the at least one wireless transceiver, a time stamp with the time difference.

Clause 196. The first UE of clause 187, wherein the at least one processor is further configured to: measure signal strength of one or more signals received from the second UE; send, via the at least one wireless transceiver, indications of signal strength of the one or more signals received from the second UE for determining the reference sidelink UE based at least in part on the indications of signal strength of signals from the second UE measured by each sidelink UE including the first UE.

Clause 197. A first user equipment (UE) configured for determining a position of a second UE, the first UE in sidelink communication with the second UE, the first UE comprising: means for receiving a first reference signal from a network entity; means for receiving a sidelink reference signal from the second UE; and means for determining a time difference between receiving the sidelink reference signal from the second UE and receiving the first reference signal from the network entity; and means for processing the time difference between receiving the sidelink reference signal from the second UE and receiving the first reference signal from the network entity for generating differential range-sums for the second UE and a plurality of sidelink UEs including the first UE based on receive-transmit (Rx-Tx) time difference associated with each sidelink UE measured by the second UE, wherein the Rx-Tx time difference associated with each sidelink UE is a time difference measured by the second UE between receiving a second reference signal from the network entity and sending a sidelink reference signal to a respective sidelink UEs, wherein the differential range-sums for the second UE and the plurality of sidelink UEs is further based on time differences measured by the plurality of sidelink UEs, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the second UE and the network entity and a second range between the second UE and the respective sidelink UE, and wherein the position of the second UE is determined based at least in part on the differential range-sums for the plurality of sidelink UEs.

Clause 198. The first UE of clause 197, wherein the means for processing the time difference between receiving the sidelink reference signal from the second UE and receiving the first reference signal from the network entity for generating the differential range-sums sends the time difference to a location server.

Clause 199. The first UE of clause 198, wherein the differential range-sums are determined by the location server and the position of the second UE is determined by the location server based on the differential range-sums.

Clause 200. The first UE of clause 198, wherein the location server sends the time difference to the second UE and the second UE determines the differential range-sums and determines the position of the second UE based on the differential range-sums.

Clause 201. The first UE of clause 197, wherein the means for processing the time difference between receiving the sidelink reference signal from the second UE and receiving the first reference signal from the network entity for generating the differential range-sums sends the time difference to the second UE.

Clause 202. The first UE of clause 201, wherein the second UE determines the differential range-sums and a location server determines the position of the second UE based on the differential range-sums.

Clause 203. The first UE of clause 201, wherein the second UE determines the differential range-sums and determines the position of the second UE based on the differential range-sums.

Clause 204. The first UE of clause 197, wherein the means for processing the time difference between receiving the sidelink reference signal from the second UE and receiving the first reference signal from the network entity for generating the differential range-sums comprises sends the time difference to an entity, further comprising means for sending with the time difference, an identifier for the network entity, an identifier for the first reference signal received from the network entity, an identifier for the sidelink reference signal received from the second UE, and an identifier for the first UE.

Clause 205. The first UE of clause 204, further comprising means for sending a time stamp with the time difference.

Clause 206. The first UE of clause 197, further comprising: means for measuring signal strength of one or more signals received from the second UE; means for sending indications of signal strength of the one or more signals received from the second UE for determining the reference sidelink UE based at least in part on the indications of signal strength of signals from the second UE measured by each sidelink UE including the first UE.

Clause 207. A non-transitory storage medium including program code stored thereon, the program code is operable to configure at least one processor in first user equipment (UE) for determining a position of a second UE, the first UE in sidelink communication with the second UE, the program code comprising instructions to: receive a first reference signal from a network entity; receive a sidelink reference signal from the second UE; and determine a time difference between receiving the sidelink reference signal from the second UE and receiving the first reference signal from the network entity; and process the time difference between receiving the sidelink reference signal from the second UE and receiving the first reference signal from the network entity for generating differential range-sums for the second UE and a plurality of sidelink UEs including the first UE based on receive-transmit (Rx-Tx) time difference associated with each sidelink UE measured by the second UE, wherein the Rx-Tx time difference associated with each sidelink UE is a time difference measured by the second UE between receiving a second reference signal from the network entity and sending a sidelink reference signal to a respective sidelink UEs, wherein the differential range-sums for the second UE and the plurality of sidelink UEs is further based on time differences measured by the plurality of sidelink UEs, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the second UE and the network entity and a second range between the second UE and the respective sidelink UE, and wherein the position of the second UE is determined based at least in part on the differential range-sums for the plurality of sidelink UEs.

Clause 208. The non-transitory storage medium of clause 207, wherein the instructions to process the time difference between receiving the sidelink reference signal from the second UE and receiving the first reference signal from the network entity for generating the differential range-sums comprise instructions to send the time difference to a location server.

Clause 209. The non-transitory storage medium of clause 208, wherein the differential range-sums are determined by the location server and the position of the second UE is determined by the location server based on the differential range-sums.

Clause 210. The non-transitory storage medium of clause 208, wherein the location server sends the time difference to the second UE and the second UE determines the differential range-sums and determines the position of the second UE based on the differential range-sums.

Clause 211. The non-transitory storage medium of clause 207, wherein the instructions to process the time difference between receiving the sidelink reference signal from the second UE and receiving the first reference signal from the network entity for generating the differential range-sums comprise instructions to send the time difference to the second UE.

Clause 212. The non-transitory storage medium of clause 211, wherein the second UE determines the differential range-sums and a location server determines the position of the second UE based on the differential range-sums.

Clause 213. The non-transitory storage medium of clause 211, wherein the second UE determines the differential range-sums and determines the position of the second UE based on the differential range-sums.

Clause 214. The non-transitory storage medium of clause 207, wherein the instructions to process the time difference between receiving the sidelink reference signal from the second UE and receiving the first reference signal from the network entity for generating the differential range-sums comprise instructions to send the time difference to an entity, further comprising instructions to send with the time difference, an identifier for the network entity, an identifier for the first reference signal received from the network entity, an identifier for the sidelink reference signal received from the second UE, and an identifier for the first UE.

Clause 215. The non-transitory storage medium of clause 214, further comprising instructions to send a time stamp with the time difference.

Clause 216. The non-transitory storage medium of clause 207, further comprising instructions to: measure signal strength of one or more signals received from the second UE; send indications of signal strength of the one or more signals received from the second UE for determining the reference sidelink UE based at least in part on the indications of signal strength of signals from the second UE measured by each sidelink UE including the first UE.

Therefore, it is intended that claimed subject matter not be limited to the particular examples disclosed, but that such claimed subject matter may also include all aspects falling within the scope of appended claims, and equivalents thereof.

What is claimed is:

1. A method performed by a first user equipment (UE) for determining a position of the first UE, the method comprising:

receiving a first reference signal from a network entity;

sending one or more sidelink reference signals to a plurality of sidelink UEs;

determining a receive-transmit (Rx-Tx) time difference associated with each sidelink UE, wherein the Rx-Tx time difference associated with each sidelink UE is a time difference between receiving the first reference signal from the network entity and sending the sidelink reference signal to a respective sidelink UE;

receiving a time difference measured by each sidelink UE, wherein the time difference measured by each sidelink UE is the time difference between receiving the sidelink reference signal from the first UE and receiving a second reference signal from the network entity; and processing the Rx-Tx time difference associated with each sidelink UE for generating differential range-sums for the plurality of sidelink UEs based on the Rx-Tx time differences associated with each sidelink UE and the time difference measured by each sidelink UE, each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE, wherein the position of the first UE is determined based at least in part on the differential range-sums for the plurality of sidelink UEs.

2. The method of claim 1, wherein processing the Rx-Tx time difference associated with each sidelink UE for generating the differential range-sums for the plurality of sidelink UEs comprises determining the differential range-sums for the plurality of sidelink UEs based on the Rx-Tx time differences associated with each sidelink UE and the time difference measured by each sidelink UE.

3. The method of claim 2, wherein determining the differential range-sums comprises:

determining, for each sidelink UE, the range-sum based on the Rx-Tx time difference associated with a respective sidelink UE and the time difference measured by the respective sidelink UE; and determining the difference between the range-sum for the reference sidelink UE and the range-sum for each other sidelink UE from the plurality of sidelink UEs.

4. The method of claim 2, wherein the time difference measured by each sidelink UE is received directly from each sidelink UE.

5. The method of claim 2, wherein the time difference measured by each sidelink UE is received from a location server.

6. The method of claim 2, further comprising receiving with the time difference measured by the respective sidelink UE, an identifier for the network entity, an identifier for the second reference signal received from the network entity, an identifier for the sidelink reference signal received from the first UE, and an identifier for the sidelink UE.

7. The method of claim 2, further comprising receiving from a location server, an identifier for the reference sidelink UE.

8. The method of claim 2, further comprising determining to use the differential range-sums for determining the position of the first UE based at least in part on a group-delay calibration status of the first UE.

9. The method of claim 2, further comprising determining the position of the first UE based at least in part on the differential range-sums for the plurality of sidelink UEs.

10. The method of claim 2, further comprising sending the differential range-sums for the plurality of sidelink UEs to a location server, wherein the position of the first UE is determined by the location server based at least in part on the differential range-sums for the plurality of sidelink UEs.

11. The method of claim 1, wherein processing the Rx-Tx time difference associated with each sidelink UE for generating the differential range-sums for the plurality of sidelink UEs comprises sending the Rx-Tx time difference associated with each sidelink UE to a location server, wherein the differential range-sums for the plurality of sidelink UEs is determined by the location server based on the Rx-Tx time differences associated with each sidelink UE and the time difference measured by each sidelink UE, and wherein the position of the first UE is determined by the location server based at least in part on the differential range-sums for the plurality of sidelink UEs.

12. The method of claim 11, further comprising sending with the Rx-Tx time difference associated with each sidelink UE to the location server an identifier for the network entity, an identifier for the first reference signal received from the network entity, an identifier for the one or more sidelink reference signals sent to the plurality of sidelink UEs, an identifier for the first UE, and an identifier for each of the sidelink UEs.

13. The method of claim 11, further comprising sending to the location server a group-delay calibration status of the first UE, wherein the use of the differential range-sums for the plurality of sidelink UEs to determine the position for the first UE is determined by the location server based at least in part on the group-delay calibration status of the first UE.

14. A first user equipment (UE) configured for determining a position of the first UE, the first UE comprising:

at least one wireless transceiver configured to wirelessly communicate with other entities in a wireless network;

at least one memory; and at least one processor coupled to the at least one wireless transceiver and the at least one memory and configured to:

receive, via the at least one wireless transceiver, a first reference signal from a network entity;

send, via the at least one wireless transceiver, one or more sidelink reference signals to a plurality of sidelink UEs;

determine a receive-transmit (Rx-Tx) time difference associated with each sidelink UE, wherein the Rx-Tx time difference associated with each sidelink UE is a time difference between receiving the first reference signal from the network entity and sending the sidelink reference signal to a respective sidelink UE;

receive a time difference measured by each sidelink UE, wherein the time difference measured by each sidelink UE is the time difference between receiving the sidelink reference signal from the first UE and receiving a second reference signal from the network entity; and process the Rx-Tx time difference associated with each sidelink UE to generate differential range-sums for the plurality of sidelink UEs based on the Rx-Tx time differences associated with each sidelink UE and the time difference measured by each sidelink UE, each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the first UE and the network entity and a second range between the first UE and the respective sidelink UE, wherein the position of the first UE is determined based at least in part on the differential range-sums for the plurality of sidelink UEs.

15. The first UE of claim 14, wherein the at least one processor is configured to process the Rx-Tx time difference associated with each sidelink UE to generate the differential range-sums for the plurality of sidelink UEs by being configured to determine the differential range-sums for the plurality of sidelink UEs based on the Rx-Tx time differences associated with each sidelink UE and the time difference measured by each sidelink UE.

16. The first UE of claim 15, wherein the at least one processor is configured to determine the differential range-sums by being configured to:

determine, for each sidelink UE, the range-sum based on the Rx-Tx time difference associated with a respective sidelink UE and the time difference measured by the respective sidelink UE; and determine the difference between the range-sum for the reference sidelink UE and the range-sum for each other sidelink UE from the plurality of sidelink UEs.

17. The first UE of claim 15, wherein the time difference measured by each sidelink UE is received directly from each sidelink UE.

18. The first UE of claim 15, wherein the time difference measured by each sidelink UE is received from a location server.

19. The first UE of claim 15, wherein the at least one processor is further configured to receive with the time difference measured by the respective sidelink UE, an identifier for the network entity, an identifier for the second reference signal received from the network entity, an identifier for the sidelink reference signal received from the first UE, and an identifier for the sidelink UE.

20. The first UE of claim 15, wherein the at least one processor is further configured to receive, via the at least one wireless transceiver, from a location server, an identifier for the reference sidelink UE.

21. The first UE of claim 15, wherein the at least one processor is further configured to determine to use the differential range-sums to determine the position of the first UE based at least in part on a group-delay calibration status of the first UE.

22. The first UE of claim 15, wherein the at least one processor is further configured to determine the position of the first UE based at least in part on the differential range-sums for the plurality of sidelink UEs.

23. The first UE of claim 15, wherein the at least one processor is further configured to send, via the at least one wireless transceiver, the differential range-sums for the plurality of sidelink UEs to a location server, wherein the position of the first UE is determined by the location server based at least in part on the differential range-sums for the plurality of sidelink UEs.

24. The first UE of claim 14, wherein the at least one processor is configured to process the Rx-Tx time difference associated with each sidelink UE to generate the differential range-sums for the plurality of sidelink UEs by being configured to send the Rx-Tx time difference associated with each sidelink UE to a location server, wherein the differential range-sums for the plurality of sidelink UEs is determined by the location server based on the Rx-Tx time differences associated with each sidelink UE and the time difference measured by each sidelink UE, and wherein the position of the first UE is determined by the location server based at least in part on the differential range-sums for the plurality of sidelink UEs.

25. The first UE of claim 24, wherein the at least one processor is further configured to send with the Rx-Tx time difference associated with each sidelink UE to the location server an identifier for the network entity, an identifier for the first reference signal received from the network entity, an identifier for the one or more sidelink reference signals sent to the plurality of sidelink UEs, an identifier for the first UE, and an identifier for each of the sidelink UEs.

26. The first UE of claim 24, wherein the at least one processor is further configured to send to the location server, via the at least one wireless transceiver, a group-delay calibration status of the first UE, wherein the use of the differential range-sums for the plurality of sidelink UEs to determine the position for the first UE is determined by the location server based at least in part on the group-delay calibration status of the first UE.

27. A method performed by a first user equipment (UE) for determining a position of a second UE, the first UE in sidelink communication with the second UE, the method comprising:

receiving a first reference signal from a network entity;

receiving a sidelink reference signal from the second UE; and determining a time difference between receiving the sidelink reference signal from the second UE and receiving the first reference signal from the network entity;

receiving receive-transmit (Rx-Tx) time difference associated with each sidelink UE measured by the second UE, wherein the Rx-Tx time difference associated with each sidelink UE is a time difference measured by the second UE between receiving a second reference signal from the network entity and sending a sidelink reference signal to a respective sidelink UEs;

receiving time differences measured by a plurality of sidelink UEs; and processing the time difference between receiving the sidelink reference signal from the second UE and receiving the first reference signal from the network entity for generating differential range-sums for the second UE and the plurality of sidelink UEs including the first UE based on the receive-transmit (Rx-Tx) time difference associated with each sidelink UE measured by the second UE, wherein the differential range-sums for the second UE and the plurality of sidelink UEs is further based on the time differences measured by the plurality of sidelink UEs, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the second UE and the network entity and a second range between the second UE and the respective sidelink UE, and wherein the position of the second UE is determined based at least in part on the differential range-sums for the plurality of sidelink UEs.

28. The method of claim 27, wherein processing the time difference between receiving the sidelink reference signal from the second UE and receiving the first reference signal from the network entity for generating the differential range-sums comprises sending the time difference to a location server.

29. The method of claim 28, wherein the differential range-sums are determined by the location server and the position of the second UE is determined by the location server based on the differential range-sums.

30. The method of claim 28, wherein the location server sends the time difference to the second UE and the second UE determines the differential range-sums and determines the position of the second UE based on the differential range-sums.

31. The method of claim 27, wherein processing the time difference between receiving the sidelink reference signal from the second UE and receiving the first reference signal from the network entity for generating the differential range-sums comprises sending the time difference to the second UE.

32. The method of claim 31, wherein the second UE determines the differential range-sums and a location server determines the position of the second UE based on the differential range-sums.

33. The method of claim 31, wherein the second UE determines the differential range-sums and determines the position of the second UE based on the differential range-sums.

34. The method of claim 27, wherein processing the time difference between receiving the sidelink reference signal from the second UE and receiving the first reference signal from the network entity for generating the differential range-sums comprises sending the time difference to an entity, further comprising sending with the time difference, an identifier for the network entity, an identifier for the first reference signal received from the network entity, an identifier for the sidelink reference signal received from the second UE, and an identifier for the first UE.

35. The method of claim 34, further comprising sending a time stamp with the time difference.

36. The method of claim 27, further comprising:

measuring signal strength of one or more signals received from the second UE;

sending indications of signal strength of the one or more signals received from the second UE for determining the reference sidelink UE based at least in part on the indications of signal strength of signals from the second UE measured by each sidelink UE including the first UE.

37. A first user equipment (UE) configured for determining a position of a second UE, the first UE in sidelink communication with the second UE, the first UE comprising:

at least one wireless transceiver configured to wirelessly communicate with other entities in a wireless network;

at least one memory; and at least one processor coupled to the at least one wireless transceiver and the at least one memory and configured to:

receive, via the at least one wireless transceiver, a first reference signal from a network entity;

receive, via the at least one wireless transceiver, a sidelink reference signal from the second UE;

determine a time difference between receiving the sidelink reference signal from the second UE and receiving the first reference signal from the network entity;

receive receive-transmit (Rx-Tx) time difference associated with each sidelink UE measured by the second UE, wherein the Rx-Tx time difference associated with each sidelink UE is a time difference measured by the second UE between receiving a second reference signal from the network entity and sending a sidelink reference signal to a respective sidelink UEs;

receive time differences measured by a plurality of sidelink UEs; and process the time difference between receiving the sidelink reference signal from the second UE and receiving the first reference signal from the network entity for generating differential range-sums for the second UE and the plurality of sidelink UEs including the first UE based on the receive-transmit (Rx-Tx) time difference associated with each sidelink UE measured by the second UE, wherein the differential range-sums for the second UE and the plurality of sidelink UEs is further based on the time differences measured by the plurality of sidelink UEs, wherein each differential range-sum is a difference between a range-sum for a reference sidelink UE from the plurality of sidelink UEs and a range-sum for another sidelink UE from the plurality of sidelink UEs, and wherein the range-sum for each sidelink UE is a sum of a first range between the second UE and the network entity and a second range between the second UE and the respective sidelink UE, and wherein the position of the second UE is determined based at least in part on the differential range-sums for the plurality of sidelink UEs.

38. The first UE of claim 37, wherein the at least one processor is configured to process the time difference between receiving the sidelink reference signal from the second UE and receiving the first reference signal from the network entity for generating the differential range-sums by being configured to send, via the at least one wireless transceiver, the time difference to a location server.

39. The first UE of claim 38, wherein the differential range-sums are determined by the location server and the position of the second UE is determined by the location server based on the differential range-sums.

40. The first UE of claim 38, wherein the location server sends the time difference to the second UE and the second UE determines the differential range-sums and determines the position of the second UE based on the differential range-sums.

41. The first UE of claim 37, wherein the at least one processor is configured to process the time difference between receiving the sidelink reference signal from the second UE and receiving the first reference signal from the network entity for generating the differential range-sums by being configured to send, via the at least one wireless transceiver, the time difference to the second UE.

42. The first UE of claim 41, wherein the second UE determines the differential range-sums and a location server determines the position of the second UE based on the differential range-sums.

43. The first UE of claim 41, wherein the second UE determines the differential range-sums and determines the position of the second UE based on the differential range-sums.

44. The first UE of claim 37, wherein the at least one processor is configured to process the time difference between receiving the sidelink reference signal from the second UE and receiving the first reference signal from the network entity for generating the differential range-sums by being configured to send, via the at least one wireless transceiver, the time difference to an entity, wherein the at least one processor is further configured to send with the time difference, an identifier for the network entity, an identifier for the first reference signal received from the network entity, an identifier for the sidelink reference signal received from the second UE, and an identifier for the first UE.

45. The first UE of claim 44, wherein the at least one processor is further configured to send, via the at least one wireless transceiver, a time stamp with the time difference.

46. The first UE of claim 37, wherein the at least one processor is further configured to:

measure signal strength of one or more signals received from the second UE;

send, via the at least one wireless transceiver, indications of signal strength of the one or more signals received from the second UE for determining the reference sidelink UE based at least in part on the indications of signal strength of signals from the second UE measured by each sidelink UE including the first UE.

* * * * *